US009000629B2

(12) United States Patent
Yokogawa et al.

(10) Patent No.: US 9,000,629 B2
(45) Date of Patent: Apr. 7, 2015

(54) STATOR SEGMENT AND MOTOR

(75) Inventors: Tomoyoshi Yokogawa, Kyoto (JP); Airi Nakagawa, Kyoto (JP)

(73) Assignee: Nidec Corporation, Kyoto (JP)

( * ) Notice: Subject to any disclaimer, the term of this patent is extended or adjusted under 35 U.S.C. 154(b) by 302 days.

(21) Appl. No.: 13/522,414

(22) PCT Filed: Feb. 28, 2011

(86) PCT No.: PCT/JP2011/055157
§ 371 (c)(1),
(2), (4) Date: Jul. 16, 2012

(87) PCT Pub. No.: WO2011/108735
PCT Pub. Date: Sep. 9, 2011

(65) Prior Publication Data
US 2012/0293024 A1    Nov. 22, 2012

(30) Foreign Application Priority Data

Mar. 3, 2010   (JP) .................................. 2010-046827
Nov. 24, 2010  (JP) .................................. 2010-261352

(51) Int. Cl.
*H02K 3/32* (2006.01)
*H02K 1/27* (2006.01)
(Continued)

(52) U.S. Cl.
CPC .................. *H02K 1/278* (2013.01); *H02K 3/32* (2013.01); *H02K 1/148* (2013.01); *H02K 3/28* (2013.01);
(Continued)

(58) Field of Classification Search
CPC ......... H02K 1/141; H02K 1/148; H02K 3/32; H02K 3/34; H02K 3/345; H02K 3/38; H02K 3/30; H02K 3/325

USPC ........... 310/71, 43, 216.008, 45, 46, 214, 215
See application file for complete search history.

(56) References Cited

U.S. PATENT DOCUMENTS 7,557,478 B2 *   7/2009   Hoshika .......................... 310/71
7,696,667 B2     4/2010   Tatebe
(Continued)

FOREIGN PATENT DOCUMENTS

JP    2000-333400 A    11/2000
JP    2001-119885 A    4/2001
(Continued)

OTHER PUBLICATIONS

English translation of Official Communication issued in International Patent Application No. PCT/JP2011/055157, mailed on May 31, 2011.
(Continued)

*Primary Examiner* — Quyen Leung
*Assistant Examiner* — Robert E Mates
(74) *Attorney, Agent, or Firm* — Keating & Bennett, LLP

(57) ABSTRACT

A stator segment arranged to define a portion of an annular stator includes a core segment including a core back portion arranged to extend in a circumferential direction of the stator, and a tooth portion arranged to extend from the core back portion in a radial direction of the stator; a coil wound around the tooth portion and including a pair of coil wire terminals; an insulating layer arranged between the coil and the tooth portion; and a resin layer arranged to seal the entire coil except for the pair of coil wire terminals. Circumferential end walls of the resin layer are arranged circumferentially inward of circumferential end walls of the core back portion.

11 Claims, 56 Drawing Sheets

(51) Int. Cl.
*H02K 3/52* (2006.01)
*H02K 15/03* (2006.01)
*H02K 15/12* (2006.01)
*H02K 1/14* (2006.01)
*H02K 3/28* (2006.01)
*H02K 5/22* (2006.01)
*H02K 15/095* (2006.01)

(52) U.S. Cl.
CPC ............... *H02K 3/522* (2013.01); *H02K 5/225* (2013.01); *H02K 15/03* (2013.01); *H02K 15/095* (2013.01); *H02K 15/12* (2013.01); *H02K 2203/09* (2013.01); *H02K 2203/12* (2013.01)

(56) References Cited

U.S. PATENT DOCUMENTS

| | | |
|---|---|---|
| 8,575,798 B2 | 11/2013 | Takahashi et al. |
| 2003/0201688 A1 | 10/2003 | Yamamura et al. |
| 2006/0022544 A1 | 2/2006 | Kinashi |
| 2007/0114878 A1 | 5/2007 | Tatebe |
| 2007/0205678 A1 | 9/2007 | Takashima et al. |
| 2007/0232094 A1 | 10/2007 | Hoshika |
| 2009/0256439 A1 | 10/2009 | Inoue et al. |
| 2010/0194214 A1 | 8/2010 | Takahashi et al. |
| 2010/0275436 A1 | 11/2010 | Kiyono et al. |

FOREIGN PATENT DOCUMENTS

| | | |
|---|---|---|
| JP | 2004-056873 A | 2/2004 |
| JP | 2006-50690 A | 2/2006 |
| JP | 2007-143324 A | 6/2007 |
| JP | 2007-174869 A | 7/2007 |
| JP | 2007-244008 A | 9/2007 |
| JP | 2007-259523 A | 10/2007 |
| JP | 2007-288821 A | 11/2007 |
| JP | 2008-220027 A | 9/2008 |
| JP | 2008-278704 A | 11/2008 |
| JP | 2009-017666 A | 1/2009 |
| JP | 2009-17666 A | 1/2009 |
| JP | 2009-89456 A | 4/2009 |
| JP | 4281733 B2 | 6/2009 |
| JP | 2009-171740 A | 7/2009 |
| JP | 2009-261220 A | 11/2009 |
| WO | WO 2009041172 A2 * | 4/2009 |

OTHER PUBLICATIONS

English translation of Official Communication issued in corresponding International Application PCT/JP2011/055157, mailed on Sep. 13, 2012.

Official Communication issued in International Patent Application No. PCT/JP2011/055157, mailed on May 31, 2011.

Nakagawa, "Busbar Unit and Motor", U.S. Appl. No. 13/581,614, filed Aug. 29, 2012.

Yokogawa et al., "Stator and Motor", U.S. Appl. No. 13/522,412, filed Jul. 16, 2012.

* cited by examiner

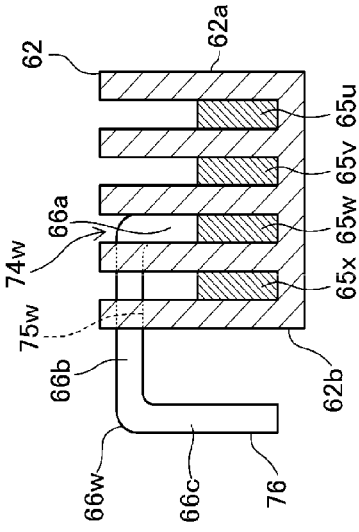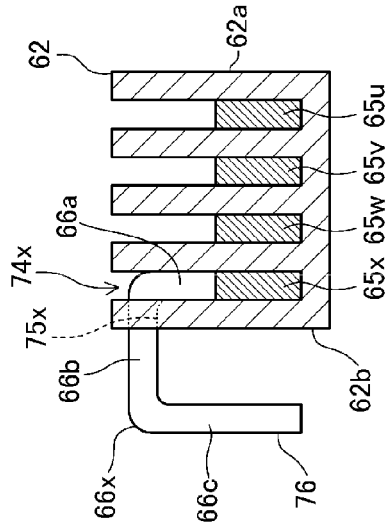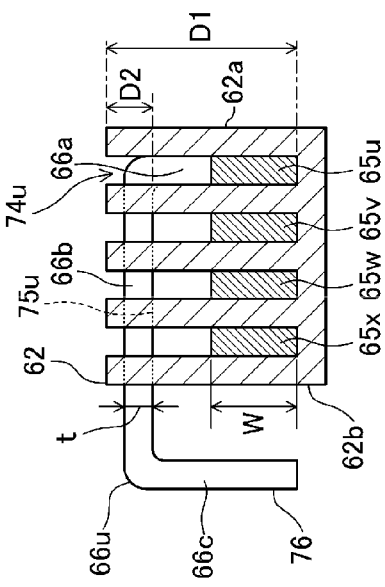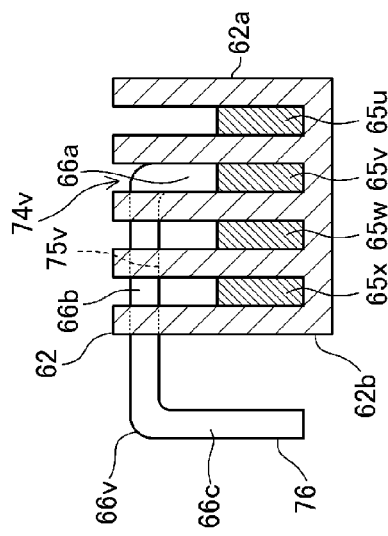
Fig. 14A
Fig. 14B
Fig. 14C
Fig. 14D

STATOR SEGMENT AND MOTOR

BACKGROUND OF THE INVENTION

1. Field of the Invention

The present invention relates to an inner-rotor motor in which a stator includes a plurality of stator segments. In particular, the present invention relates to a wiring configuration of a stator.

2. Description of the Related Art

In general, motors have a variety of potential performance levels that are varied depending on the intended purposes of the motors. The number of poles of a rotor, the number of slots of the stator, the direction of the winding of coils, the arrangement of the coils, and so on are designed in accordance with a desired performance of the motor. Thus, there are a large variety of wiring configurations available for motors.

For instance, referring to FIG. 1A, in an 8-pole 12-slot motor, a group of four coils connected in parallel may be provided for each of a U phase, a V phase, and a W phase. Moreover, the groups of coils for the respective phases may be connected in a Y configuration. A wiring configuration in which groups of coils connected in parallel are connected in the Y configuration will be referred to as "parallel connection".

Meanwhile, a wiring configuration different from the parallel connection may be adopted for a 14-pole 12-slot motor. Specifically, referring to FIG. 1B, two coils are connected in series to define a sub-coil group. Winding directions of the two coils connected in series are opposite to each other. Two sub-coil groups are connected in parallel to define a group of coils for each of the U phase, the V phase, and the W phase, and the groups of coils for the respective phases are connected in the Y configuration. A wiring configuration in which sub-coil groups, each of which is made up of a group of coils connected in series, are used will be referred to as "series-parallel connection".

As described above, different types of motors, even motors having the same number of slots, may have greatly different wiring configurations depending on the motor design thereof. Therefore, production equipment, such as a winding machine and so on, and a manufacturing procedure need to be suitably arranged for each type of motor. This presents an impediment to improving productivity.

Thus, a variety of configurations have been conceived to improve the productivity (see, for example, JP-A 2006-50690 and JP-A 2007-244008).

JP-A 2006-50690 discloses a stator in which a plurality of coils which are continuously wound are arranged to have the same winding direction in order to facilitate a winding operation for the coils which are continuously wound.

JP-A 2007-244008 discloses a rotary electrical machine including a power supply portion. The power supply portion includes a plurality of conductive members, each of which is arranged to connect coils to one another, and a holding member arranged to hold the plurality of conductive members. The power supply portion is configured so as to be compatible with a plurality of different wiring configurations, such as the Y configuration and a delta configuration. Specifically, the holding member includes four concentric common grooves defined therein. In addition, conductive members for the U phase, the V phase, and the W phase, a conductive member for common use, and so on are fitted in the common grooves.

JP-A 2009-017666 discloses a motor in which busbars are held in an insulator (JP-A 2009-017666).

However, in the cylindrical stator of the motor described in Japanese Patent No. 4281733, circumferential side surfaces of the resin covers of the stator segments are arranged to be in contact with one another. Therefore, it is difficult to allow the stator to have a sufficient degree of circularity for some specific purposes.

SUMMARY OF THE INVENTION

Preferred embodiments of the present invention provide an improvement in an amount of circularity of a cylindrical stator defined by a plurality of stator segments that have been assembled together.

A stator according to a preferred embodiment of the present invention preferably includes stator segments which are arranged to define a portion of a substantially annular stator, and which include a core segment preferably including a core back portion arranged to extend in a circumferential direction of the stator and a tooth portion arranged to extend from the core back portion in a radial direction of the stator; a coil wound around the tooth portion and including a pair of coil wire terminals; an insulating layer arranged between the coil and the tooth portion; and a resin layer arranged to seal the entire coil except for the pair of coil wire terminals. Circumferential end walls of the resin layer are preferably arranged circumferentially inward of circumferential end walls of the core back portion.

In the above-described stator segment, the circumferential end walls of the resin layer are preferably arranged circumferentially inward of circumferential end walls of the core segment. Therefore, when stator segments according to the above-described preferred embodiment of the present invention are arranged in a substantially annular shape to thereby define the stator, the circumferential end walls of the core segments are arranged to be in contact with one another. It is therefore possible to provide a stator including accurately provided core segments. This makes it possible to achieve improved circularity of a cylindrical stator that is defined by stator segments that have been assembled together.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1A illustrates parallel connection, and FIG. 1B illustrates series-parallel connection.

FIG. 14A is a schematic cross-sectional view of the busbar unit taken along line A-A of FIG. 13; FIG. 14B is a schematic cross-sectional view of the busbar unit taken along line B-B of FIG. 13; FIG. 14C is a schematic cross-sectional view of the busbar unit taken along line C-C of FIG. 13; and FIG. 14D is a schematic cross-sectional view of the busbar unit taken along line D-D of FIG. 13.

DETAILED DESCRIPTION OF THE PREFERRED EMBODIMENTS

Hereinafter, preferred embodiments of the present invention will be described in detail with reference to the accompanying drawings. Note that the following description is meant to be merely illustrative, and should not be construed to restrict the scope of the present invention, applications thereof, or purposes thereof.

A stator according to a preferred embodiment of the present invention is provided with a supporting structure arranged to allow wiring members connected with coil wire terminals to be attached to and removed from the stator. Examples of such wiring members include, for example, a passage-line busbar arranged to connect a plurality of coils belonging to the same phase in series with each other, and a common busbar arranged to function as a neutral point.

Hereinafter, preferred embodiments of the present invention will be described in detail with reference to an example in which the wiring members preferably are passage-line busbars (a first preferred embodiment), and an example in which the wiring member preferably is a neutral point busbar (a second preferred embodiment).

First Preferred Embodiment

Figure 2:
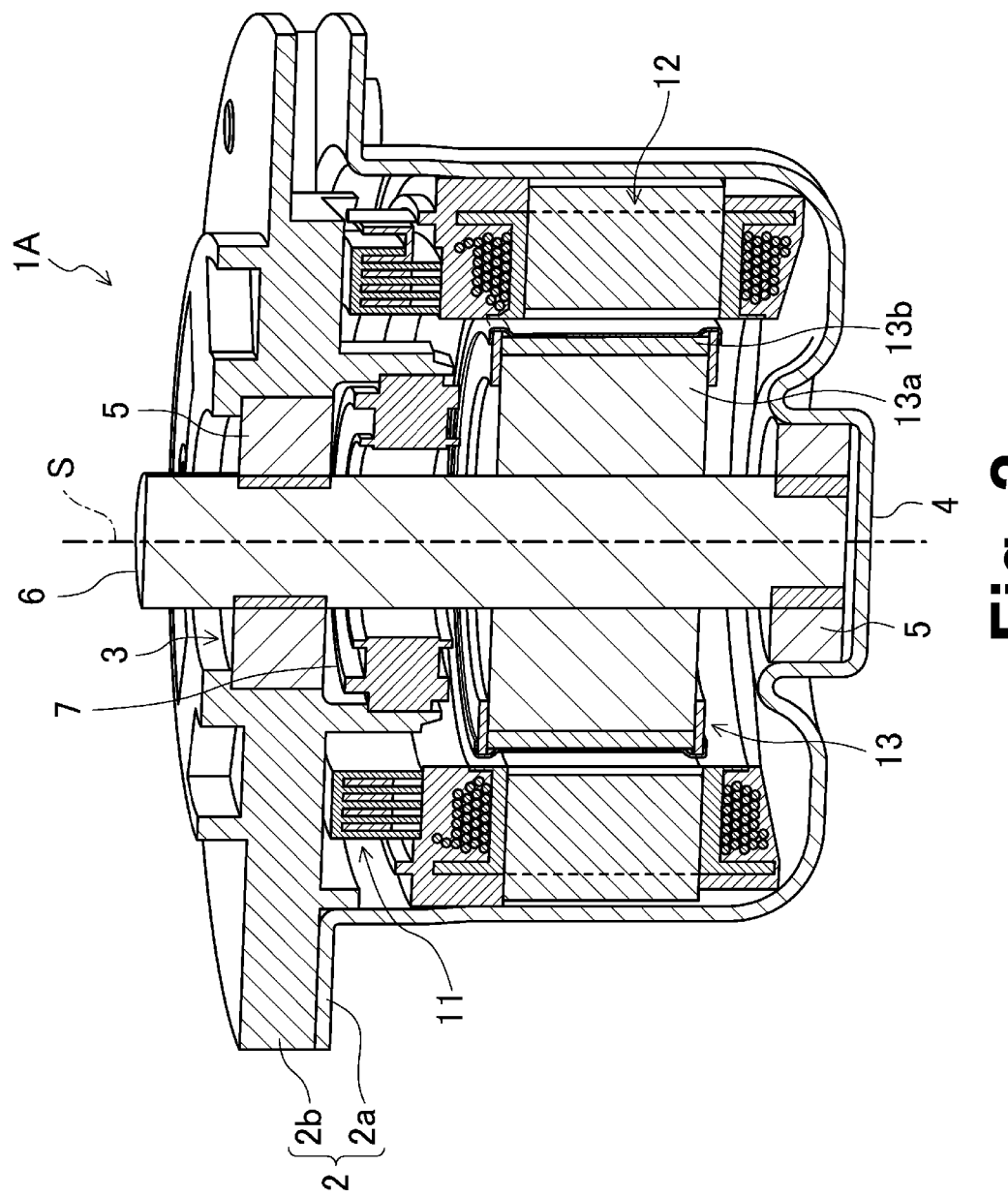
FIG. 2 is a schematic cross-sectional view of a motor according to a first preferred embodiment of the present invention.

FIG. 2 illustrates a motor 1A according to a first preferred embodiment of the present invention. The motor 1A preferably is an inner-rotor brushless motor to be installed in a vehicle, and is preferably used to drive an electric power steering, for example. In particular, the motor 1A has an ability to switch between parallel connection and series-parallel connection, using the same stator. This is accomplished by attaching the passage-line busbars to the stator or removing the passage-line busbars from the stator when assembling the motor 1A.

Referring to FIG. 2, the motor 1A preferably includes a casing 2, a busbar unit 11, a stator 12, a rotor 13, a shaft 6, and so on. A center of each of the rotor 13, the stator 12, and the busbar unit 11 coincides with a center S (i.e., a rotation axis of the motor 1A) of the shaft 6.

The casing 2 preferably includes a receptacle 2a which includes a bottom and is substantially cylindrical, and a substantially disc-shaped lid 2b. The lid 2b is preferably secured to a flange of the receptacle 2a. The flange of the receptacle 2a is arranged to project radially outward around a circumference of an opening of the receptacle 2a. The stator 12 and so on are contained inside the receptacle 2a. A through hole 3 is defined in a central portion of the lid 2b. A bearing portion 4 is defined at a central portion of a bottom surface of the receptacle 2a.

Bearings 5 are preferably arranged in the bearing portion 4 and inside the through hole 3. The shaft 6 is supported through the bearings 5 to be rotatable with respect to the casing 2. One end portion of the shaft 6 is arranged to project outward from the lid 2b through the through hole 3. The end portion of the shaft 6 is preferably connected to the electric power steering through a speed reducer (not shown), for example.

The rotor 13 is preferably fixed to a middle portion of the shaft 6 such that the rotor 13 and the shaft 6 are coaxial with each other. The rotor 13 preferably includes a substantially cylindrical rotor core 13a, a magnet 13b, and so on. The magnet 13b is arranged on an outer circumferential surface of the rotor core 13a. The magnet 13b includes north and south poles arranged alternately in a circumferential direction. Note that the magnet 13b may alternatively be arranged inside the rotor core 13a, as long as the magnet 13b is arranged near an outer circumference of the rotor core 13a. The stator 12 of the motor 1A according to the first preferred embodiment is compatible with different numbers of magnetic poles. Therefore, the number of magnetic poles of the rotor 13 may be set to eight, fourteen, and so on, for example.

The stator 12, which is substantially cylindrical, is fixed to an inner circumferential surface of the receptacle 2a, and is arranged to surround the rotor 13. An inner circumferential surface of the stator 12 and an outer circumferential surface of the rotor 13 are arranged opposite each other with a slight gap therebetween. The busbar unit 11 is attached to an end portion of the stator 12. In FIG. 2, reference numeral "7" indicates a rotation angle sensor arranged to detect a rotation angle.

Figure 3:
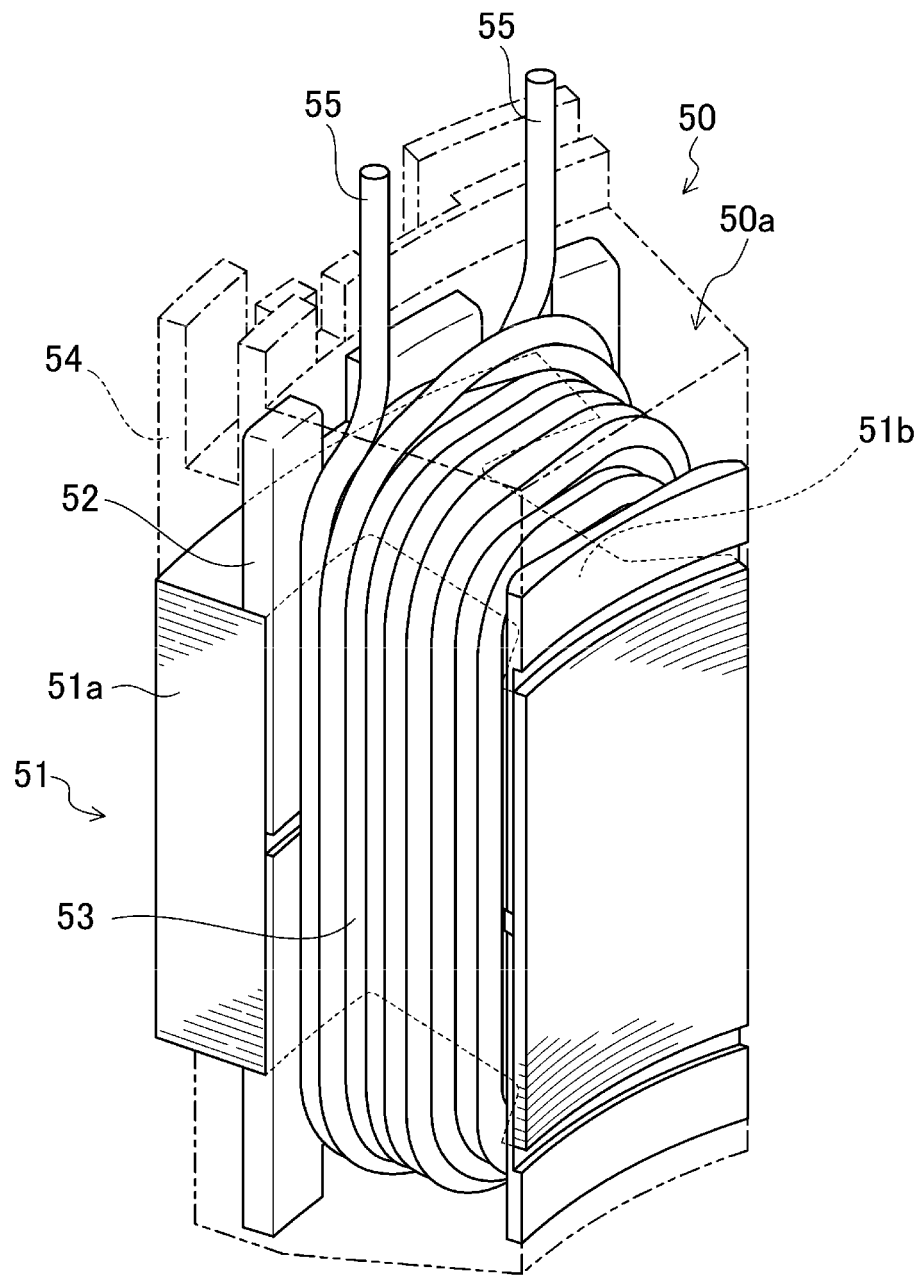
FIG. 3 is a schematic perspective view illustrating an internal structure of a stator segment according to the first preferred embodiment of the present invention.
Figure 4:
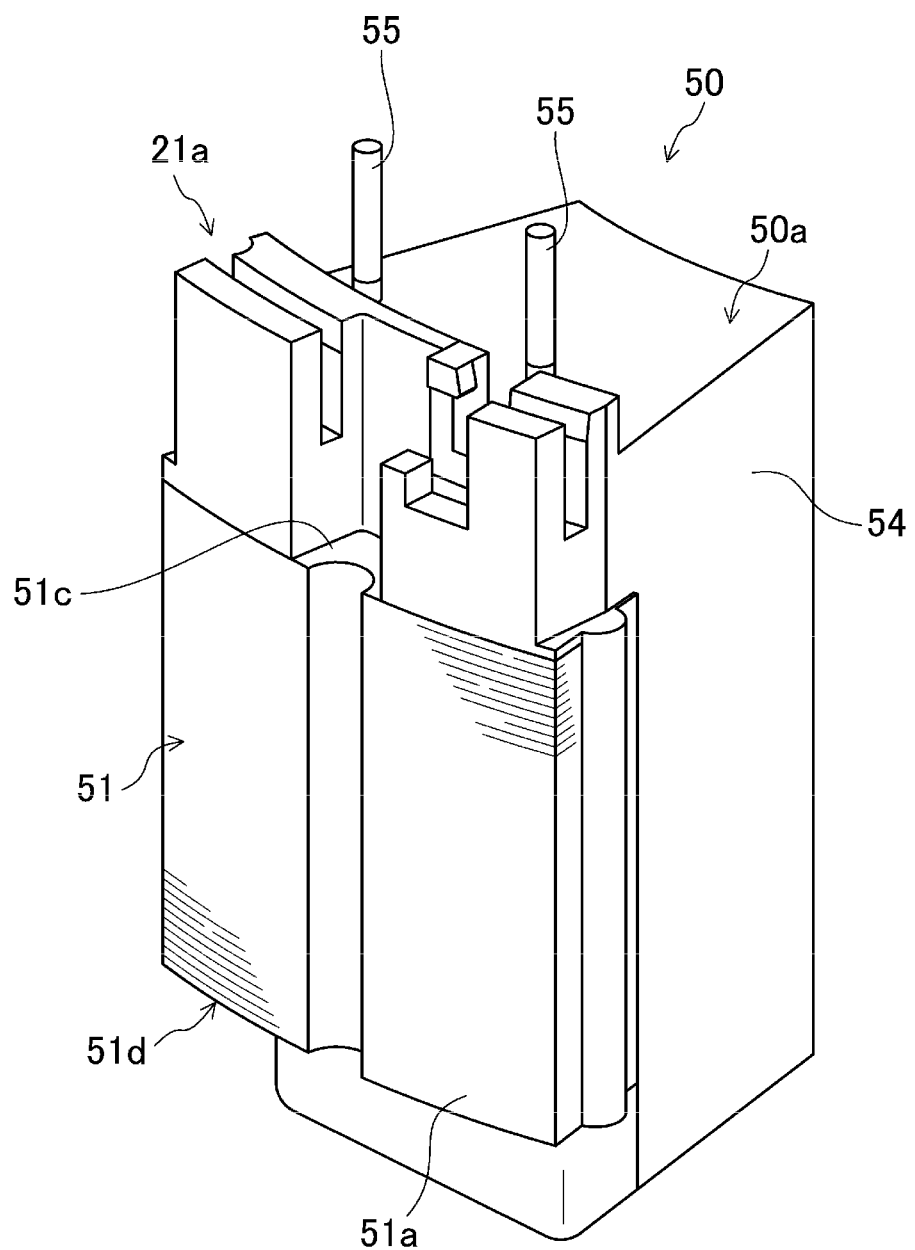
FIG. 4 is a schematic perspective view of the stator segment according to the first preferred embodiment of the present invention.

The stator 12 preferably includes a plurality of (for example, preferably twelve in the first preferred embodiment) stator segments 50 joined together. Referring to FIGS. 3 and 4, each stator segment 50 preferably includes a core segment 51, insulators 52, a coil 53, and a resin layer 54. Specifically, the core segment 51 is preferably defined by, for example, laminated steel sheets each of which is substantially in the shape of the letter "T". The core segment 51 preferably includes a core back portion 51a, a tooth portion 51b, and so on. The core back portion 51a of each core segment 51 is joined to the core back portions 51a of other core segments 51. The core back portion 51a preferably has a cross section substantially in the shape of a minor arc. The tooth portion 51b is preferably arranged to extend from a substantial middle portion of the core back portion 51a toward the center S. The insulators 52 (i.e., an insulating layer) are attached to the core segment 51.

Each coil 53 is defined by a conductor wire, such as, for example, an enamel-coated copper wire, wound around the tooth portion 51b of a separate one of the core segments 51 with the insulators 52 attached thereto. That is, the number of coils 53 is preferably twelve, for example, in the first preferred embodiment. Slots (i.e., gaps) are defined between adjacent ones of the tooth portions 51b in the stator 12, and the conductor wires of the coils 53 are accommodated in the slots. The coil 53 of each stator segment 50 preferably has the same winding direction.

Both end portions (hereinafter also referred to as coil wire terminals 55) of the conductor wire wound around the tooth portion 51b are drawn out through the same end portion (i.e., an end portion facing the opening of the receptacle 2a, and hereinafter also referred to as an opening-side end portion 50a) of the stator segment 50. The coil wire terminals 55 are arranged to extend in parallel or substantially in parallel with the shaft 6 when arranged in the motor 1A. Note that the coil wire terminals 55 are drawn out from each stator segment 50. Therefore, a total of twenty-four coil wire terminals 55 are preferably drawn out from the stator 12 according to the first preferred embodiment.

Each coil 53, except for top portions of the two coil wire terminals 55, is preferably buried in the resin layer 54, which is preferably defined by, for example, a molding process. A base portion of each coil wire terminal 55 is held by the resin layer 54, so that the coil wire terminals 55 are positioned at predetermined positions. Moreover, the base portion of the coil wire terminal 55 being buried in the resin layer 54 makes the top portion of the coil wire terminal 55, which is arranged to project out above the resin layer 54, unlikely to bend. This enables the top portion of each coil wire terminal 55 to be stably held so as to extend substantially in a straight line.

A wiring groove segment 21a (i.e., a supporting structure segment) is preferably defined in an end surface of the resin layer 54 which faces the opening-side end portion 50a. The wiring groove segment 21a is capable of accommodating a passage-line busbar 24, which will be described below. In more detail, the wiring groove segment 21a is arranged to extend in or substantially in a circular arc along the core back portion 51a. When the stator segments 50 are joined together, the wiring groove segments 21a of adjacent ones of the stator segments 50 are joined to each other to define an annular or substantially annular wiring groove 21 extending in a circumferential direction of the stator 12. The coil wire terminals 55 are arranged in the circumferential direction of the stator 12 along the wiring groove 21.

Figure 5:
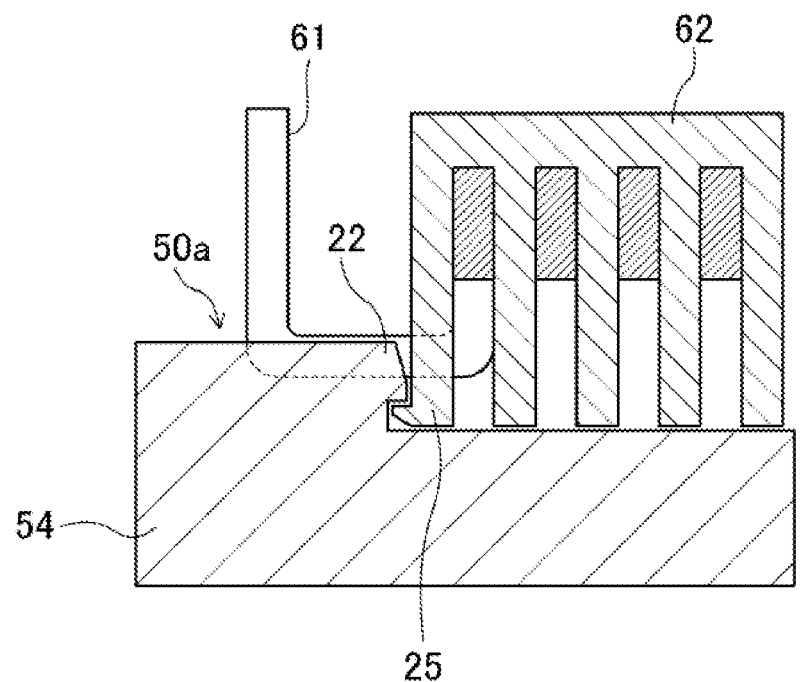
FIG. 5 is a schematic cross-sectional view illustrating a portion of the motor according to the first preferred embodiment of the present invention.
Figure 6:
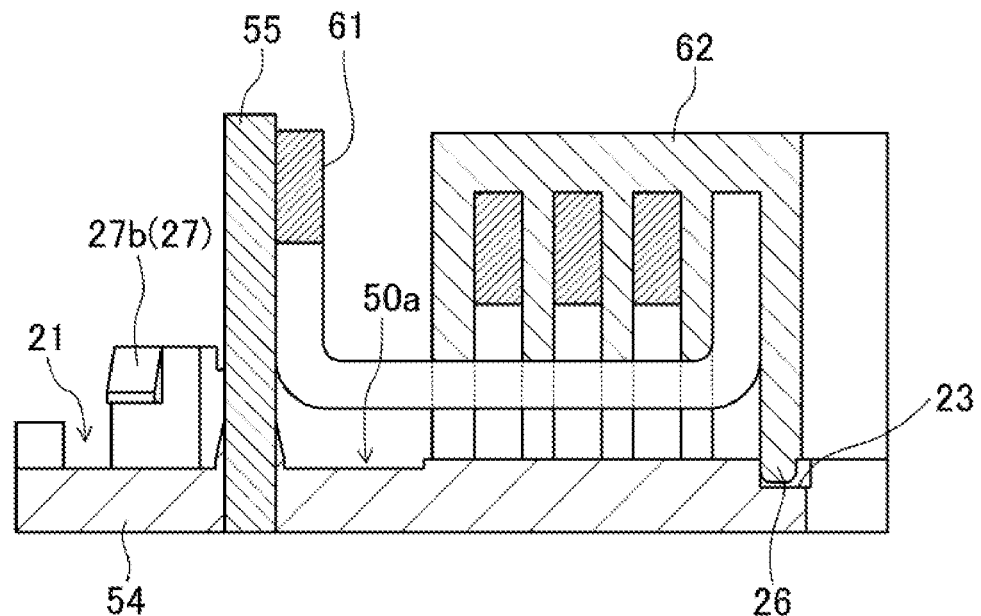
FIG. 6 is a schematic cross-sectional view illustrating a portion of the motor according to the first preferred embodiment of the present invention.

A first fixing portion 22 arranged to fix an adapter 62, which will be described below, is preferably defined in the resin layer 54. Referring to FIG. 5, the first fixing portion 22 according to the first preferred embodiment is preferably arranged to project radially inward from a predetermined portion of the resin layer 54 which faces the opening-side end portion 50a. In addition, a first positioning portion 23 arranged to circumferentially position the adapter 62 is also preferably defined in the resin layer 54. Referring to FIG. 6, the first positioning portion 23 according to the first preferred embodiment is defined by a recess defined at a predetermined portion of the end surface of the resin layer 54 which faces the opening-side end portion 50a. Note that the first fixing portion 22 and a second fixing portion 25 are not shown in FIGS. 3, 4, 8, and 9.

Figure 7:
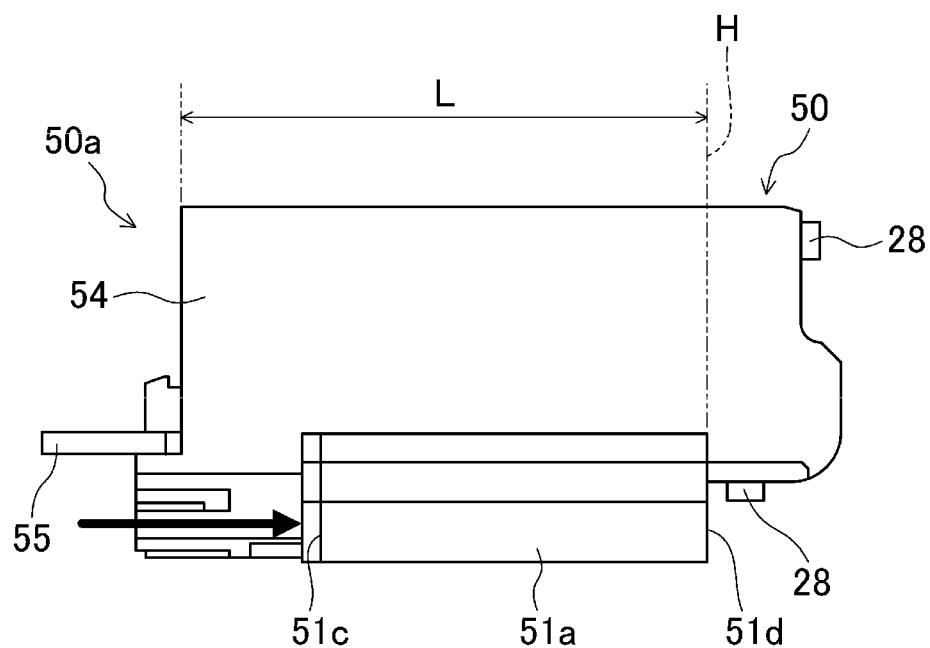
FIG. 7 is a diagram for explaining a process of defining a resin layer according to the first preferred embodiment of the present invention.

Referring to FIG. 4, a first core exposure portion 51c, where a portion (specifically, a middle portion in a longitudinal direction) of the core back portion 51a is exposed, is preferably arranged in the opening-side end portion 50a of the stator segment 50. A second core exposure portion 51d, where a large portion of the core back portion 51a is exposed, is preferably arranged in an end portion of the stator segment 50 opposite to the opening-side end portion 50a. Referring to FIG. 7, when the resin layer 54 is molded, the second core exposure portion 51d is received by a reference surface H of a mold. Then, the first core exposure portion 51c is pressed toward the reference surface H as indicated by an arrow in FIG. 7. The core segment 51 and so on are preferably held by the mold with the first core exposure portion 51c and the second core exposure portion 51d sandwiched by different portions of the mold. A gate is preferably arranged on a side closer to the second core exposure portion 51d. Therefore, a gate mark 28 is defined in the end portion of the stator segment 50 opposite to the opening-side end portion 50a.

The busbar unit 11 is arranged on the end surface of the resin layer 54 which faces the opening-side end portion 50a. Therefore, it is necessary to ensure a sufficient accuracy of a distance L between the end surface of the resin layer 54 which faces the opening-side end portion 50a and the second core exposure portion 51d of each stator segment 50 to allow the end surfaces of the resin layers 54 of all the stator segments 50 to be flush with one another when the stator segments 50 have been joined together. The sufficient accuracy of the distance L between the end surface of the resin layer 54 which faces the opening-side end portion 50a and the second core exposure portion 51d is ensured by holding the first core exposure portion 51c and the second core exposure portion 51d in the above-described manner when molding the resin layer 54, even when the stator segments 50 are mass-produced.

Figure 8:
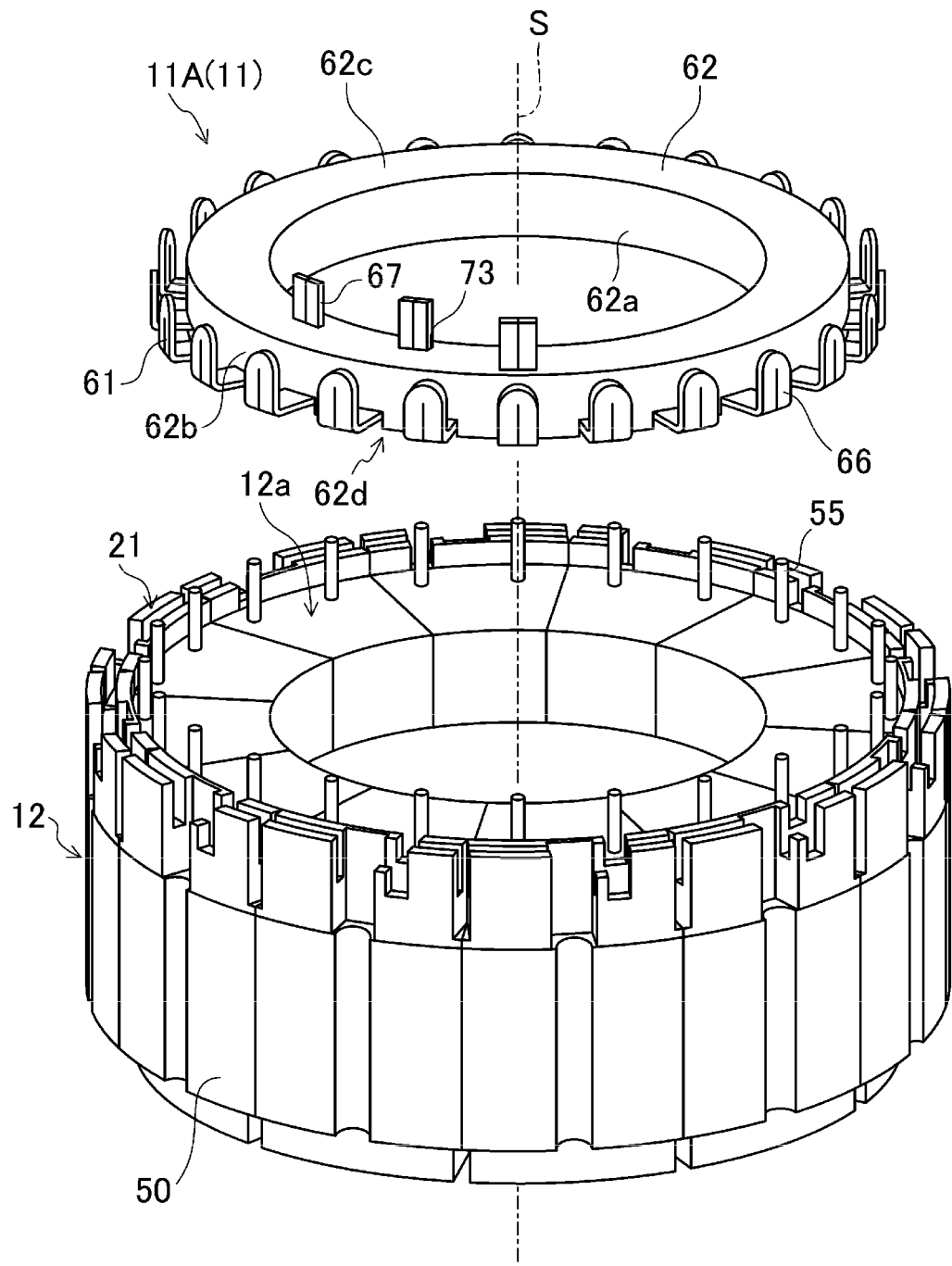
FIG. 8 is a schematic perspective view illustrating attachment of a busbar unit to a stator in the case of the parallel connection, according to the first preferred embodiment of the present invention.
Figure 9:
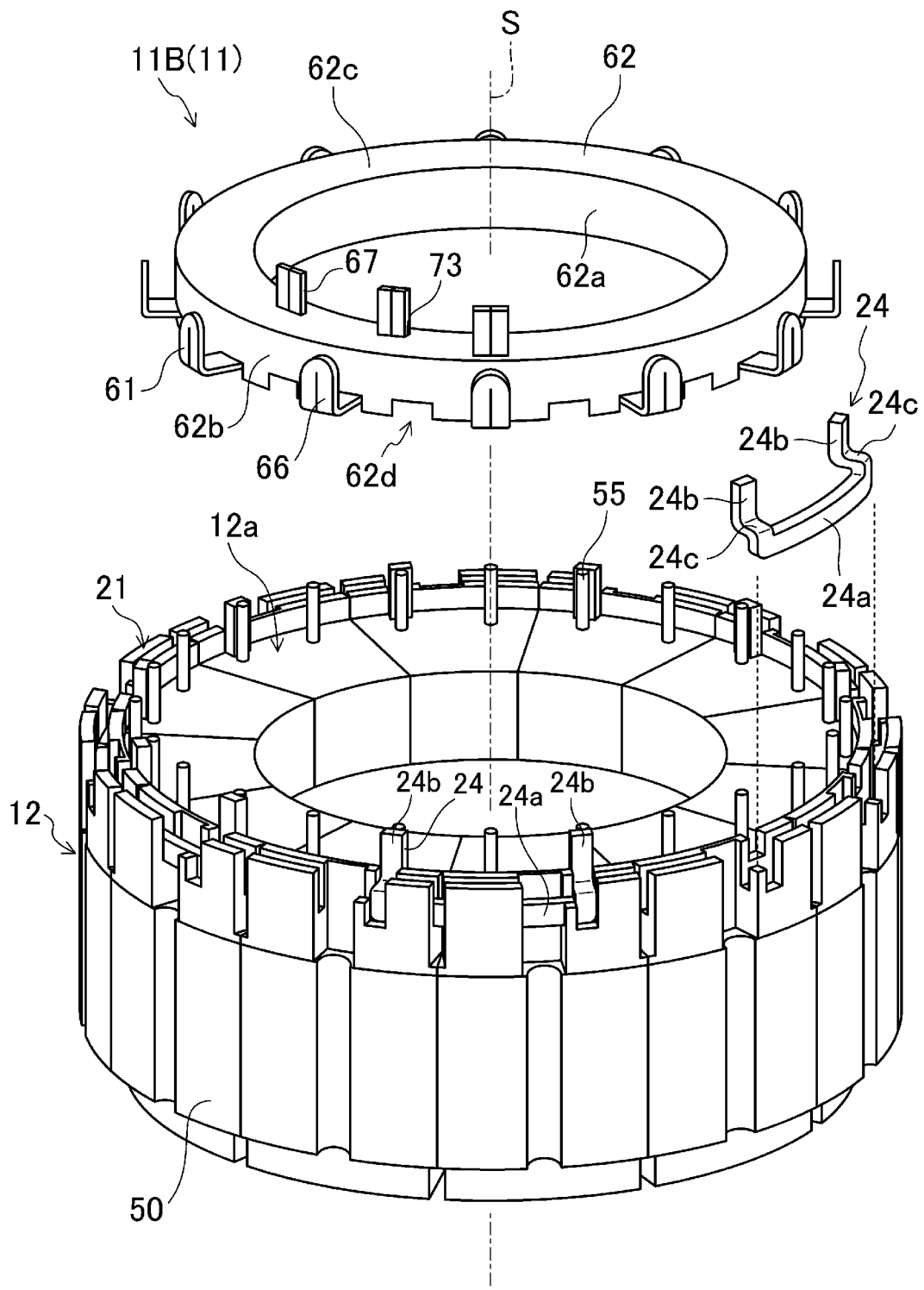
FIG. 9 is a schematic perspective view illustrating attachment of a busbar unit and passage-line busbars to the stator in the case of the series-parallel connection, according to the first preferred embodiment of the present invention.

Referring to FIGS. 8 and 9, the busbar unit 11 and the passage-line busbars 24 are preferably attached to an end portion (i.e., an end portion facing the opening of the receptacle 2a, and hereinafter referred to also as an opening-side end portion 12a) of the stator 12 through which the coil wire terminals 55 are drawn out.

The motor 1A according to the first preferred embodiment is preferably configured such that the coils 53 can be connected either according to the parallel connection (i.e., a first connection state) or according to the series-parallel connection (i.e., a second connection state). FIG. 8 illustrates a case where the coils 53 are connected according to the parallel connection, whereas FIG. 9 illustrates a case where the coils 53 are connected according to the series-parallel connection.

Figure 10:
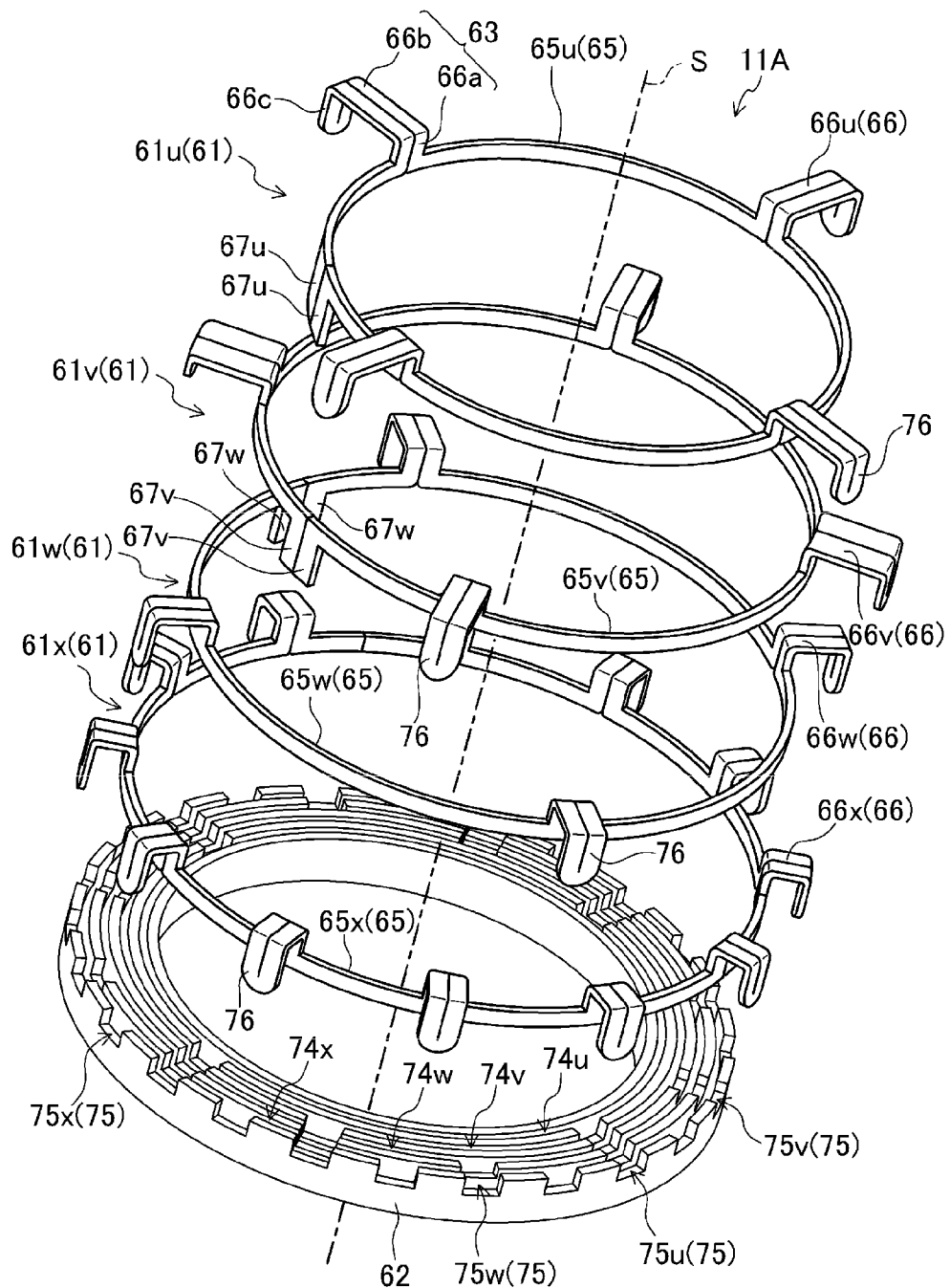
FIG. 10 is a schematic exploded perspective view of the busbar unit according to the first preferred embodiment of the present invention.
Figure 11:
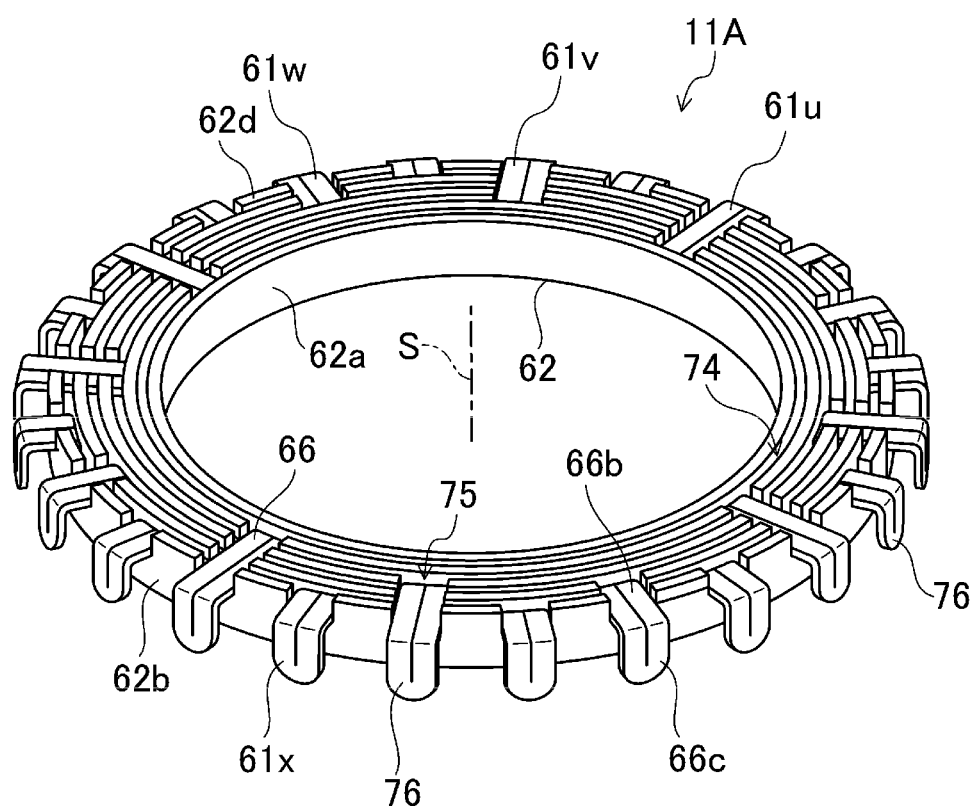
FIG. 11 is a schematic perspective view of the busbar unit according to the first preferred embodiment of the present invention, with a rear end surface of the busbar unit facing upward.

A busbar unit 11A (see FIG. 8 and so on) dedicated to the parallel connection or a busbar unit 11B (see FIG. 9 and so on) dedicated to the series-parallel connection is preferably used as the busbar unit 11 of the motor 1A depending on whether the parallel connection is desired or whether the series-parallel connection is desired. The busbar unit 11 includes a plurality of (for example, preferably four in the first preferred embodiment) busbars 61 and the adapter 62, which has an insulating property and is arranged to support the busbars 61. Details of the busbar unit 11A, which is used in the case where the parallel connection is adopted, are illustrated in FIGS. 10 and 11, for example.

The busbars 61 according to the first preferred embodiment preferably include three phase busbars 61u, 61v, and 61w and a common busbar 61x. The phase busbars 61u, 61v, and 61w are connected to a U phase, a V phase, and a W phase of the stator 12, respectively. The common busbar 61x is connected to the neutral point. That is, the coils 53 according to the first preferred embodiment are connected in a Y configuration.

Each of the busbars 61 preferably is a belt-shaped conductor having the same or substantially the same thickness in its entirety. The busbar 61 preferably includes a body portion 65 shaped like a long and narrow band plate, and a plurality of terminal portions 66 each shaped like a band plate. The body portion 65 is preferably bent in a thickness direction to assume a substantially annular shape (or alternatively the shape of the letter "C"). Each of the terminal portions 66 is preferably defined integrally with the body portion 65 as a single monolithic member, for example. In the first preferred embodiment, body portions 65u, 65v, and 65w of the phase busbars 61u, 61v, and 61w, respectively, are provided with four terminal portions 66u, 66v, and 66w, respectively, while a body portion 65x of the common busbar 61x is provided with twelve terminal portions 66x. Hereinafter, the suffixes "u", "v", "w", and "x" will be omitted unless the U phase, the V phase, the W phase, and the common needs to be discriminated from one another for the sake of description. For example, each of the phase busbars 61u, 61v, and 61w, and the common busbar 61x may be referred to simply as the busbar 61.

Note that busbars 61 which are used in the case of the series-parallel connection are provided with different numbers of terminal portions 66 from those of the terminal portions 66 provided in the busbars 61 which are used in the case of the parallel connection. In the case of the series-parallel connection, each of the phase busbars 61 is preferably provided with two terminal portions 66, while the common busbar 61x is preferably provided with six terminal portions 66x, for example. The shape and other characteristics of the busbars 61 used in the case of the series-parallel connection are otherwise similar to those of the busbars 61 used in the case of the parallel connection.

The phase busbars 61u, 61v, and 61w are additionally provided with two connection end portions 67u, 67v, and 67w, respectively, each of which is shaped like a band plate and defined integrally with the body portion 65. Note that the two connection end portions 67u, 67v, or 67w may be joined together into one body. Each of the connection end portions 67 preferably has a rectangular shape or a substantially rectangular shape, for example. In addition, the connection end portions 67 are arranged to extend from both ends of the body portion 65 in the same direction perpendicular or substantially perpendicular to the body portion 65. The connection end portions 67 are arranged on an opposite side of the body portion 65 with respect to the terminal portions 66.

Each of the terminal portions 66 (66u, 66v, 66w, and 66x) is preferably hook-shaped, and arranged at a predetermined position on a side end of the body portion 65. Each terminal portion 66 includes a terminal overhang portion 63 and a terminal top portion 66c. The terminal overhang portion 63 is arranged to project sideways from a predetermined portion of the body portion 65 which is longitudinally away from the connection end portions 67. The terminal top portion 66c is arranged to extend continuously from a top of the terminal overhang portion 63. In more detail, the terminal overhang portion 63 preferably includes a terminal base portion 66a, which has a relatively small length, and a terminal middle portion 66b. The terminal base portion 66a is arranged to project sideways from a predetermined portion of the side end of the body portion 65 to extend in a direction perpendicular or substantially perpendicular to the body portion 65. The terminal middle portion 66b is preferably continuous with a top of the terminal base portion 66a, and is preferably arranged to bend radially outward from the top of the terminal base portion 66a to extend in a direction perpendicular or substantially perpendicular to the terminal base portion 66a. The terminal top portion 66c is preferably continuous with the terminal middle portion 66b, and is preferably arranged to bend therefrom to a side opposed to the body portion 65 to extend in a direction perpendicular or substantially perpendicular to the terminal middle portion 66b.

The busbar 61 can be produced by bending an in-process material stamped out of a metal sheet (press working), for example. In the first preferred embodiment, however, the busbar 61 is preferably produced by processing a single bare electric wire (e.g., a bare copper wire 68) without an insulating coating.

Figure 12A:
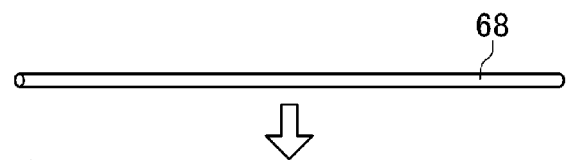
FIGS. 12A, 12B, 12C, 12D, and 12E are schematic diagrams illustrating a busbar and a procedure for manufacturing the busbar according to the first preferred embodiment of the present invention.

FIGS. 12A, 12B, 12C, 12D, and 12E illustrate a procedure for manufacturing the busbar 61 in accordance with a preferred embodiment of the present invention. First, as illustrated in FIG. 12A, the bare copper wire 68 (i.e., a wire) having a predetermined length is prepared. A general-purpose bare copper wire may be used as the bare copper wire 68. For example, a bare copper wire having a diameter of about 2 mm, for example, may be used as the bare copper wire 68.

Figure 12B:
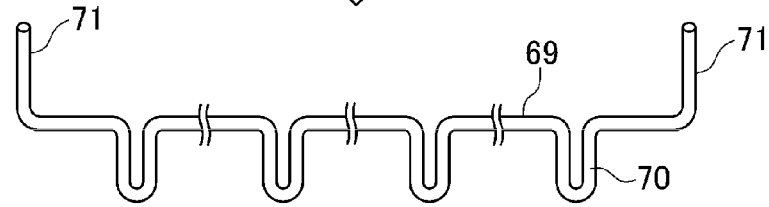

Next, as illustrated in FIG. 12B, the bare copper wire 68 is bent to define body defining portions 69, terminal defining portions 70, and connection end defining portions 71. The body defining portions 69 are to define the body portion 65. The terminal defining portions 70 are to define the terminal portions 66. The connection end defining portions 71 are to define the connection end portions 67. Specifically, each terminal defining portion 70 is defined by bending the bare copper wire 68 at a predetermined middle portion thereof so that two portions of the bare copper wire 68 on both sides of the bend are essentially arranged to extend in parallel or substantially in parallel and at close proximity with each other, and then bending the two portions of the bare copper wire 68 by an angle of, for example, about 90 degrees in mutually opposite directions at positions a predetermined distance away from the aforementioned bend.

The body defining portions 69 and the terminal defining portions 70 are preferably defined one after another by bending the bare copper wire 68, so that a plurality (for example, preferably four in the case of each of the phase busbars 61, and preferably twelve in the case of the common busbar 61x) of terminal defining portions 70 are defined and arranged to project sideways in a direction perpendicular or substantially perpendicular to the body defining portions 69 extending in a straight line or substantially in a straight line. Each of the terminal defining portions 70 is defined on the same side of the body defining portions 69. The connection end defining portions 71 are defined by bending both end portions of the bare copper wire 68 by an angle of about 90 degrees to an opposite side of the body defining portions 69 with respect to the terminal defining portions 70. The terminal defining portions 70 and the connection end defining portions 71 are arranged to be flush or substantially flush with one another, and extend in parallel or substantially in parallel with one another. Note that, in the case of the common busbar 61x, no connection end defining portions 71 are defined because the common busbar 61x is not provided with any connection end portion 67.

Figure 12C:
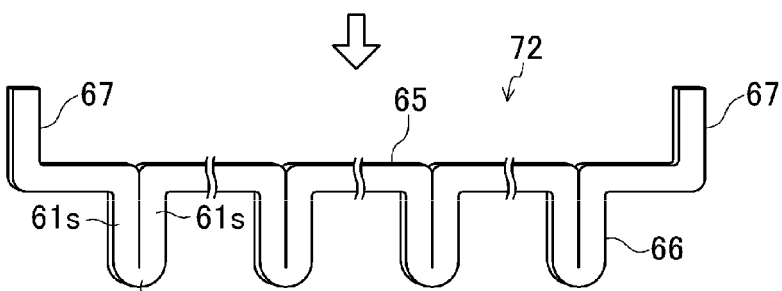

Next, as illustrated in FIG. 12C, the entire bare copper wire 68 with the terminal defining portions 70 and so on defined therein is rolled, i.e., pressed from directions perpendicular to the directions in which the bare copper wire 68 has been bent, to define an in-process material 72. The in-process material 72, which is preferably shaped like a band plate and has a shape in accordance with a predetermined development, is obtained by rolling the entire bare copper wire 68. If the in-process material 72 having the above-described shape was produced by stamping a metal sheet, a large amount of scrap metal would result after the stamping. The present method of rolling the entire bare copper wire 68, however, does not produce any scrap metal, making it possible to mass-produce the in-process materials 72 with a yield of 100% or about 100%.

As a result of the rolling of the single bare copper wire 68, each of the body defining portions 69 and the connection end defining portions 71 assumes the shape of a band plate and has the same or substantially the same width. The body portion 65 and the connection end portions 67 are thus defined. Meanwhile, as a result of the rolling of the bare copper wire 68, two portions of each terminal defining portion 70 which are arranged to extend in parallel or substantially in parallel with each other are united into a single body, so that the terminal portion 66, having a large width, is defined.

In more detail, a pair of portions (hereinafter referred to as "elongated portions 61s") each of which is shaped like a band plate and, as a result of the rolling, has the same or substantially the same width as that of the body portion 65 or the like are arranged to project sideways from the body portion 65 in abutment with each other. Each of the pair of elongated portions 61s is continuous with and integrally defined with a top portion (hereinafter referred to as a "top portion 61t") which is defined by a turning portion of the bare copper wire 68 rolled substantially into the shape of the letter "U". The pair of elongated portions 61s and the top portion 61t may preferably be united into a single monolithic body as a result of deformation by the rolling. The pair of elongated portions 61s defines the terminal overhang portion 63. The top portion 61t defines the terminal top portion 66c.

Figure 12D:
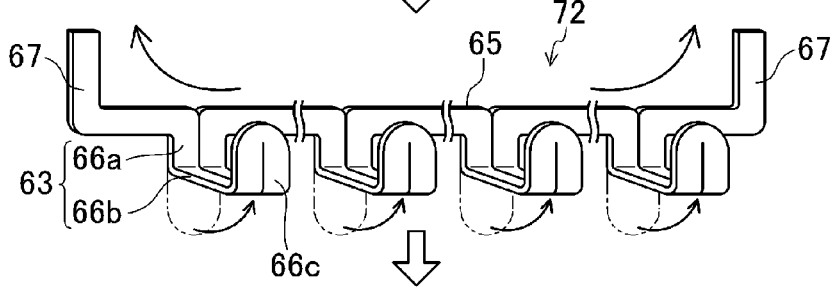
Figure 12E:
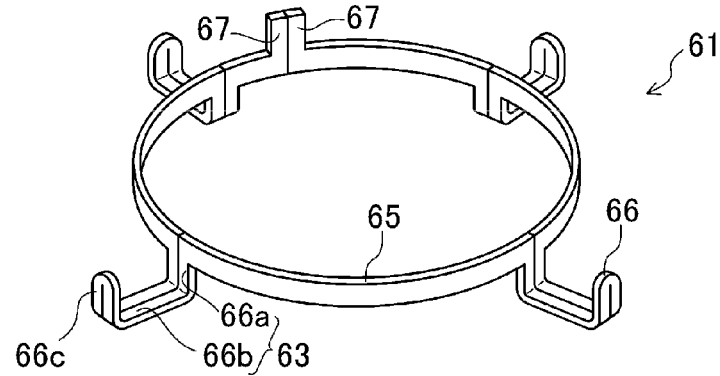

Finally, as illustrated in FIG. 12D, the in-process material 72 is bent at predetermined portions thereof to complete the busbar. Specifically, a base portion of each terminal portion 66 is bent by an angle of about 90 degrees to define the terminal base portion 66a. Further, a middle portion of each terminal portion 66 is bent by an angle of about 90 degrees to define the terminal middle portion 66b and the terminal top portion 66c. Furthermore, the body portion 65 is bent in the thickness direction to bring the two connection end portions 67 (or, in the case of the common busbar 61x, both end portions of the body portion 65) into abutment with each other, so that the body portion 65 assumes an annular or a substantially annular shape as illustrated in FIG. 12E.

The terminal defining portions 70 of different ones of the phase busbars 61 are preferably arranged to have different lengths. The terminal base portion 66a is arranged to have the same length in each of the phase busbars 61. The terminal top portion 66c is also arranged to have the same length in each of the phase busbars 61. As a result, the terminal middle portion 66b is arranged to have a predetermined length which is different in each of the phase busbars 61. Moreover, the body defining portions 69 are arranged to have a different total length in each of the phase busbars 61. The body portion 65 is accordingly arranged to have a different diameter in each of the phase busbars 61.

According to the first preferred embodiment, each terminal defining portion 70 of the common busbar 61x is arranged to have a smaller length than that of the terminal defining portion 70 of any of the phase busbars 61. The terminal base portion 66a is arranged to have the same length in both of the phase busbars 61 and the common busbar 61x. The terminal top portion 66c is also arranged to have the same length in both of the phase busbars 61 and the common busbar 61x. The terminal middle portion 66b of the common busbar 61x is arranged to have a smaller length than that of the terminal middle portion 66b of any of the phase busbars 61. The number of terminal portions 66 provided in the common busbar 61x is greater than the number of terminal portions 66 provided in each of the phase busbars 61. Therefore, the relatively small length of each terminal portion 66 of the common busbar 61x contributes to a reduced quantity of the bare copper wires 68 used.

The adapter 62 is preferably an injection-molded article made of, for example, a resin material. The adapter 62 according to the first preferred embodiment is arranged in an annular or substantially annular shape in accordance with the shape of the stator 12. The adapter 62 is compatible with both the parallel connection and the series-parallel connection. The adapter 62 preferably has a cross section in a substantially rectangular shape.

Referring to FIGS. 8, 9, and 11, the adapter 62 preferably includes an inner circumferential surface 62a, an outer circumferential surface 62b, and a pair of opposed surfaces defined by a front end surface 62c and a rear end surface 62d. The inner circumferential surface 62a and the outer circumferential surface 62b are arranged to be concentric or substantially concentric with and opposed to each other. The pair of the front end surface 62c and the rear end surface 62d are opposed to each other, and each of the front end surface 62c and the rear end surface 62d is arranged to be continuous with edges of both the inner circumferential surface 62a and the outer circumferential surface 62b. The front end surface 62c of the adapter 62 preferably includes, for example, three terminal holes 73 defined therein. The connection end portions 67 of the respective phase busbars 61 are arranged to project through the terminal holes 73. The rear end surface 62d of the adapter 62 preferably includes a plurality of (for example, preferably four in the first preferred embodiment) body support grooves 74 and a plurality of (for example, preferably twenty-four in the first preferred embodiment) terminal support grooves 75 defined therein. Note that, in the case of the series-parallel connection, the number of terminal support grooves 75 may preferably be twelve, for example.

As also illustrated in FIGS. 13, 14A, 14B, 14C, and 14D, each of the body support grooves 74 is a groove preferably having an annular or substantially annular shape, and the body support grooves 74 are arranged one radially inside another to be substantially concentric with one another. The width of each body support groove 74 is preferably slightly greater than the thickness of the body portion 65 of the busbar. In the first preferred embodiment, first, second, and third body support grooves 74u, 74v, and 74w are arranged on a radial inside to receive the body portions 65 of the three phase busbars 61, while a fourth body support groove 74x is arranged radially outward of the first, second, and third body support grooves 74u, 74v, and 74w to receive the body portion 65x of the common busbar 61x. Each of the first to fourth body support grooves 74u, 74v, 74w, and 74x preferably has the same or substantially the same depth.

Each of the terminal support grooves 75 is arranged to extend in a radial direction to cross the body support groove(s) 74. The terminal support grooves 75 are arranged in a radial configuration. The width of each terminal support groove 75 is slightly greater than the width of the terminal portion 66 of the busbar. The terminal support grooves 75 are preferably arranged at twenty-four positions equally or substantially equally spaced from one another in the circumferential direction, for example. The terminal support grooves 75 according to the first preferred embodiment preferably are made up of first, second, third, and fourth terminal support grooves 75u, 75v, 75w, and 75x, which are arranged to extend continuously from the first to fourth body support grooves 74u, 74v, 74w, and 74x, respectively.

The fourth terminal support grooves 75x are preferably arranged at twelve positions equally or substantially equally spaced from one another in the circumferential direction, for example. Each of the first to third terminal support grooves 75u, 75v, and 75w is preferably arranged between a separate pair of adjacent fourth terminal support grooves 75x. The first to third terminal support grooves 75u, 75v, and 75w are preferably arranged, for example, in this order in a counterclockwise direction: the first terminal support groove 75u, the second terminal support groove 75v, and the third terminal support groove 75w. Each of the first to fourth terminal support grooves 75u, 75v, 75w, and 75x has the same or substantially the same depth.

The first, second, third, and fourth terminal support grooves 75u, 75v, 75w, and 75x have mutually different lengths. Specifically, each of the first to fourth terminal support grooves 75u, 75v, 75w, and 75x has an end opening in the outer circumferential surface 62b of the adapter 62. An opposite end of each of the fourth terminal support grooves 75x is arranged to open into the fourth body support groove 74x, while opposite ends of the first to third terminal support grooves 75u, 75v, and 75w are arranged to open into the first to third body support grooves 74u, 74v, and 74w, respectively.

The body portion 65 and the terminal base portions 66a of each busbar 61 are arranged in a separate one of the body support grooves 74 such that the body portions 65 of the busbars 61 are nested. The terminal middle portions 66b of the terminal portions 66 are arranged individually in the terminal support grooves 75. The terminal top portions 66c are arranged to be radially opposite the outer circumferential surface 62b of the adapter 62, because the terminal top portions 66c are arranged to be radially opposed to the body portion 65.

Referring to FIG. 14A, the depth D2 of each terminal support groove 75 is preferably greater than the thickness t of each terminal portion 66. This enables the terminal portion 66 to be sufficiently embedded in the adapter 62 to prevent the busbar 61 from projecting above the rear end surface 62d of the adapter 62. A contact of the busbar 61 with another member is thus prevented.

The depth D1 of each body support groove 74 is greater than the depth D2 of each terminal support groove 75. Moreover, a difference between the depth D1 of the body support groove 75 and the depth D2 of the terminal support groove 75 is greater than the width W of the body portion 65. The busbar 61 fitted into the body support groove 75 is preferably prevented from moving by a mechanism, such as, for example, a snap-fit mechanism, provided in the body support groove 75. Therefore, when any of the busbars 61 has been fitted into the adapter 62, each of the terminal portions 66 thereof which are arranged to pass over the body portion 65 of any other busbar 61 is restrained by the corresponding terminal support groove 75. A contact of the terminal portion 66 with the body portion 65 of any other busbar 61 is thus effectively prevented.

Figure 13:
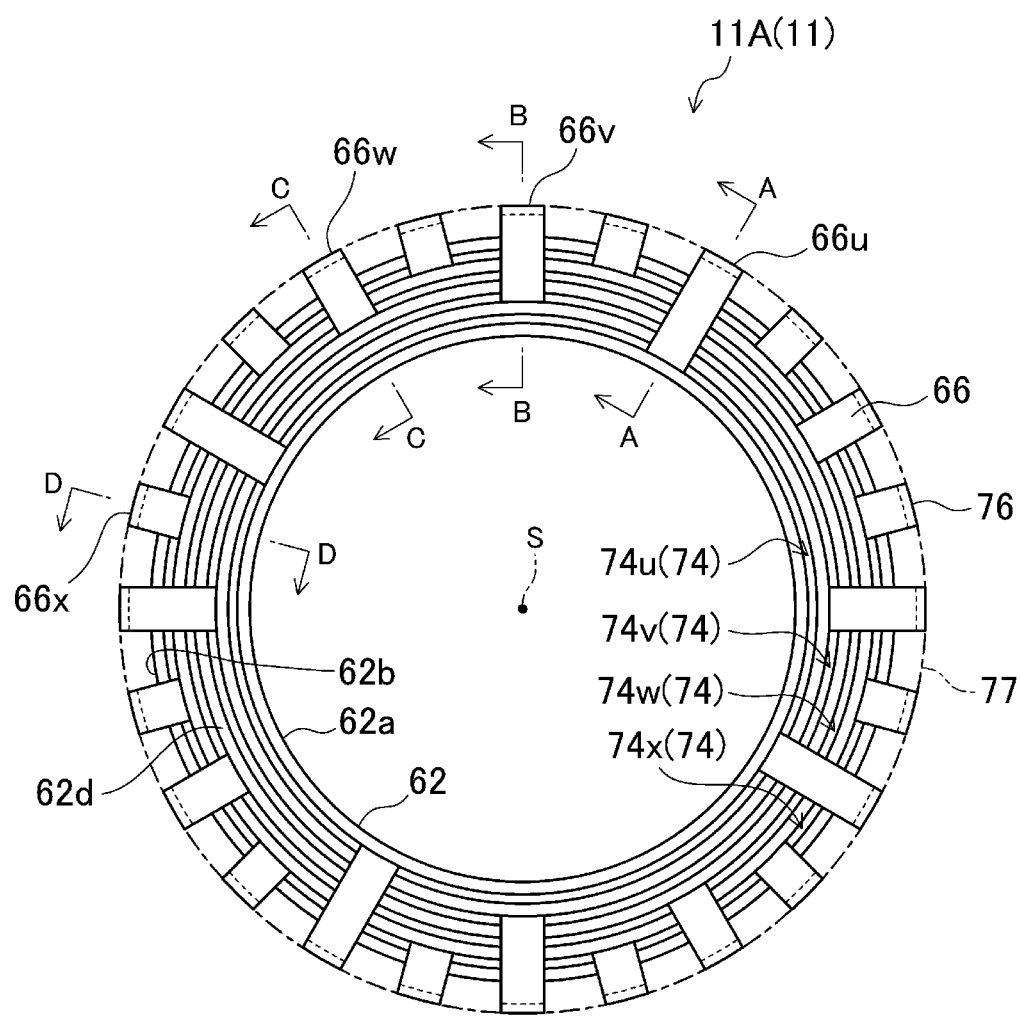
FIG. 13 is a schematic plan view of the busbar unit according to the first preferred embodiment of the present invention, with the rear end surface of the busbar unit facing upward.

Each terminal top portion 66c of each busbar 61 preferably includes a contact surface 76 facing radially outward. Referring to FIG. 13, when the busbars 61 have been fitted into the adapter 62, the contact surface 76 of each terminal top portion 66c of each busbar 61 is arranged to abut on a first imaginary circle 77, which is centered or substantially centered on the center S of the adapter 62 (i.e., the busbar unit 11). The coil wire terminals 55 are joined to the contact surfaces 76 when the busbar unit 11 is fitted to the stator 12.

Referring to FIGS. 8 and 9, the busbar unit 11 is preferably fitted to the stator 12 with the rear end surface 62d of the adapter 62 facing the opening-side end portion 12a of the stator 12. This arrangement contributes to preventing any busbar from coming off the adapter 62, and also to preventing or substantially preventing dust or dirt from entering any body support groove 74.

Referring to FIG. 5, the adapter 62 preferably includes the second fixing portion 25, which is brought into engagement with the first fixing portion 22 of the stator 12 to fix the adapter 62 to the stator 12. The second fixing portion 25 according to the first preferred embodiment is preferably hook-shaped and elastically deformable to allow the second fixing portion 25 to be engaged with the first fixing portion 22.

Referring to FIG. 6, the adapter 62 preferably includes a second positioning portion 26 which is brought into contact with the first positioning portion 23 of the stator 12 to circumferentially position the adapter 62. The second positioning portion 26 according to the first preferred embodiment is defined by a projection arranged to be embedded in the first positioning portion 23.

Each of the passage-line busbars 24 (i.e., partial wiring members) according to the first preferred embodiment is preferably used in the case of the series-parallel connection to connect the coil wire terminals 55 from two of the coils 53 which are connected in series to each other. Referring to FIG. 9, each passage-line busbar 24 preferably includes a wire body 24a shaped like a band plate, and a plurality of (for example, preferably two in the first preferred embodiment) wire terminals 24b each shaped like a band plate. The wire terminals 24b are arranged to extend orthogonally or substantially orthogonally from side edges of both end portions of the wire body 24a in parallel or substantially in parallel with each other. A base portion of each wire terminal 24b, which is continuous with the wire body 24a, includes a bend portion 24c arranged to extend at right angles or substantially right angles to both a remaining portion of the wire terminal 24b and the wire body 24a. The passage-line busbar 24 is also preferably produced either by, for example, press working or by processing a single bare copper wire.

Figure 1A:
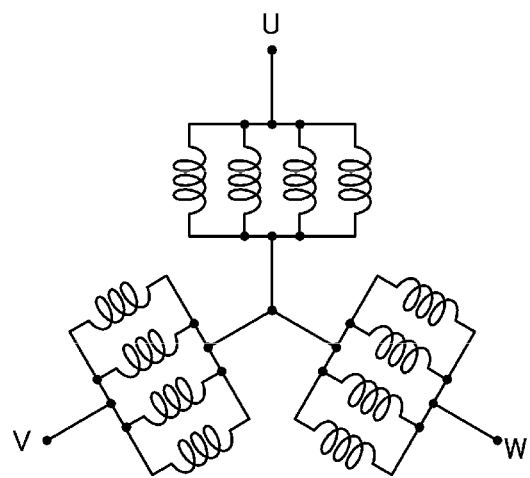
FIGS. 1A and 1B are diagrams each illustrating an example wiring configuration of a stator.
Figure 1B:
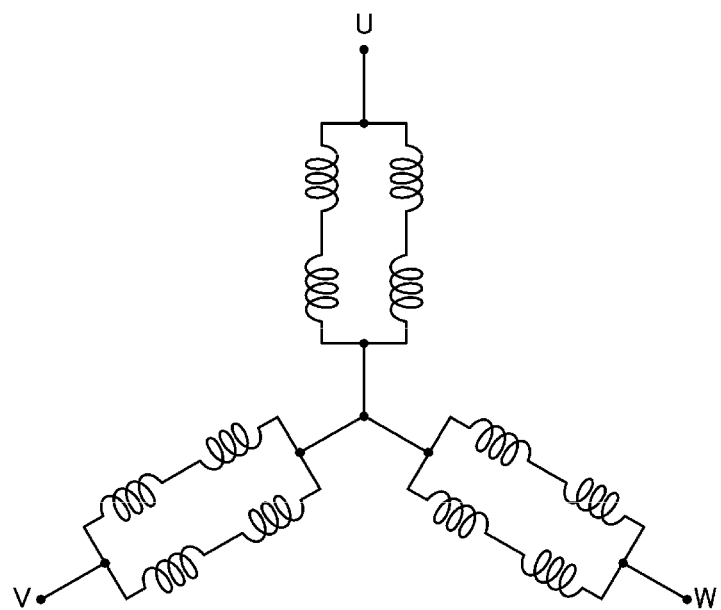

In the case of the series-parallel connection, coils 53 which have opposite winding directions may be connected in series as illustrated in FIG. 1B. It is difficult to mechanically accomplish a wiring configuration in which coils 53 which have opposite winding directions are connected in series, and this difficulty becomes a factor for decreased manufacturing efficiency. In the first preferred embodiment, the use of the passage-line busbars 24 makes it possible to accomplish the series-parallel connection using the single type of stator segments 50 having the same winding direction.

Specifically, each of the two wire terminals 24b of each passage-line busbar 24 is connected to a winding-start or winding-end one of the two coil wire terminals 55 of a separate one of two adjacent ones of the stator segments 50. While the two adjacent stator segments 50 are of the same type, and the coils 53 therein have the same winding direction, connecting the stator segments 50 in the above-described manner easily accomplishes an essential series connection of coils having opposite winding directions.

Referring to FIG. 9, according to the first preferred embodiment, in the case of the series-parallel connection, the wire bodies 24a of six of the passage-line busbars 24 are fitted into predetermined portions of the wiring groove 21, so that each of the two wire terminals 24b of each of the six passage-line busbars 24 is arranged opposite to a predetermined one of the coil wire terminals 55.

Figure 15:
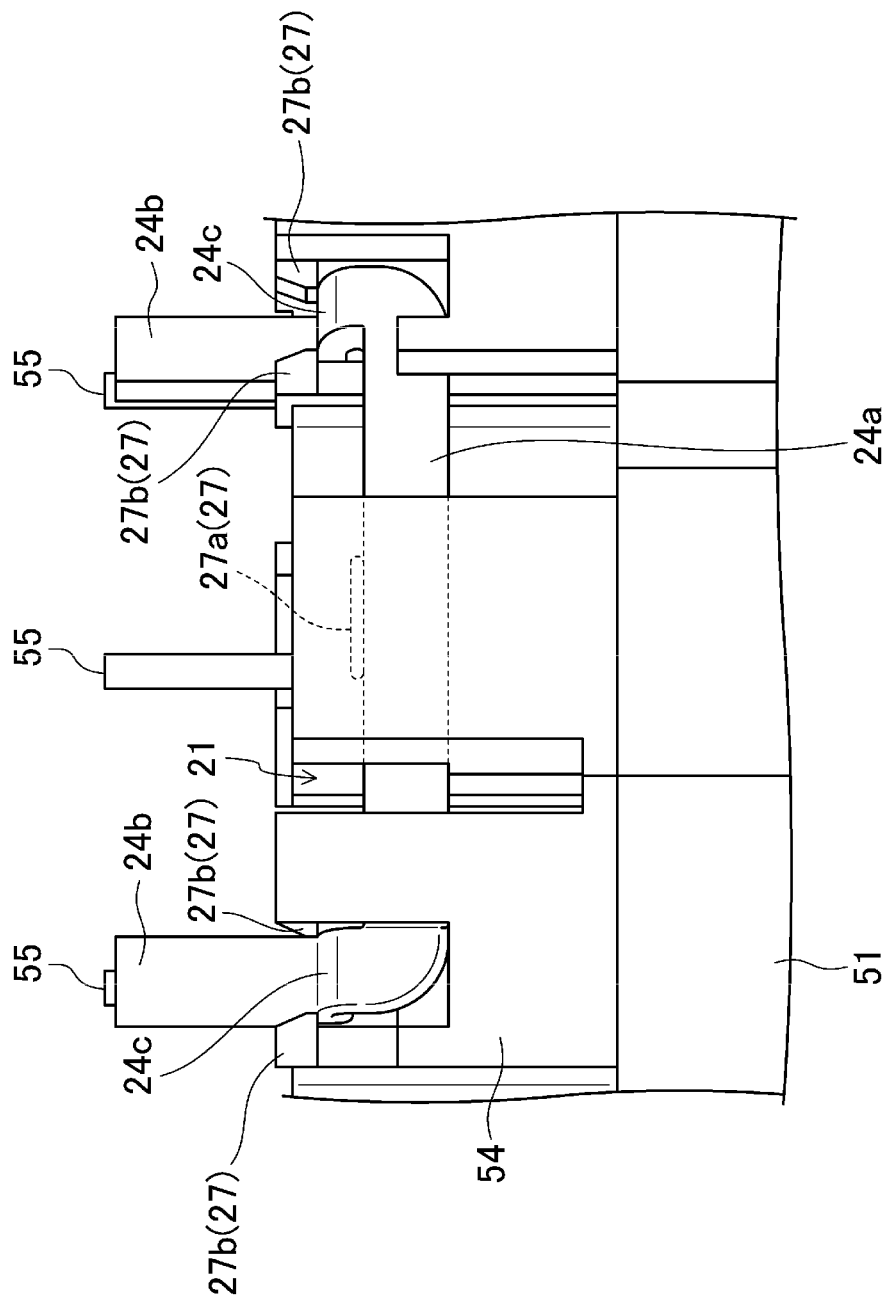
FIG. 15 is a schematic diagram illustrating a portion of the motor according to the first preferred embodiment of the present invention.

Referring to FIG. 15, the wiring groove 21 includes coming-off preventing portions 27 arranged to prevent the passage-line busbar 24 fitted to the predetermined portion of the wiring groove 21 from coming off the wiring groove 21. In more detail, the coming-off preventing portions 27 include first projecting portions 27a and second projecting portions 27b. Each first projecting portion 27a is arranged to radially project over a middle portion of the wire body 24a to prevent the wire body 24a from coming off. Each second projecting portion 27b is arranged to circumferentially project over the bend portion 24c of the wire terminal 24b to prevent the bend portion 24c from coming off.

The passage-line busbar 24 is thus easily fitted to and appropriately positioned on the stator 12 by simply pushing the passage-line busbar 24 into the predetermined portion of the wiring groove 21. Conversely, removal of the passage-line busbar 24 is easily accomplished by plucking the passage-line busbar 24 out from the stator 12.

Figure 16:
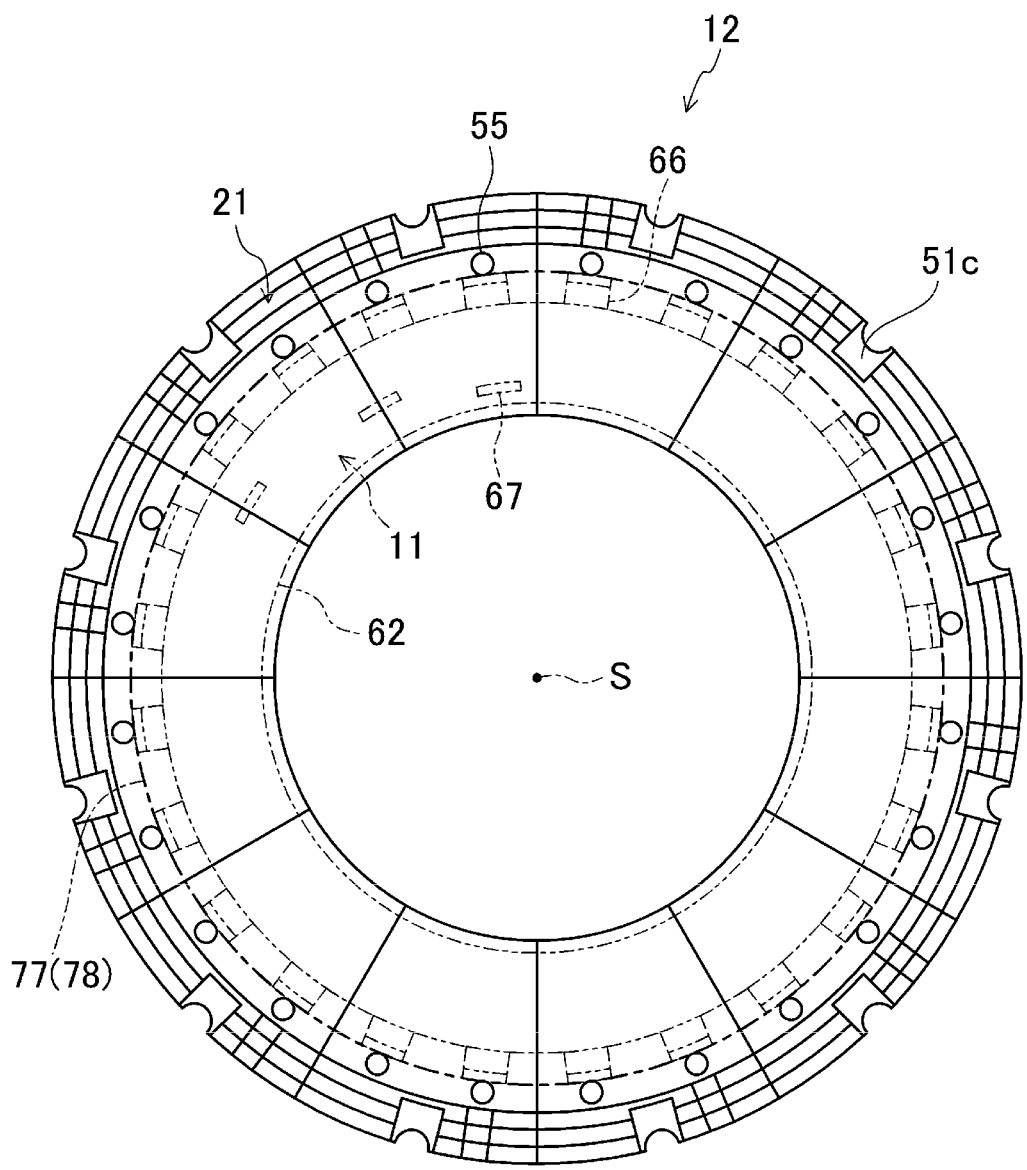
FIG. 16 is a schematic plan view of the stator according to the first preferred embodiment of the present invention.

Referring to FIG. 16, the coil wire terminals 55 are arranged at substantially regular intervals in the circumferential direction of the stator 12. In the first preferred embodiment, the number of coil wire terminals 55 is preferably twenty-four, and a central angle defined by two adjacent ones of the coil wire terminals 55 is therefore preferably about 15 degrees, for example. Note that the terminal portions 66 of the busbar unit 11 are arranged in accordance with the number of coil wire terminals 55 and the positions of the coil wire terminals 55.

Figure 17:
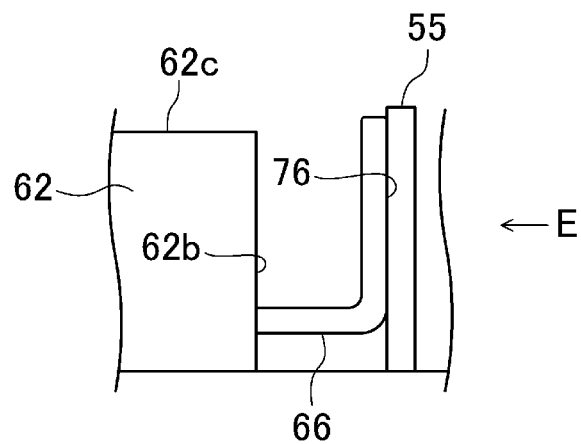
FIG. 17 is a schematic diagram illustrating a portion of the motor according to the first preferred embodiment of the present invention.

The coil wire terminals 55 are arranged radially outward of a second imaginary circle 78, which is centered on the center S of the stator 12, and arranged to abut on the second imaginary circle 78. The second imaginary circle 78 preferably has the same diameter as that of the first imaginary circle 77. Therefore, when the busbar unit 11 is attached to the stator 12 such that the busbar unit 11 and the stator 12 share the same center S, and the coil wire terminals 55 and the terminal portions 66 are properly positioned in the circumferential direction, each of the coil wire terminals 55 is arranged radially outward of the contact surface 76 of a separate one of the terminal portions 66, and arranged to abut on the contact surface 76 (or, at least, arranged to be opposed to the contact surface 76 with a slight space therebetween), as also illustrated in FIG. 17.

Figure 18:
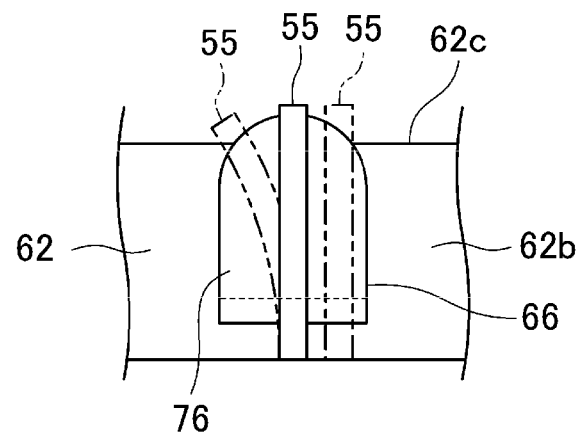
FIG. 18 is a schematic diagram illustrating a portion of the motor according to the first preferred embodiment of the present invention as viewed from a direction indicated by arrow E illustrated in FIG. 17.

Referring to FIG. 18, because the contact surface 76 is arranged to extend in the circumferential direction, the coil wire terminal 55 is arranged to be opposed to the contact surface 76 even if a slight displacement or flexing of the coil wire terminal 55 occurs. Therefore, the coil wire terminal 55 and the terminal portion 66 can preferably be securely joined to each other, and automation of the operation of joining the coil wire terminal 55 and the terminal portion 66 to each other is easy.

When the passage-line busbars 24 are attached to the stator 12, each wire terminal 24b of each of the passage-line busbars 24 is arranged radially outward of a separate one of the coil wire terminals 55, and arranged to abut on the coil wire terminal 55. Therefore, the wire terminals 24b and the corresponding coil wire terminals 55 can also be securely joined to each other, and automation of the operation of joining the wire terminals 24b and the corresponding coil wire terminals 55 to each other is also easy.

That is, it is possible to automate a series of processes for attaching the busbar unit 11 to the stator 12 when the motor 1 is manufactured. For example, after the busbars 61 are fitted onto the adapter 62 to complete the busbar unit 11, a predetermined assembly machine (not shown) may be used to arrange the busbar unit 11 on the stator 12 such that the contact surfaces 76 are arranged opposite the corresponding coil wire terminals 55 (a positioning process). For example, the busbar unit 11 and the stator 12 are arranged to share a common central axis S, and the busbar unit 11 is brought closer to the opening-side end portion 12a of the stator 12 along the central axis S up to a predetermined position. Thereafter, the busbar unit 11 and the stator 12 are turned relative to each other to properly position the coil wire terminals 55 and the terminal portions 66 in the circumferential direction. All the coil wire terminals 55 are thereby easily arranged to abut on the corresponding terminal portions 66.

Figure 19:
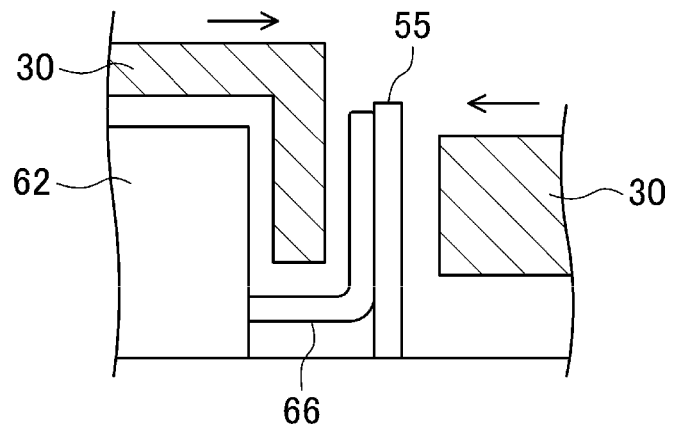
FIG. 19 is a schematic diagram for explaining a process of joining a terminal portion and a coil wire terminal to each other according to the first preferred embodiment of the present invention.

Next, referring to FIG. 19, portions of a predetermined joining machine 30 are arranged to have each terminal top portion 66c and a corresponding one of the coil wire terminals 55 sandwiched therebetween from inside and outside in the radial direction, so that the coil wire terminal 55 is pressed against the contact surface 76 of the terminal top portion 66c. Thereafter, the coil wire terminal 55 and the terminal portion 66 are preferably, for example, welded to each other through resistance welding, TIG welding, ultrasonic welding, or the like (a joining process).

The wire terminals 24b and the corresponding coil wire terminals 55 are also preferably welded to each other in a similar manner. All the coil wire terminals 55 can thus be handled collectively, leading to a reduced number of processes required and improved productivity.

Figure 20:
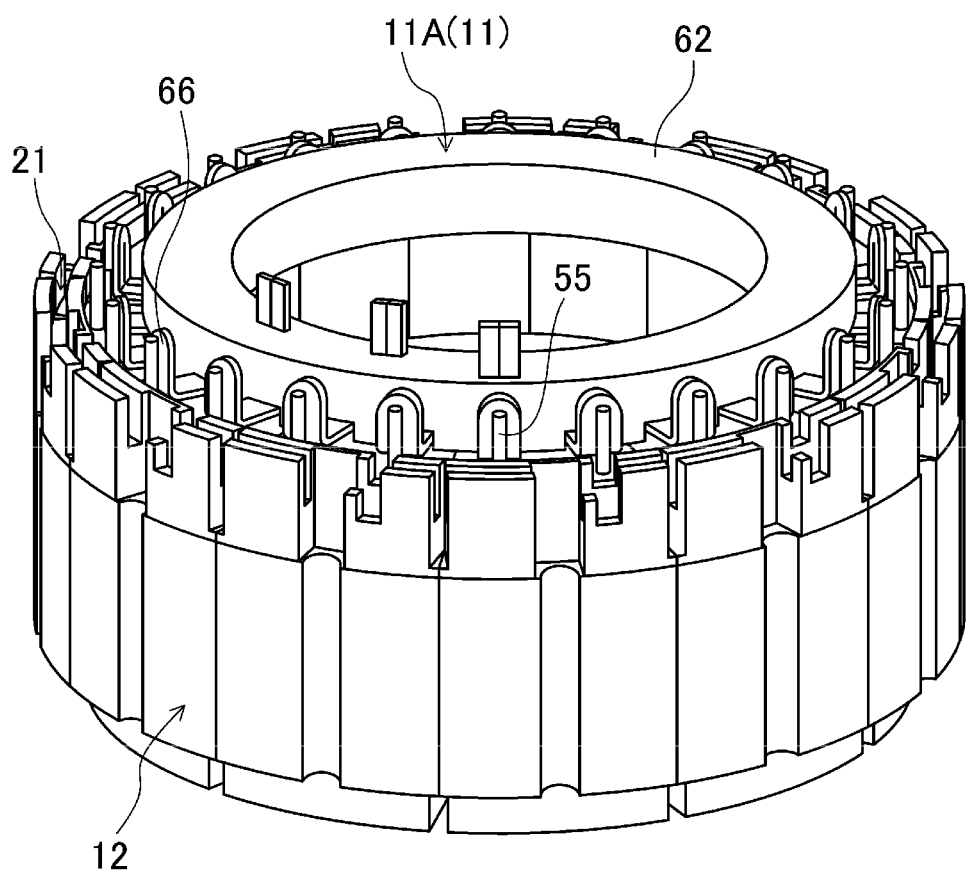
FIG. 20 is a schematic perspective view of the stator as assembled in accordance with the parallel connection, according to the first preferred embodiment of the present invention.

For instance, in the case of an 8-pole 12-slot motor, the parallel connection as illustrated in FIG. 1A may be adopted. Referring to FIG. 20, in the case of the parallel connection, the passage-line busbars 24 are removed from the stator 12, and all the coil wire terminals 55 may be connected in a predetermined combination with the terminal portions 66 of the phase busbars 61 and the common busbar 61x.

Figure 21:
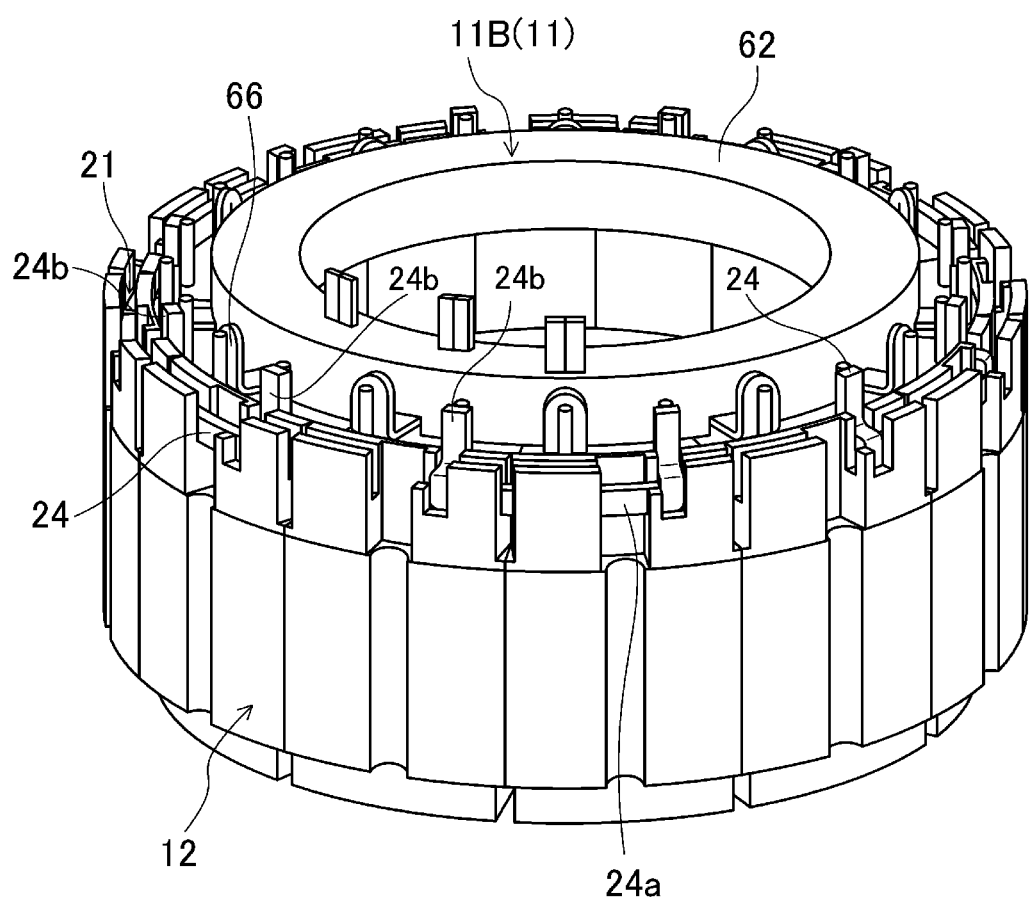
FIG. 21 is a schematic perspective view of the stator as assembled in accordance with the series-parallel connection, according to the first preferred embodiment of the present invention.

Meanwhile, in the case of a 14-pole 12-slot motor, the series-parallel connection as illustrated in FIG. 1B may be adopted. Referring to FIG. 21, in the case of the series-parallel connection, the passage-line busbars 24 are attached to predetermined portions of the stator 12, and the coil wire terminals 55 may be connected in a predetermined combination with the terminal portions 66 of the phase busbars 61 and the common busbar 61x and the wire terminals 24b of the passage-line busbars 24.

The first preferred embodiment enables the busbar unit to be easily attached to the stator such that the terminal portions of the busbars are connected with the coil wire terminals both in the case of the parallel connection and in the case of the series-parallel connection. In addition, the first preferred embodiment enables the required series of processes to be automated to achieve improved productivity.

Second Preferred Embodiment

Figure 22:
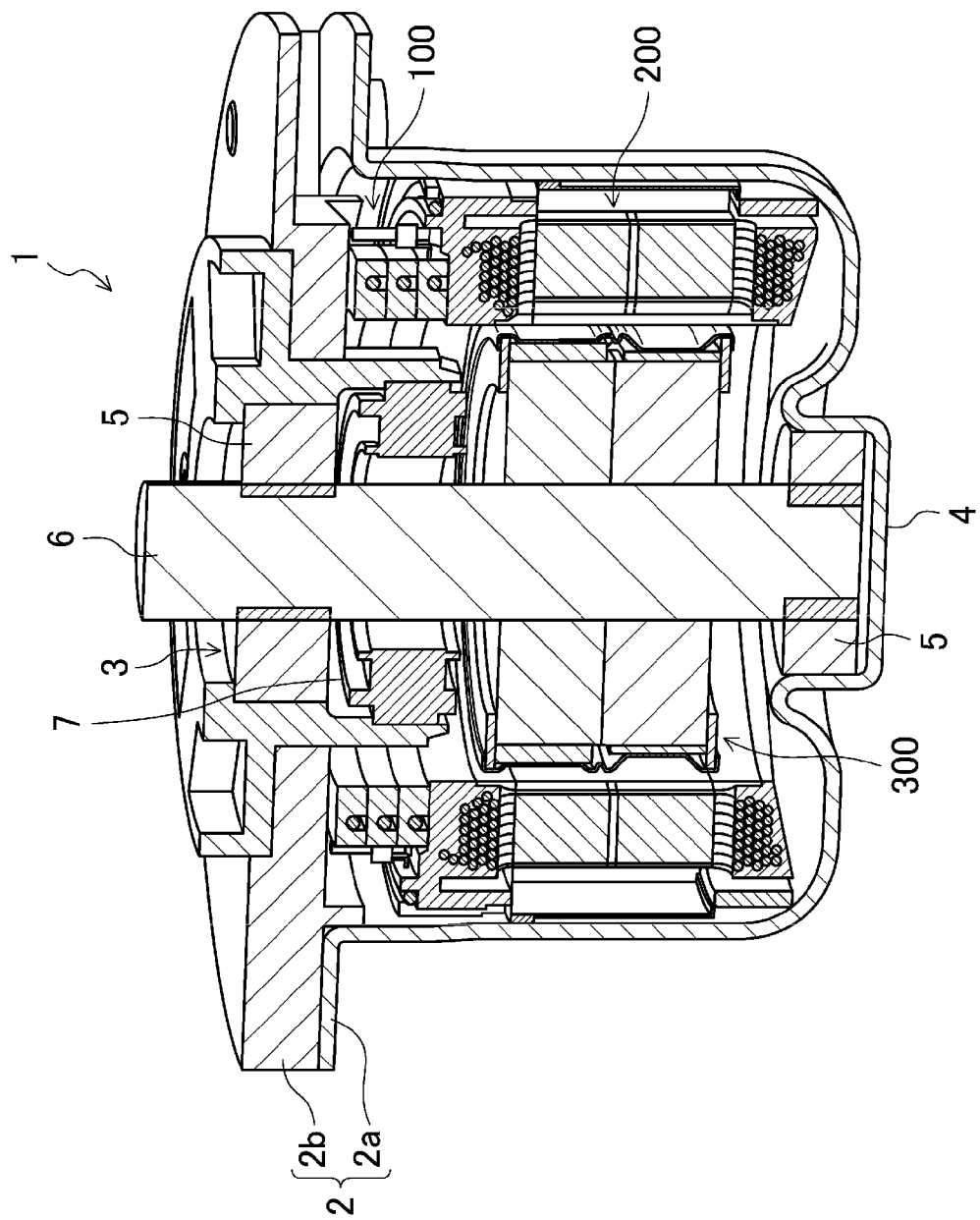
FIG. 22 is a schematic cross-sectional view of a motor according to a second preferred embodiment of the present invention.

FIG. 22 illustrates a motor 1 including a rotor 300 according to a preferred embodiment of the present invention. The motor 1 preferably is an inner-rotor brushless motor to be installed in a vehicle, and is used to drive an electric power steering, for example. As illustrated in FIG. 22, the motor 1 preferably includes a casing 2, a busbar unit 100, a stator 200, the rotor 300, a shaft 6, and so on.

The casing 2 preferably includes a receptacle 2a which has a bottom and is substantially cylindrical, and a substantially disc-shaped lid 2b. The lid 2b is preferably secured to a flange of the receptacle 2a. The flange of the receptacle 2a is preferably arranged to project radially outward around a circumference of an opening of the receptacle 2a. The stator 200 and so on are contained inside the receptacle 2a. A through hole 3 is preferably defined in a central portion of the lid 2b. A bearing portion 4 is preferably arranged on a bottom surface of the receptacle 2a to be opposed to the through hole 3. Bearings 5 are arranged in the bearing portion 4 and inside the through hole 3. The shaft 6 is supported through the bearings 5 to be rotatable with respect to the casing 2. One end portion of the shaft 6 is arranged to project outward from the lid 2b through the through hole 3. The end portion of the shaft 6 is connected to the electric power steering through a speed reducer (not shown).

The rotor 300 is fixed to a middle portion of the shaft 6 such that the rotor 300 is coaxial or substantially coaxial with the shaft 6. The stator 200 is fixed to an inner circumferential surface of the receptacle 2a such that the stator 200 surrounds the rotor 300. An inner circumferential surface of the stator 200 and an outer circumferential surface of the rotor 300 are arranged opposite each other with a slight gap therebetween so that the motor 1 can efficiently exhibit its performance. The busbar unit 100 is attached to an end portion of the stator 200. In FIG. 22, reference numeral "7" indicates a rotation angle sensor arranged to detect a rotation angle.

The motor 1 is provided with a variety of configurations in order to achieve improved productivity, reduced production cost, and so on. Details thereof will now be described below.

Figure 23:
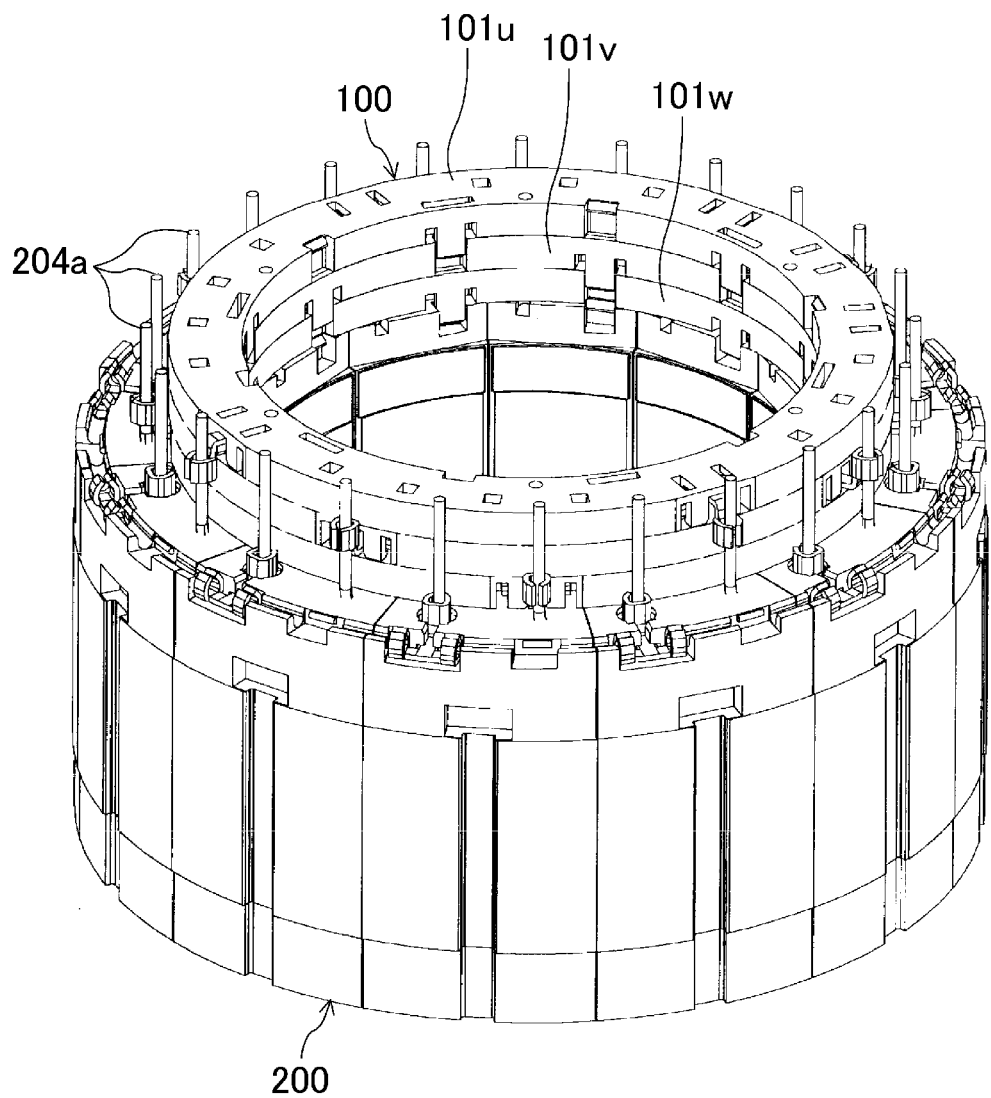
FIG. 23 is a schematic perspective view of a busbar unit and a stator according to the second preferred embodiment of the present invention.
Figure 24:
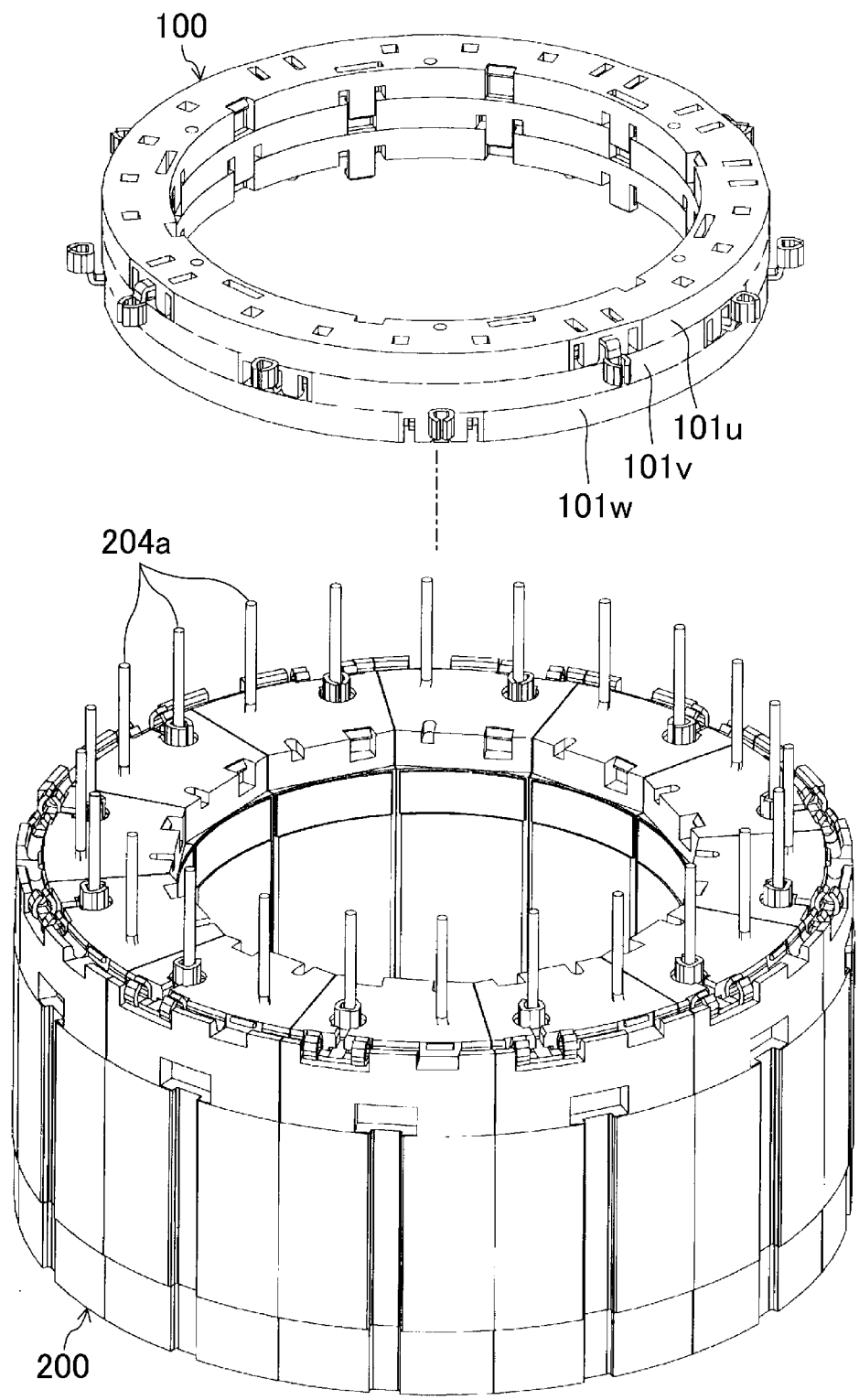
FIG. 24 is a schematic exploded perspective view of the busbar unit and the stator according to the second preferred embodiment of the present invention.

The structure of the busbar unit 100 will now be described in detail below. Referring to FIGS. 23 and 24, the busbar unit 100 is preferably arranged on an axial end portion (i.e., an upper end portion in FIG. 23) of the stator 200. The busbar unit 100 is electrically connected to a plurality of coil wire terminals 204a from the stator 200, which will be described below. The busbar unit 100 is arranged to supply currents to coils 204 of the stator 200, which will be described below.

Referring to FIGS. 25, 26, 27, 28, 29, and 30, the busbar unit 100 preferably includes holders 101u, 101v, and 101w, busbars 120, and terminal members 130. In the present preferred embodiment, the busbars 120 are preferably three in number, for example, and each of the busbars 120 is provided for a separate one of phases of the coils 204 of the stator 200, i.e., a u phase, a v phase, and a w phase. A total of three holders are preferably provided, i.e., a u-phase holder 101u, a v-phase holder 101v, and a w-phase holder 101w. Each holder is arranged to accommodate and hold a separate one of the busbars 120 independently. In addition, a plurality of terminal members 130 are connected to each busbar 120.

Figure 28:
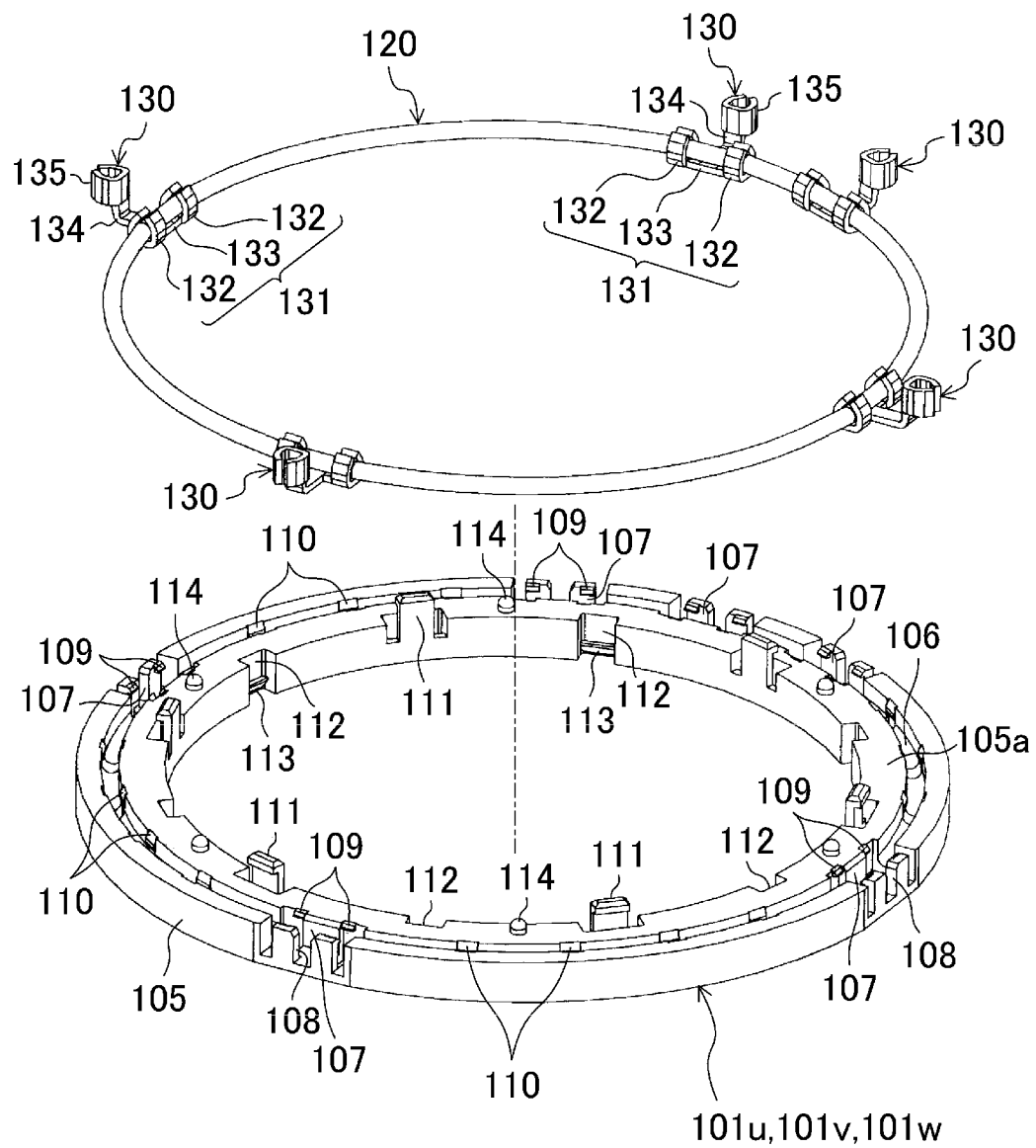
FIG. 28 is a schematic perspective view of a busbar and a holder according to the second preferred embodiment of the present invention.
Figure 29:
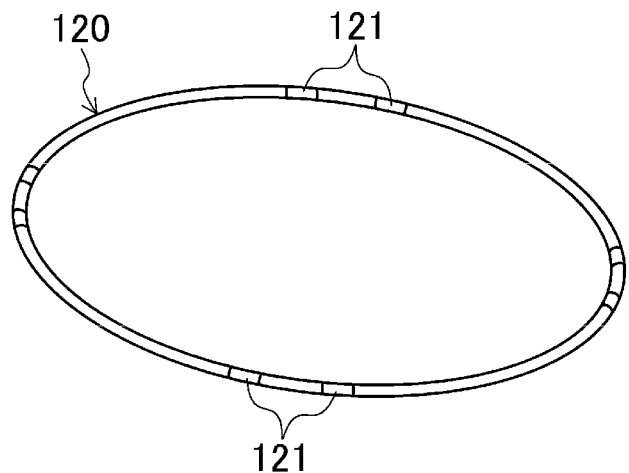
FIG. 29 is a schematic perspective view of the busbar according to the second preferred embodiment of the present invention.

Referring to FIGS. 28 and 29, each busbar 120 is preferably defined by an electrically conductive wire shaped in a ring. Specifically, each busbar 120 according to the present preferred embodiment is preferably defined by a bare electric wire (e.g., a bare copper wire) without an insulating coating. The busbar 120 preferably includes a plurality of terminal connection portions 121 arranged at predetermined positions spaced from one another in a circumferential direction. The terminal members 130 are connected to the terminal connection portions 121. Each terminal connection portion 121 of the busbar 120 is preferably deformed to have, for example, a rectangular or substantially rectangular shape in a cross-section when the terminal connection portion 121 is connected to the terminal member 130. The portions of the busbar 120 other than the terminal connection portions 121 are arranged to have a circular or substantially circular shape in a cross-section. In the present preferred embodiment, the area of a cross section of the busbar 120 is preferably greater than that of a cross section of a coil wire used for the coils 204 of the stator 200.

Note that, in the present preferred embodiment, the busbar 120 may have any shape in a cross-section, as long as the busbar 120 is defined by an electrically conductive wire. Also note that the busbar 120 may not necessarily be in the shape of a ring, but may be in the shape of the letter "C". Also note that the busbar 120 may be defined by an electrically conductive wire having an insulating coating arranged on an outer circumference thereof. In the case where the busbar 120 is defined by an electrically conductive wire having an insulating coating arranged on an outer circumference thereof, it is necessary to remove the insulating coating from the terminal connection portions 121 of the busbar 120. The removal of the insulating coating may be accomplished either by a mechanical method or by resistance welding, as long as the terminal connection portions 121 are able to achieve electrical connection with the terminal members 130.

Figure 30:
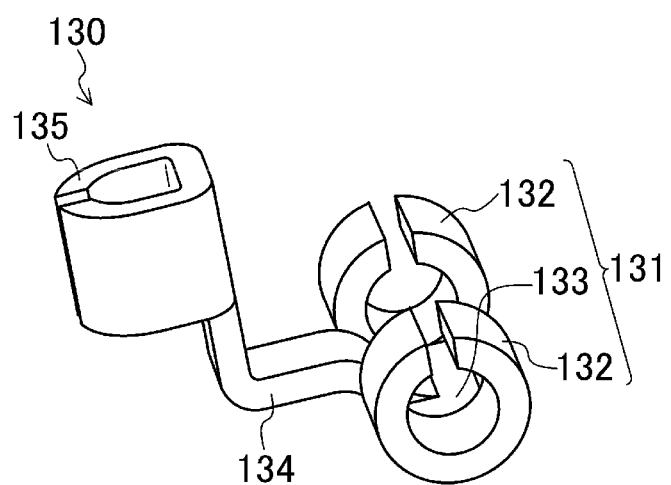
FIG. 30 is a schematic perspective view of an example terminal member according to the second preferred embodiment of the present invention.

Referring to FIG. 30, each terminal member 130 is preferably made out of a single plate material element. The terminal member 130 preferably includes a busbar connection portion 131, which is connected with the busbar 120; a coil connection portion 135, which is connected with the coil wire terminal 204a from the stator 200; and a joining portion 134, which is arranged to extend to be continuous with the busbar connection portion 131 and the coil connection portion 135.

The busbar connection portion 131 is preferably defined by two C-shaped tubular portions 132 and a plate portion 133 arranged to join end surfaces of the two C-shaped tubular portions 132 to each other. Each of the two C-shaped tubular portions 132 is a tubular portion defined by bending a plate material to assume the shape of the letter "C". The two C-shaped tubular portions 132 are arranged to be coaxial with each other. The busbar 120 is arranged to pass through the C-shaped tubular portions 132. The coil connection portion 135 is a tubular portion defined by bending a plate material to substantially assume the shape of the letter "C". The coil wire terminal 204a is arranged to pass through this tubular portion. The joining portion 134 is preferably defined by a plate material member extending from an end surface of the coil connection portion 135 to the plate portion 133 of the busbar connection portion 131. The joining portion 134 is preferably bent midway in a plate thickness direction. Specifically, the joining portion 134 is arranged to extend from the end surface of the coil connection portion 135 in an axial direction of the coil connection portion 135, and be bent in a direction perpendicular or substantially perpendicular to the axial direction of the coil connection portion 135 to extend up to the plate portion 133. The entire terminal member 130 therefore substantially assumes the shape of the letter "T" in a plan view when viewed from above in the axial direction of the coil connection portion 135, and substantially assumes the shape of the letter "L" in a plan view when viewed from above in the axial direction of the busbar connection portion 131.

Figure 31:
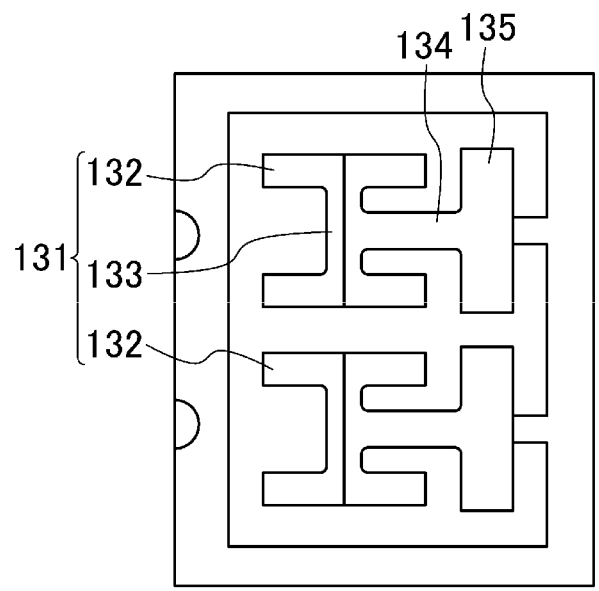
FIG. 31 illustrates a schematic development of the example terminal member according to the second preferred embodiment of the present invention.

FIG. 31 shows a preferred embodiment of a method for forming the terminal member 130. The single plate material is preferably cut in accordance with the shape of FIG. 31. The resulting plate material is then preferably subjected to a bending process to define the terminal member 130. As is apparent from FIG. 31, the terminal member 130 according to the present preferred embodiment preferably has a shape so as to achieve a high yield of the material.

Figure 32:
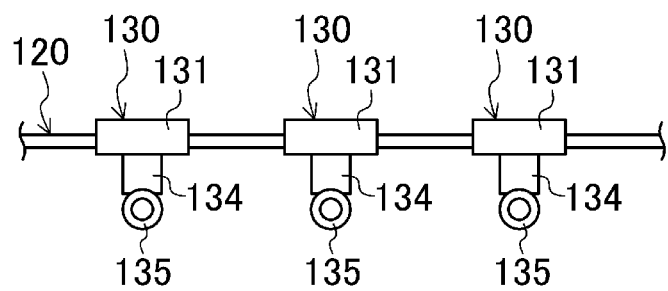
FIG. 32 is a diagram illustrating a situation in which the busbar is inserted into terminal members, according to the second preferred embodiment of the present invention.

Referring to FIG. 32, the busbar 120 is preferably inserted into the terminal members 130 before the busbar 120 is shaped into a ring. In other words, a bare electric wire shaped in a straight line is inserted into the C-shaped tubular portions 132 of the terminal members 130. The C-shaped tubular portions 132 are then crimped or welded onto the corresponding terminal connection portions 121 of the busbar 120. The busbar 120 (i.e., the bare electric wire) shaped in a straight line is thereafter shaped into a ring. As a result, the plurality of terminal members 130 are electrically connected with the busbar 120 (see FIG. 28). Note that, in the present preferred embodiment, the C-shaped tubular portions 132 of the terminal members 130 may be crimped or welded onto the corresponding terminal connection portions 121 of the busbar 120 after the busbar 120 shaped in a straight line and having the terminal members 130 attached thereto is shaped into a ring.

Each of the three holders 101u, 101v, and 101w preferably is an annular member made of an insulating material and preferably defined in one piece, and has the same configuration. Referring to FIG. 28, each of the holders 101u, 101v, and 101w preferably includes a holder body 105 in an annular shape. An annular surface 105a of the holder body 105 includes an annular accommodating groove 106 defined therein. The annular busbar 120 having the terminal members 130 connected thereto is placed and held inside the accommodating groove 106. The accommodating groove 106 includes a plurality of (for example, preferably six in the present preferred embodiment) terminal accommodating portions 107 arranged at predetermined positions spaced from one another in the circumferential direction. The terminal accommodating portions 107 are arranged to have the terminal members 130 placed and held therein. Each terminal accommodating portion 107 of the accommodating groove 106 preferably includes coming-off preventing portions 109 arranged to prevent the terminal member 130 from coming off. Other portions of the accommodating groove 106 than the terminal accommodating portions 107 preferably include a plurality of coming-off preventing portions 110 arranged to prevent the busbar 120 from coming off. The coming-off preventing portions 109 and 110 of the accommodating groove 106 are preferably defined by claws. An outer wall of the holder body 105 includes cuts 108 arranged at the terminal accommodating portions 107 to allow the joining portion 134 of each terminal member 130 to pass therethrough to project radially outward from the holder body 105.

An inner wall of the holder body 105 of each of the holders 101u, 101v, and 101w preferably includes a plurality of hooks 111 arranged at regular intervals in the circumferential direction. Specifically, each hook 111 is defined by a portion of the inner wall of the holder body 105 which is arranged to extend in an axial direction to project above the annular surface 105a of the holder body 105. The inner wall of the holder body 105 additionally preferably includes a plurality of vertical grooves 112 arranged at regular intervals in the circumferential direction and between the hooks 111. Specifically, each of the vertical grooves 112 is arranged to extend in the axial direction in the inner wall of the holder body 105. Each vertical groove 112 preferably includes a projection 113 arranged at a bottom thereof to project radially inward.

Figure 33:
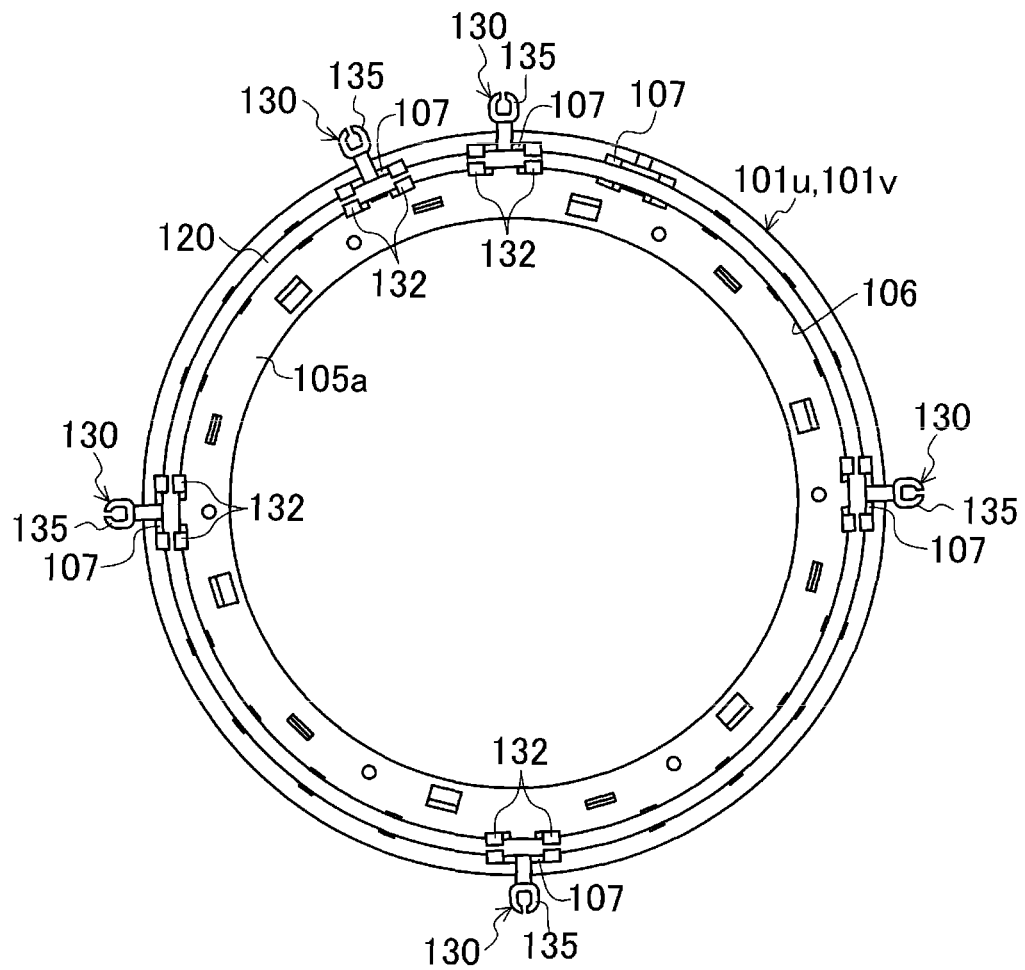
FIG. 33 is a schematic plan view of a u-phase holder or a v-phase holder having the busbar arranged therein, according to the second preferred embodiment of the present invention.
Figure 34:
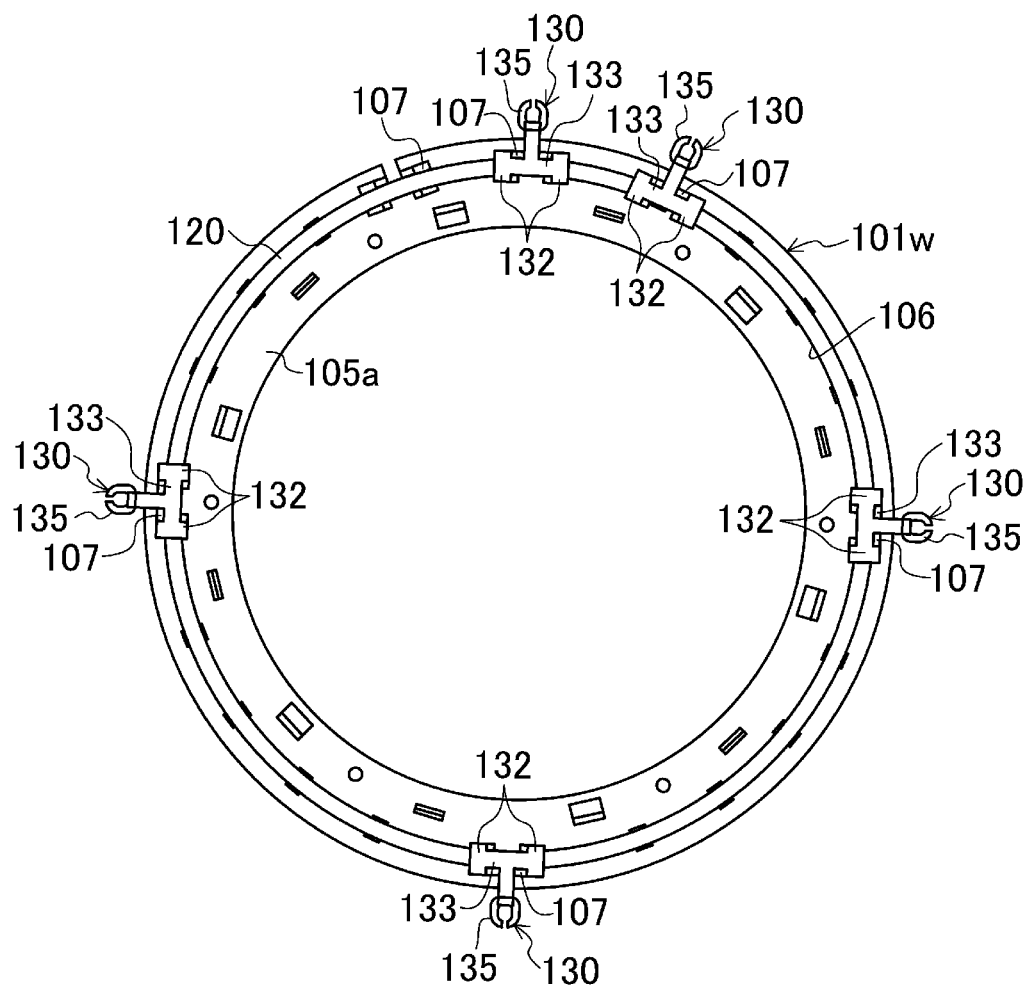
FIG. 34 is a schematic plan view of a w-phase holder having the busbar arranged therein, according to the second preferred embodiment of the present invention.

Referring to FIGS. 33 and 34, five of the terminal members 130 are connected to each of the busbars 120 according to the present preferred embodiment such that four of the five terminal members 130 are preferably arranged at regular intervals of 90 degrees, for example. The remaining terminal member 130 is arranged in the vicinity of one of the four terminal members 130 on the busbar 120. In the present preferred embodiment, a manner in which the busbar 120 is placed inside the w-phase holder 101w is slightly different from a manner in which the busbar 120 is placed inside each of the u-phase holder 101u and the v-phase holder 101v. Specifically, referring to FIG. 33, in the accommodating groove 106 of each of the u-phase holder 101u and the v-phase holder 101v, three of the terminal accommodating portions 107 are arranged in close vicinity to one another, and of the three terminal accommodating portions 107, the terminal accommodating portion 107 on the far right in FIG. 33 is not provided with any terminal member 130. Meanwhile, referring to FIG. 34, in the accommodating groove 106 of the w-phase holder 101w, three of the terminal accommodating portions 107 are arranged in close vicinity to one another, and of the three terminal accommodating portions 107, the terminal accommodating portion 107 on the far left in FIG. 34 is not provided with any terminal member 130. In addition, in each of the holders 101u, 101v, and 101w having the busbar 120 placed therein, the coil connection portion 135 of each terminal member 130 is arranged to project radially outward. In addition, an axis of each coil connection portion 135 and an axis of each of the holders 101u, 101v, and 101w are arranged to be parallel or substantially parallel to each other.

Figure 25:
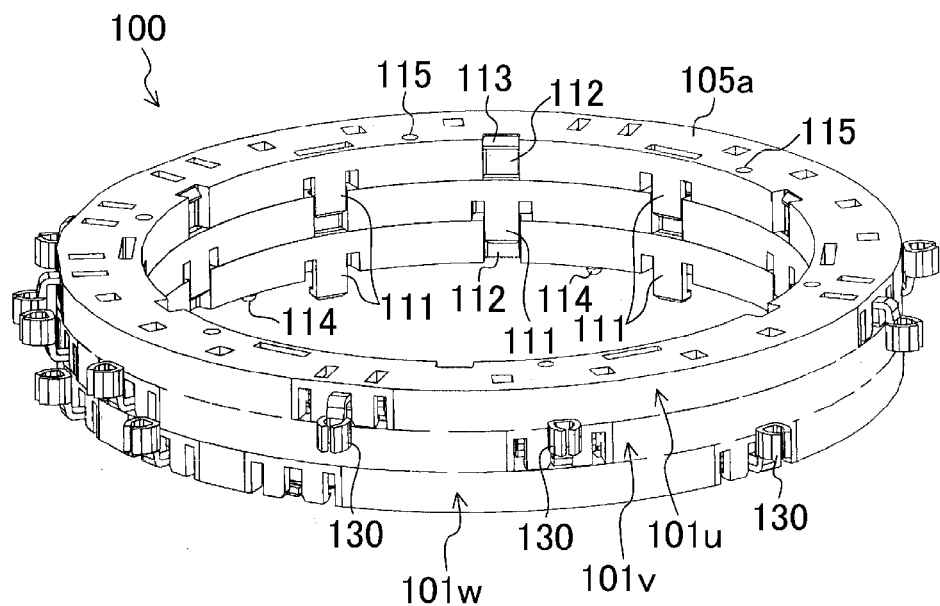
FIG. 25 is a schematic perspective view of the busbar unit according to the second preferred embodiment of the present invention.
Figure 26:
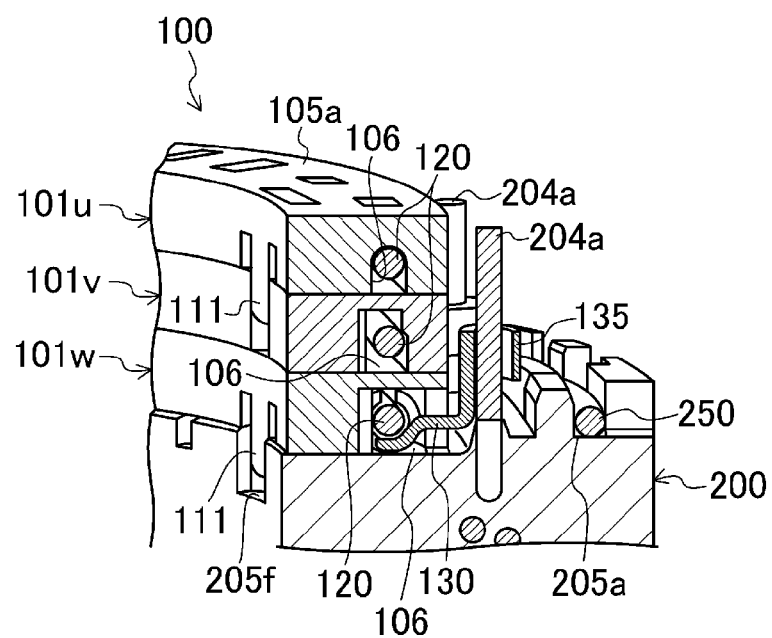
FIG. 26 is a schematic cross-sectional view of the busbar unit and the stator according to the second preferred embodiment of the present invention, illustrating a situation in which the busbar unit is secured to the stator.
Figure 27:
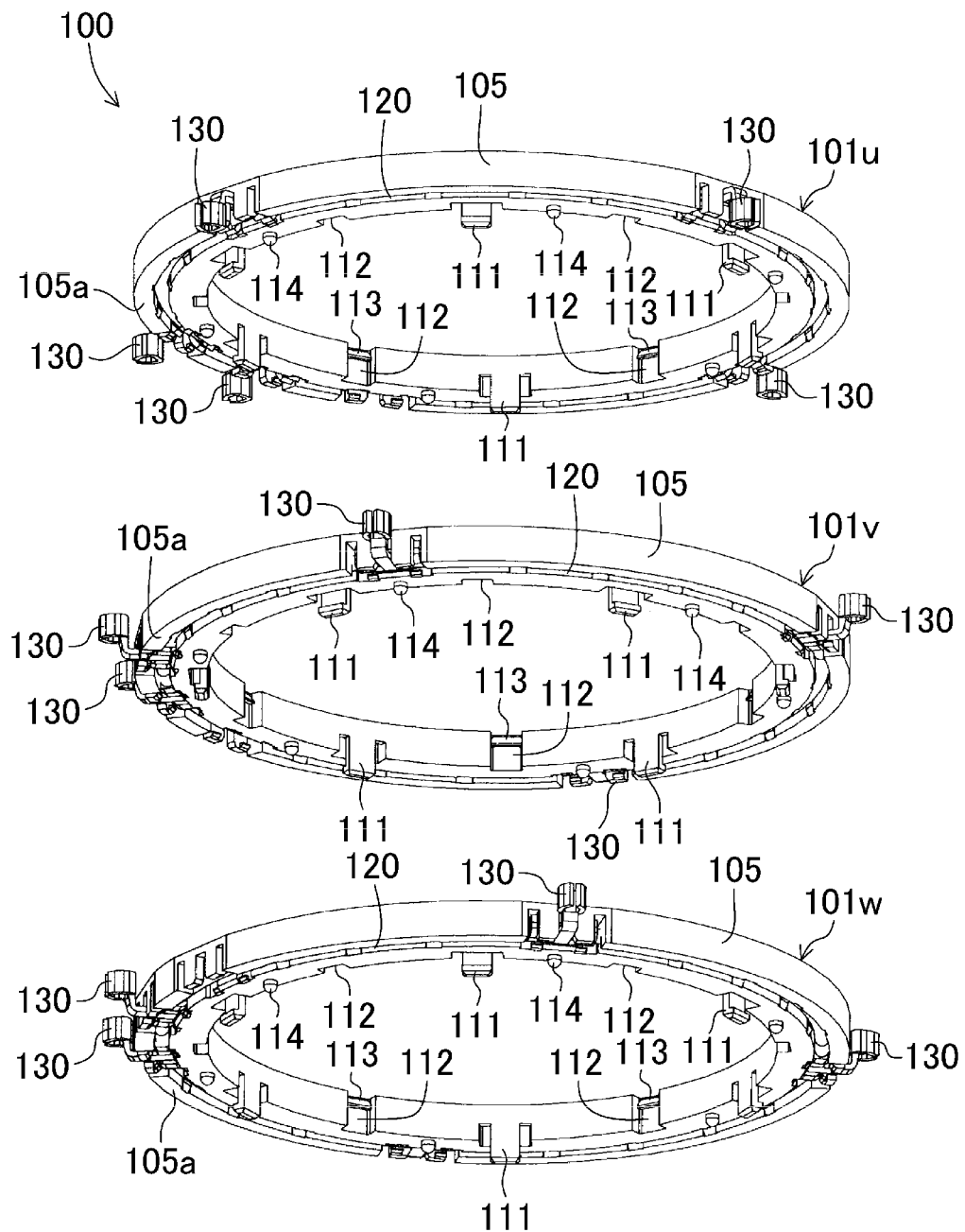
FIG. 27 is a schematic exploded perspective view of the busbar unit according to the second preferred embodiment of the present invention, in which holders are separated from one another.

Referring to FIGS. 23, 25, 26, and 27, the busbar unit 100 is preferably defined by the holders 101u, 101v, and 101w placed one upon another in an axial direction of the stator 200, each of the holders 101u, 101v, and 101w having the corresponding busbar 120 installed and held therein. In the present preferred embodiment, the u-phase holder 101u is placed at the top, the v-phase holder 101v is placed in the middle, and the w-phase holder 101w is placed at the bottom in the axial direction. Note, however, that the order in which the holders are arranged in the axial direction is not limited thereto. Referring to FIGS. 26 and 27, the annular surface 105a of each of the holders 101u, 101v, and 101w is arranged to face downward in the axial direction. That is, in the present preferred embodiment, opening surfaces of the accommodating grooves 106 of the holders 101u, 101v, and 101w are arranged not to face each other.

Referring to FIGS. 25 and 26, the holders 101u, 101v, and 101w placed one upon another are secured to one another as a result of the hooks 111 and the projections 113 of the vertical grooves 112 being engaged with each other. More specifically, the hooks 111 of the holders 101u and 101v are brought into engagement with the projections 113 of the holders 101v and 101w, respectively, to secure the three holders 101u, 101v, and 101w placed one upon another to one another.

Figure 35:
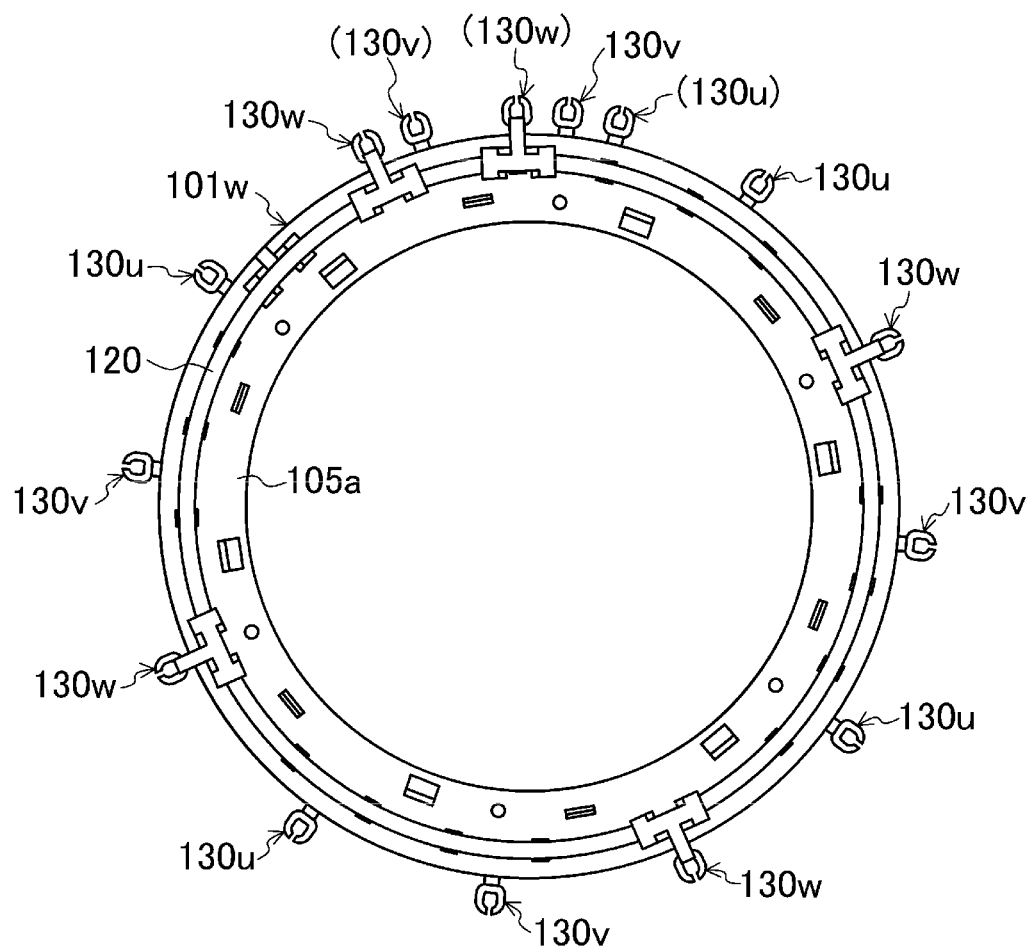
FIG. 35 is a schematic plan view of the busbar unit as viewed from below, according to the second preferred embodiment of the present invention.

Referring to FIG. 35, the holders 101u, 101v, and 101w are circumferentially displaced from one another such that no two terminal members 130 (130u, 130v, and 130w) are arranged to overlap with each other when viewed from above in the axial direction. Note that, in FIG. 35, reference symbols "130u", "130v", and "130w" denote the terminal members installed on the u-phase holder 101u, the v-phase holder 101v, and the w-phase holder 101w, respectively. Also note that reference symbols within parentheses denote terminal members which are not connected with any of the coil wire terminals 204a from the stator 200. Specifically, the motor 1 according to the present preferred embodiment preferably has a 12-slot structure, for example. Accordingly, in the present preferred embodiment, the holders 101u, 101v, and 101w are placed one upon another such that twelve of the terminal members 130 (130u, 130v, and 130w), excluding the three terminal members 130 which are not connected with any of the coil wire terminals 204a, are arranged at regular intervals of 30 degrees in the circumferential direction. Note that the aforementioned number of slots of the motor 1 is merely an example, and is not essential to the present invention.

Figure 36A:
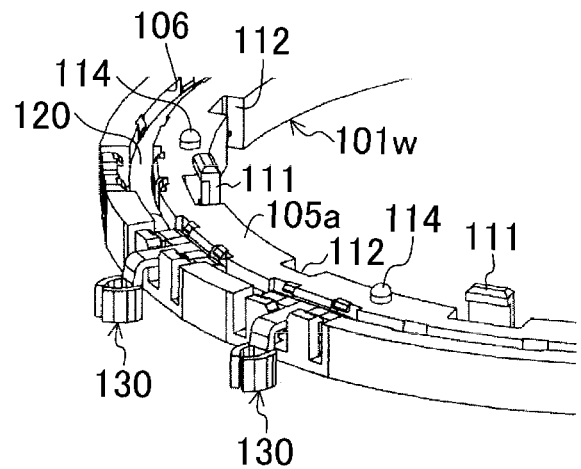
FIG. 36A is a schematic perspective view of the holder having the busbar arranged therein as viewed from below according to the second preferred embodiment of the present invention.
Figure 36B:
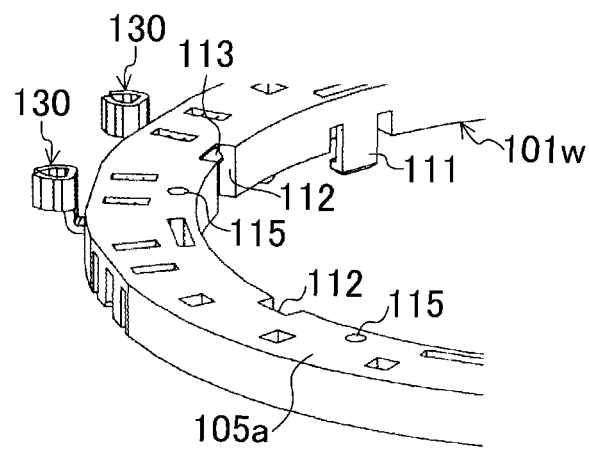
FIG. 36B is a schematic perspective view of the holder having the busbar arranged therein as viewed from above according to the second preferred embodiment of the present invention.

Referring to FIGS. 27 and 36A, the annular surface 105a of each of the holders 101u, 101v, and 101w preferably includes a plurality of raised portions 114 arranged at regular intervals in the circumferential direction. Referring to FIG. 36B, an annular surface of each of the holders 101u, 101v, and 101w opposite to the annular surface 105a preferably includes a plurality of recessed portions 115, which correspond to the raised portions 114, arranged at regular intervals in the circumferential direction. The raised portions 114 and the recessed portions 115 are used to properly position the holders 101u, 101v, and 101w when the holders 101u, 101v, and 101w are placed one upon another. That is, the raised portions 114 of the holders 101u and 101v are fitted into the recessed portions 115 of the holders 101v and 101w, respectively, to properly determine the circumferential orientation of each of the holders 101u, 101v, and 101w. Moreover, the fitting of the raised portions 114 into the corresponding recessed portions 115 contributes to preventing a circumferential movement of each of the holders 101u, 101v, and 101w.

Referring to FIGS. 25 and 27, the terminal members 130 installed on the u-phase holder 101u, which is placed at the top, are arranged such that the joining portion 134 of each of the terminal members 130 is arranged to bend downward in the axial direction outside the u-phase holder 101u. On the other hand, the terminal members 130 installed on the v-phase holder 101v and the w-phase holder 101w, which are placed in the middle and at the bottom, respectively, are arranged such that the joining portion 134 of each of the terminal members 130 is arranged to bend upward in the axial direction outside the v-phase holder 101v and the w-phase holder 101w, respectively. That is, in the busbar unit 100 according to the present preferred embodiment, the joining portion 134 of each of the terminal members 130 installed on the u-phase holder 101u, which is placed at the top, and the joining portion 134 of each of the terminal members 130 installed on the w-phase holder 101w, which is placed at the bottom, are arranged to bend so as to head for each other. Therefore, none of the terminal members 130 installed on the u-phase holder 101u, which is placed at the top, protrudes above an upper end surface of the u-phase holder 101u. Moreover, none of the terminal members 130 installed on the w-phase holder 101w, which is placed at the bottom, protrudes below a lower end surface of the w-phase holder 101w. This contributes to reducing the height of the busbar unit 100.

Figure 37:
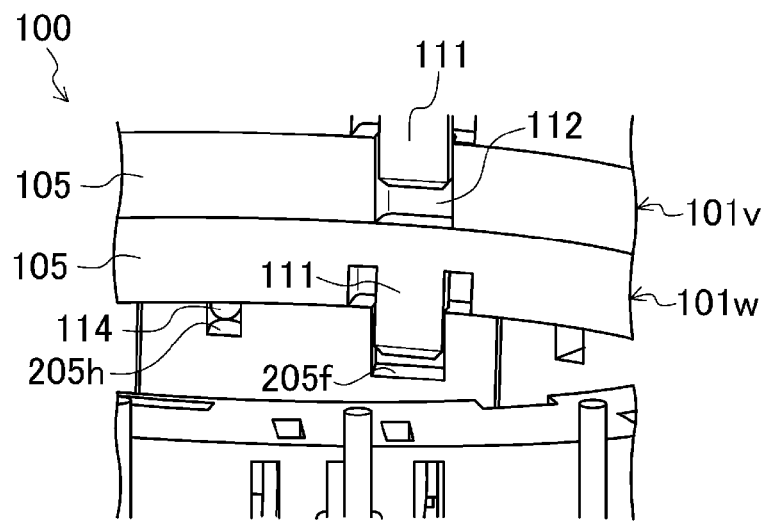
FIG. 37 is a schematic perspective view illustrating a fixing portion at which the busbar unit is fixed to the stator, according to the second preferred embodiment of the present invention.
Figure 38:
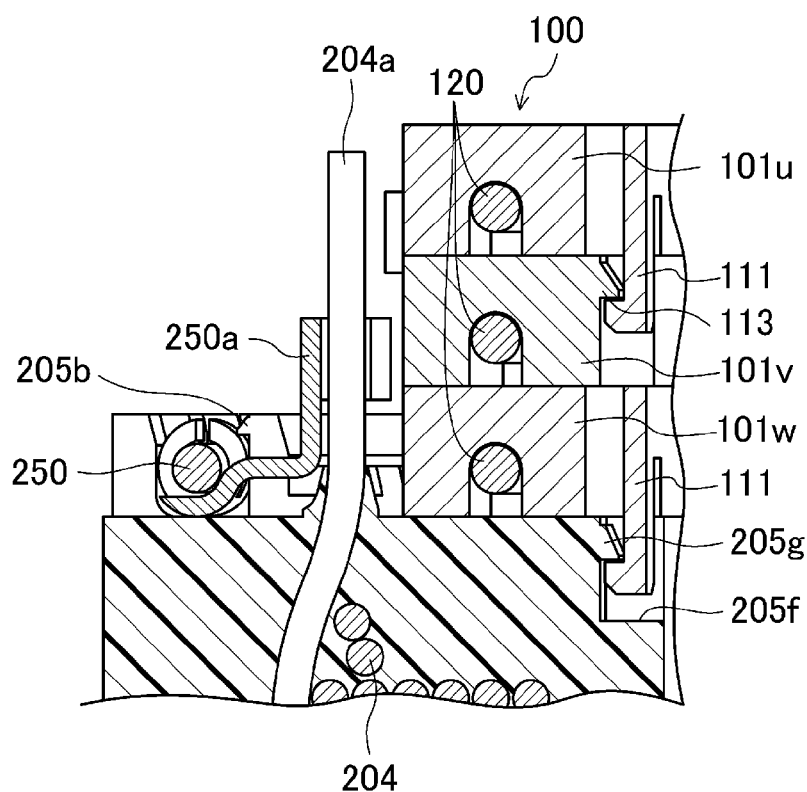
FIG. 38 is a schematic cross-sectional view illustrating a situation in which the busbar unit is secured to the stator, according to the second preferred embodiment of the present invention.
Figure 39:
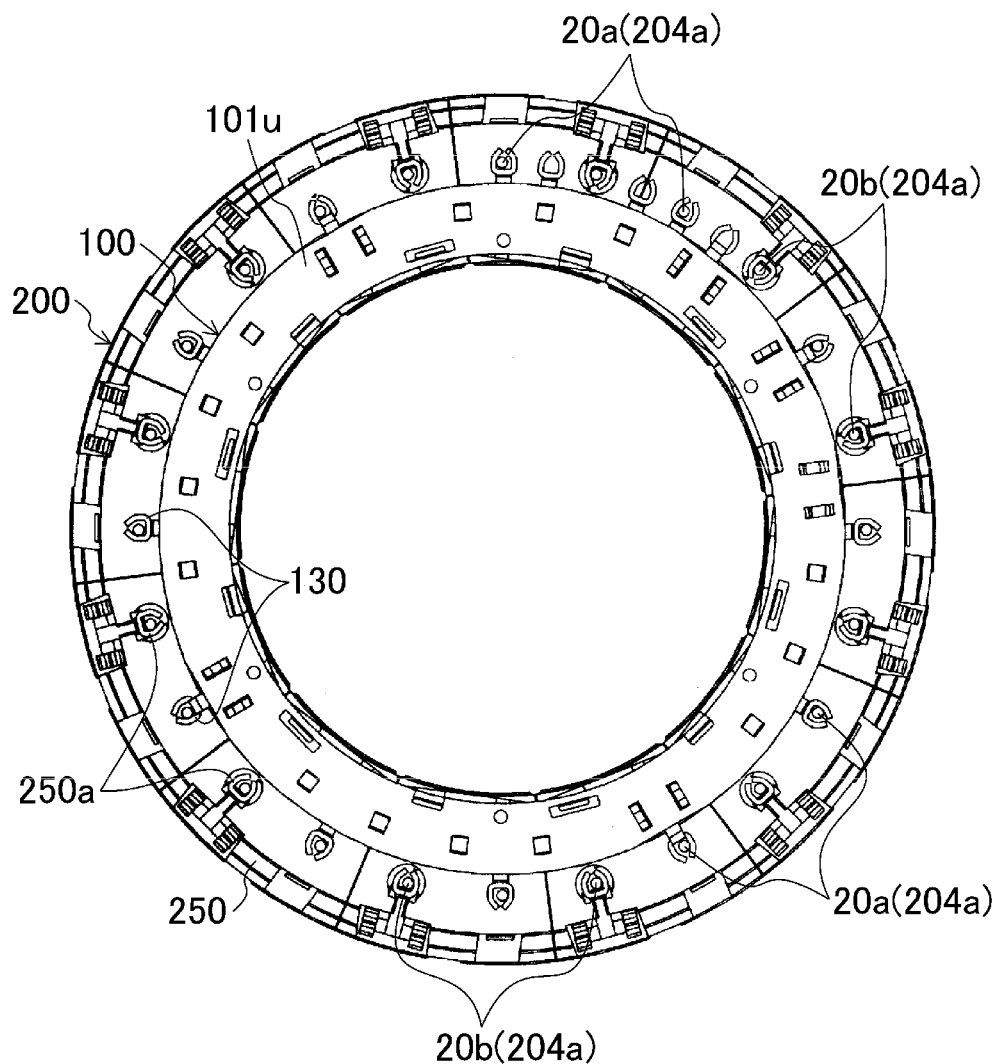
FIG. 39 is a schematic plan view illustrating a situation in which the busbar unit is secured to the stator, according to the second preferred embodiment of the present invention.

Referring to FIGS. 37 and 38, the hooks 111 of the w-phase holder 101w, which is placed at the bottom of the busbar unit 100, are preferably brought into engagement with projections 205g which are similar to the aforementioned projections 113 and defined in the stator 200, so that the busbar unit 100 is secured to an axial end portion of the stator 200. Moreover, the raised portions 114 of the w-phase holder 101w, which is placed at the bottom of the busbar unit 100, are preferably fitted into recessed portions 205h defined in the axial end portion of the stator 200, so that the busbar unit 100 is properly positioned. Furthermore, the fitting of the raised portions 114 into the recessed portions 205h contributes to restraining a circumferential movement of the busbar unit 100.

As also illustrated in FIGS. 24, 26, 38, and 39, the busbar unit 100 is attached to the axial end portion of the stator 200 such that the busbar unit 100 and the stator 200 are coaxial or substantially coaxial with each other. With the busbar unit 100 and the stator 200 being in this situation, the busbars 120 are arranged above the stator 200. Meanwhile, in the stator 200, the coil wire terminals 204a, preferably numbering twenty-four, are arranged to axially project from the axial end portion of the stator 200. The coil wire terminals 204a are preferably arranged at regular intervals of about 15 degrees in the circumferential direction, centering about the axis of the stator 200. In other words, the coil wire terminals 204a are arranged on circles having the same radius and whose center is the axis of the stator 200.

The coil wire terminals 204a described above are divided into phase terminals 20a, which are provided for the respective phases and connected to the terminal members 130 installed in the busbar unit 100, and neutral point terminals 20b. The phase terminals 20a and the neutral point terminals 20b are preferably arranged alternately with each other. The neutral point terminals 20b are connected with a neutral point busbar 250 through neutral point terminal members 250a, which will be described below. The neutral point busbar 250 is preferably held by a holding portion which has been molded in the axial end portion of the stator 200 and which is arranged radially outward of an outer circumference of the busbar unit 100. That is, the neutral point busbar 250 is secured to the axial end portion of the stator 200. There is therefore no need to provide the busbar unit 100 with a holder for a neutral point, which makes it possible to reduce the height of the busbar unit 100 or the height of the motor 1 as a whole. Also, insulation between each busbar 120 and the neutral point busbar 250 is ensured more effectively.

In the present preferred embodiment, the axial direction of each coil connection portion 135 coincides with the axial direction of the stator 200. That is, the axial direction of each coil connection portion 135 coincides with a direction in which each coil wire terminal 204a is arranged to project. As described above, in the present preferred embodiment, each terminal member 130 is provided with the busbar connection portion 131, which is connected with the annular busbar 120 extending in the circumferential direction, and the coil connection portion 135, which is connected with the coil wire terminal 204a extending in the axial direction of the stator 200. It is therefore possible to insert the coil wire terminals 204a into the corresponding coil connection portions 135 by simply moving the busbar unit 100 in the axial direction toward the axial end portion of the stator 200. Therefore, the fitting of the terminal members 130 of the busbar unit 100 and hence the fitting of the busbar unit 100 to the stator 200 can be accomplished easily without the need for an operation of adjusting the orientation of any coil wire terminal 204a. This leads to shortening a procedure of fitting the busbar unit 100 to the stator 200, leading in turn to improved productivity in manufacturing the motors 1.

In the present preferred embodiment, the busbars 120 and the terminal members 130 are preferably independent of each other, and each busbar 120 is preferably defined by a wire. An improvement in the yield of the material is therefore achieved as compared to the case where band-shaped conductors with integral terminals are used as in related art. This leads to a reduction in the costs of the materials for the busbar unit 100 and the motor 1, leading in turn to a reduction in the production cost.

Furthermore, in the present preferred embodiment, the terminal member 130 is arranged to have a shape so as to achieve a high yield of the material as described above. This contributes to further reducing the costs of the materials and the production cost.

Furthermore, the busbar 120 according to the present preferred embodiment is defined by a bare electric wire without an insulating coating. The lack of an insulating coating leads to an increased number of choices of how to join the terminal members 130 to the busbar 120. For example, crimping, welding, and the like are included in the possible choices.

Furthermore, the busbar unit 100 according to the present preferred embodiment is provided with the plurality of holders 101*u*, 101*v*, and 101*w*, each of which is arranged in an annular shape. In addition, each of the plurality of holders 101*u*, 101*v*, and 101*w* includes the annular accommodating groove 106 arranged to contain and hold a separate one of the busbars 120 individually. This leads to ensuring insulation between the busbars 120.

Furthermore, in the present preferred embodiment, each of the holders 101*u*, 101*v*, and 101*w* preferably has the same configuration. This leads to an additional improvement in productivity.

Furthermore, in the present preferred embodiment, the annular surfaces 105*a* of the holders 101*u*, 101*v*, and 101*w* (hence, the opening surfaces of the accommodating grooves 106 of the holders 101*u*, 101*v*, and 101*w*) are arranged not to face each other. This leads to further ensuring the insulation between the busbars 120.

Furthermore, in the present preferred embodiment, the terminal members 130 installed in the busbar unit 100 are preferably arranged at regular intervals in the circumferential direction. This contributes to eliminating the need for the operation of adjusting the orientation of any coil wire terminal 204*a*.

Figure 40:
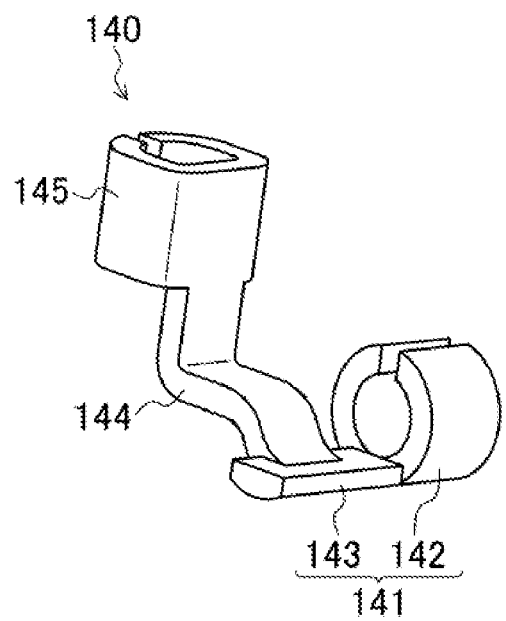
FIG. 40 is a schematic perspective view of an example terminal member according to the second preferred embodiment of the present invention.
Figure 41:
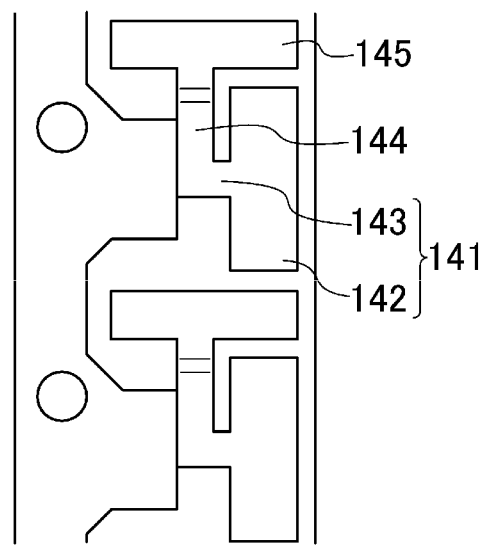
FIG. 41 illustrates a schematic development of the example terminal member according to the second preferred embodiment of the present invention.

Note that the terminal member 130 according to the present preferred embodiment may be replaced with a terminal member 140 as illustrated in FIG. 40. The terminal member 140 is preferably made out of a single plate material element. The terminal member 140 preferably includes a busbar connection portion 141, which is connected with the busbar 120; a coil connection portion 145, which is connected with the coil wire terminal 204*a*; and a joining portion 144, which is arranged to extend to be continuous with the busbar connection portion 141 and the coil connection portion 145. The busbar connection portion 141 is preferably defined by one C-shaped tubular portion 142 and a plate portion 143 arranged to be continuous with an end surface of the C-shaped tubular portion 142. The structure of the terminal member 140 is otherwise similar to that of the terminal member 130 illustrated in FIG. 30. The action and beneficial effects of the terminal member 140 are also similar to those of the terminal member 130 illustrated in FIG. 30. In other words, the terminal member 140 is preferably identical to the terminal member 130 illustrated in FIG. 30 except that the terminal member 140 includes only one C-shaped tubular portion 142. FIG. 41 shows a preferred embodiment of a method of development of the terminal member 140. The single plate material is preferably cut in accordance with this method. The resulting plate material is then preferably subjected to a bending process to thereby define the terminal member 140. As is the case with the terminal member 130, the terminal member 140 has a shape so as to achieve a high yield of the material.

In the present preferred embodiment, each of the holders 101*u*, 101*v*, and 101*w* is arranged to have the same configuration. Note, however, that each of the holders 101*u*, 101*v*, and 101*w* may be arranged to have a different configuration, as long as the holders 101*u*, 101*v*, and 101*w* are able to hold the corresponding busbars 120 while ensuring the insulation between the busbars 120.

In the present preferred embodiment, the three holders 101*u*, 101*v*, and 101*w* are preferably arranged to hold the busbars 120 individually. Note, however, that only one holder which is arranged to hold all the busbars 120 may be provided.

In the present preferred embodiment, each of the holders 101*u*, 101*v*, and 101*w* is preferably made of an electrically insulating material. Note, however, that, in the case where each of the busbars 120 is defined by an electrically conductive wire having an insulating coating arranged on the outer circumference thereof, each of the holders 101*u*, 101*v*, and 101*w* are not necessarily required to be made of an insulating material.

In the present preferred embodiment, each of the holders 101*u*, 101*v*, and 101*w* is preferably defined by an annular member arranged to contain and hold the corresponding busbar 120 in its entirety. Note, however, that, in the case where each of the busbars 120 is defined by an electrically conductive wire having an insulating coating arranged on the outer circumference thereof, each of the holders 101*u*, 101*v*, and 101*w* may be replaced with a member or members arranged to hold the busbar 120 only partially in the circumferential direction.

Also note that a minimum requirement of the terminal member 130 is that the terminal member 130 is defined by a single monolithic member including the busbar connection portion 131 which is to be connected with the annular busbar 120 extending in the circumferential direction, and the coil connection portion 135 which is to be connected with the coil wire terminal 204*a* extending in the axial direction of the stator 200. That is, the shape of the terminal member is not limited to the shapes mentioned above.

Figure 42:
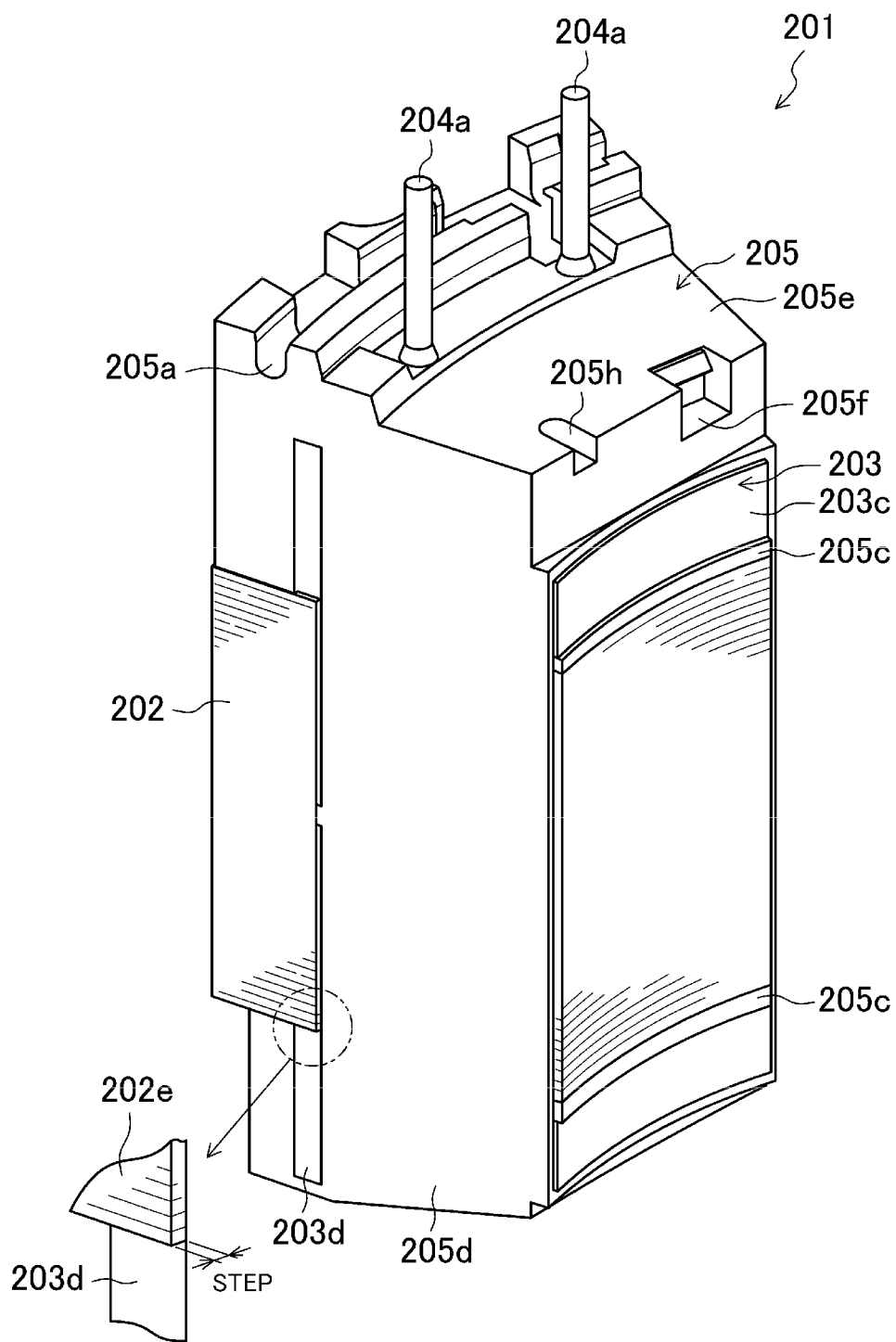
FIG. 42 is a schematic perspective view of a stator segment according to the second preferred embodiment of the present invention.
Figure 43:
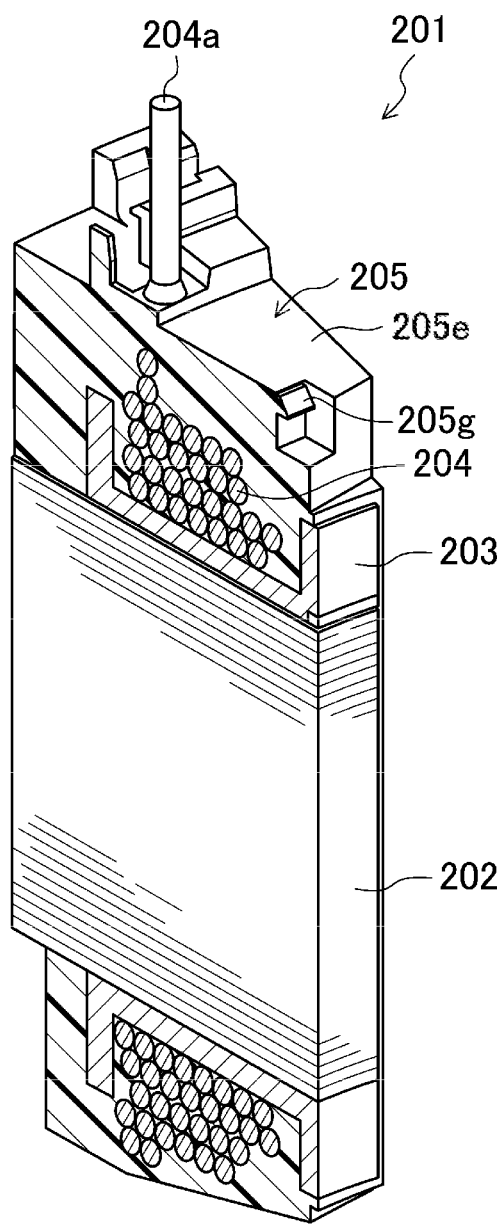
FIG. 43 is a schematic vertical cross-sectional view of the stator segment according to the second preferred embodiment of the present invention.

The stator 200 according to the present preferred embodiment preferably includes a plurality of stator segments 201. As illustrated in FIG. 23, the stator 200 is in the shape of a cylinder. In the present preferred embodiment, the number (hereinafter referred to as a "segment number") of stator segments 201 which together define the stator 200 is preferably twelve, for example. A central angle of each stator segment 201 is therefore preferably about 30 degrees. FIG. 42 is a perspective view of the stator segment 201. FIG. 43 is a vertical cross-sectional view of the stator segment 201. As illustrated in FIG. 43, the stator segment 201 preferably includes a core segment 202, insulators 203, the coil 204, and a resin layer 205.

It is assumed in the following description that the axial direction or a vertical direction of the stator 200 or the stator segment 201 refers to a direction of the axis of the shaft 6; that a horizontal direction refers to a direction perpendicular to the axis of the shaft 6; that terms "radially inward", "radially inner", etc., refer to a side closer to the shaft 6; and that the terms "radially outward", "radially outer", etc., refer to a side farther away from the shaft 6.

Figure 44:
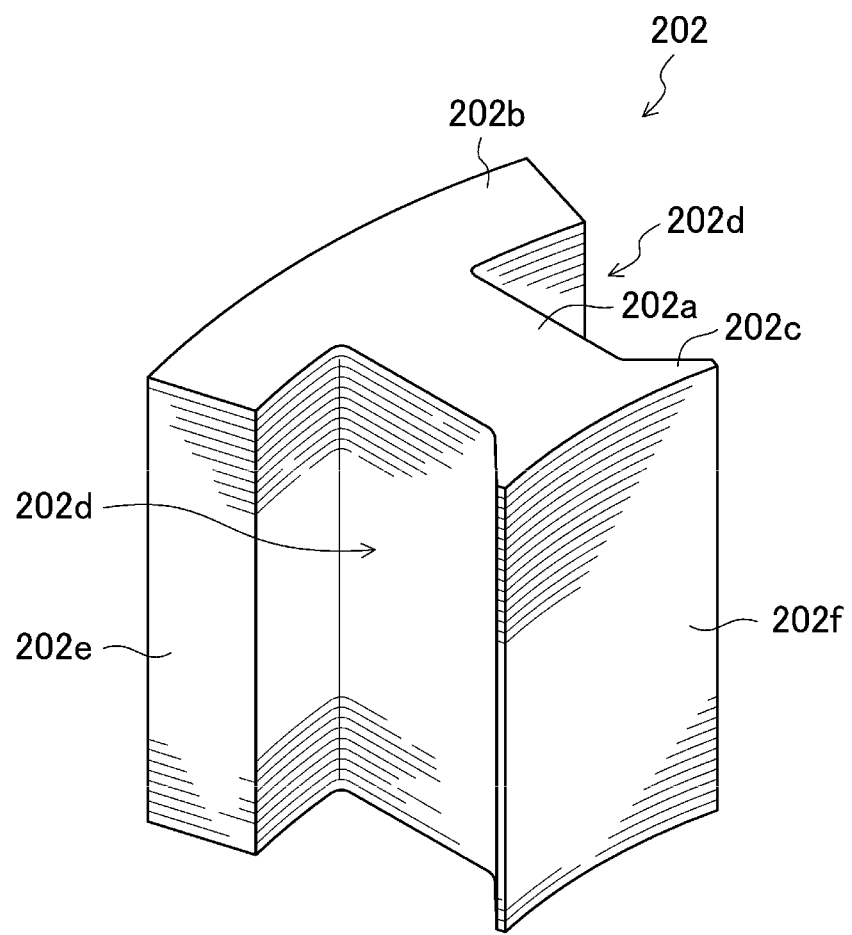
FIG. 44 is a schematic perspective view of a core segment according to the second preferred embodiment of the present invention.

FIG. 44 is a perspective view of the core segment 202. The core segment 202 is preferably defined by, for example, a plurality of electromagnetic steel sheets placed one upon another in the axial direction. As is apparent from FIG. 44, a cross section of the core segment 202 is substantially in the shape of the letter "T".

In more detail, the core segment 202 preferably includes a tooth portion 202a, a core back portion 202b, and an inner yoke portion 202c. The core back portion 202b is a portion which is arranged to extend in the circumferential direction of the stator 200 when the core back portion 202b defines a portion of the stator 200. An angle defined between two circumferential end walls 202e of the core back portion 202b corresponds to a central angle of the core segment 202. In the present preferred embodiment, the central angle of the core segment 202 preferably is about 30 degrees, for example. The tooth portion 202a is a portion which is arranged to extend from the core back portion 202b in a radial direction of the stator 200. The inner yoke portion 202c is arranged to be continuous with a radially inner end of the tooth portion 202a. The inner yoke portion 202c is a portion which is arranged to extend in the circumferential direction over a distance smaller than a distance over which the core back portion 202b is arranged to extend in the circumferential direction. Spaces defined between the inner yoke portion 202c and the core back portion 202b on both circumferential sides of the tooth portion 202a define slots 202d arranged to accommodate the coil 204.

The insulator 203 is an insulating layer arranged to ensure insulation between the core segment 202 and the coil 204. The insulator 203 is arranged between the coil 204 and the tooth portion 202a as described below. That is, the insulator 203 is an example insulating layer according to a preferred embodiment of the present invention. The insulator 203 is therefore made of an electrically insulating material. A thermoplastic resin is preferably used as the insulating material in the present preferred embodiment, but any other desirable electrically insulating material could be used in its place.

Figure 45:
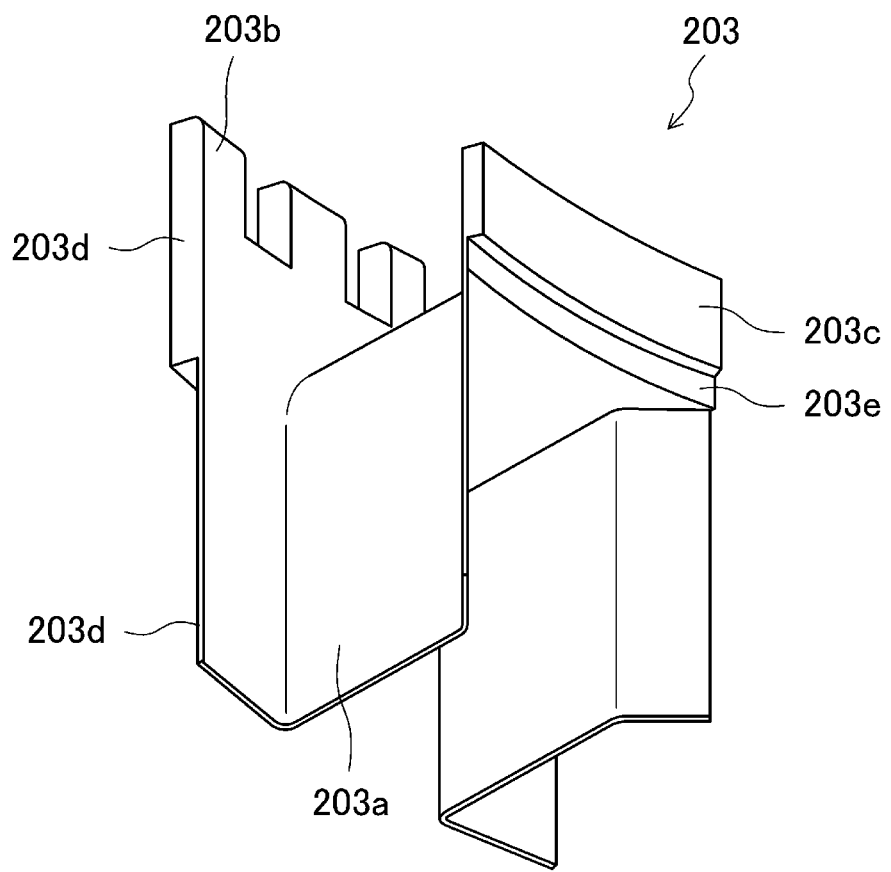
FIG. 45 is a schematic perspective view illustrating the structure of an insulator according to the second preferred embodiment of the present invention.
Figure 46:
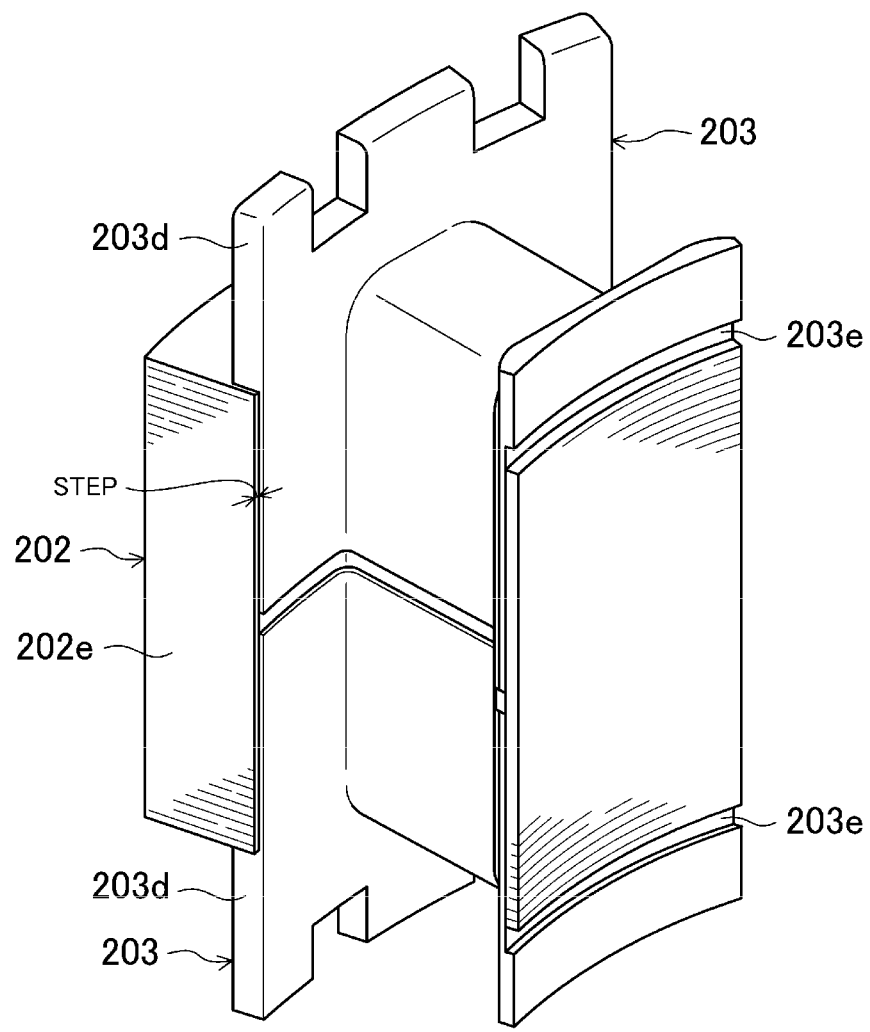
FIG. 46 is a schematic perspective view of the core segment having insulators attached thereto, according to the second preferred embodiment of the present invention.

FIG. 45 is a perspective view of the insulator 203, illustrating the structure of the insulator 203. Referring to FIG. 45, the insulator 203 preferably includes a body portion 203a and end walls 203b and 203c. The body portion 203a is preferably substantially in the shape of the letter "U", and is fitted to the tooth portion 202a. FIG. 46 is a perspective view illustrating the insulators 203 attached to the core segment 202. Two insulators 203 are preferably used in each stator segment 201. The body portion 203a of one of the two insulators 203 is preferably fitted to one axial end (i.e., an output-side end) of the core segment 202, while the body portion 203a of the other insulator 203 is fitted to the other axial end of the core segment 202. As a result, the tooth portion 202a is covered by the body portions 203a of the insulators 203.

When the insulator 203 has been fitted to the core segment 202, the end walls 203b and 203c thereof are arranged to project over an axial end wall of the core segment 202. The end wall 203c is arranged radially outward of an inner side surface 202f of the core segment 202. Referring to FIG. 45, the end wall 203c preferably includes a step portion 203e arranged at a position corresponding to an axial end of the core segment 202.

A circumferential end wall 203d of the insulator 203 is arranged to be slightly recessed, in the direction of the tooth portion 202a (i.e., circumferentially inward), relative to the circumferential end wall 202e of the core segment 202. In the present preferred embodiment, there is preferably a step that measures about 0.1 mm between the circumferential end wall 203d of the insulator 203 and the circumferential end wall 202e of the core segment 202.

Figure 47:
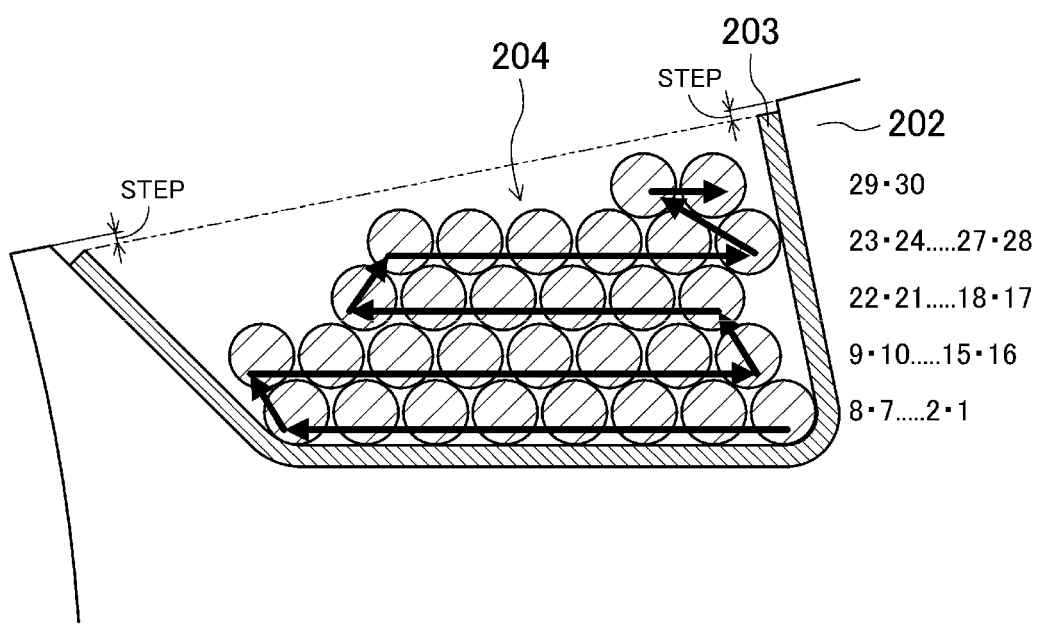
FIG. 47 is a schematic cross-sectional view of the core segment having a coil wound thereabout according to the second preferred embodiment of the present invention, illustrating a slot and its vicinity.

Each coil 204 is preferably defined by an electric wire (i.e., a copper wire), such as an enamel-coated copper wire, wound around the core segment 202 in a regular winding fashion with the insulators 203 arranged therebetween. The winding of the wire is carried out in such a manner that the coil 204 preferably does not bulge over the circumferential end walls 203d of the insulators 203. FIG. 47 is a cross-sectional view of the slot 202d and its vicinity when the coil 204 has been wound about the core segment 202. In FIG. 47, the tooth portion 202a is shown at the bottom, and the copper wire is wound around the tooth portion 202a in an order indicated by arrows shown in FIG. 47. In FIG. 47, numbers shown to the right of each layer of the coil 204 (e.g., 8·7 . . . 2·1, etc.) indicate the number of turns. For instance, a first layer of the coil 204 (i.e., a lowermost layer in FIG. 47) corresponds to first to eighth turns. The number of turns is determined in accordance with a rating of the motor 1. The adoption of the regular winding for the coil 204 contributes to preventing the coil 204 from bulging over circumferential end surfaces of the core segment 202. In the present preferred embodiment, a clearance of about 0.1 mm is preferably provided between the circumferential end surfaces of the core segment 202 and a line joining the circumferential end walls 203d of the insulator 203 (i.e., a line represented by a chain double-dashed line in FIG. 47).

Figure 48:
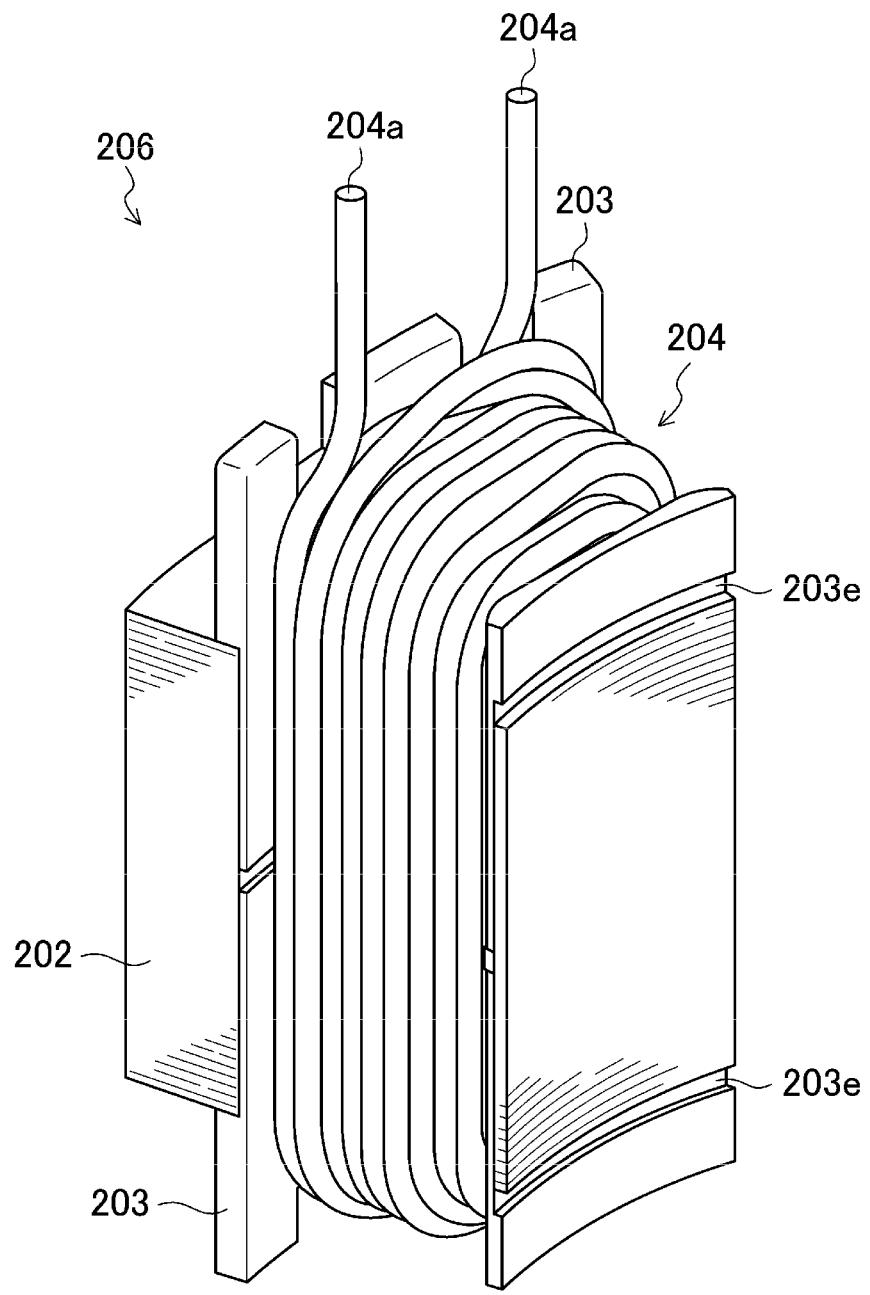
FIG. 48 is a schematic perspective view of the core segment having the insulators attached thereto and the coil wound thereabout according to the second preferred embodiment of the present invention.

FIG. 48 is a perspective view of the core segment 202 having the insulators 203 fitted thereto and the coil 204 wound thereabout. As illustrated in FIG. 48, the coil 204 includes a pair of coil wire terminals 204a. The coil wire terminals 204a are arranged to extend in parallel or substantially in parallel with each other toward the output-side end (i.e., in the axial direction of the stator segment 201). A central angle (hereinafter also referred to as a "pitch angle") defined between the pair of coil wire terminals 204a is half the central angle of the core segment 202, that is, preferably about 15 degrees in the present preferred embodiment. In the present preferred embodiment, the pair of coil wire terminals 204a are fixed through the resin layer 205 such that the central angle defined between the pair of coil wire terminals 204a is half the central angle of the core segment 202. When the stator segments 201 have been assembled together to define the stator 200 in the annular shape, the coil wire terminals 204a are therefore preferably arranged at regular intervals of about 15 degrees. Note that the core segment 202 having the insulators 203 fitted thereto and the coil 204 wound thereabout will be hereinafter referred to as a subassembly 206 for the sake of convenience in description.

The resin layer 205 is preferably arranged to seal the entire coil 204 except for the pair of coil wire terminals 204a. The coating of the entire coil 204 with the resin layer 205 contributes to preventing a short circuit (i.e., an interphase short circuit) with another stator segment 201. Moreover, the resin layer 205 contributes to reducing an exciting vibration of the coil 204.

The resin layer 205 is preferably molded on the subassembly 206. In the present preferred embodiment, the resin layer 205 is preferably made of, for example, a thermoplastic resin similar to the material of the insulators 203. However, the resin layer 205 may be made of any type of thermosetting resins that are commonly used in motors.

In the present preferred embodiment, a circumferential end wall 205d of the resin layer 205 is preferably arranged circumferentially inward of the circumferential end wall 202e of the core segment 202. In addition, the resin layer 205 is arranged not to occupy a space over the end wall 203c of the insulator 203 and the inner side surface 202f of the core segment 202.

Figure 49:
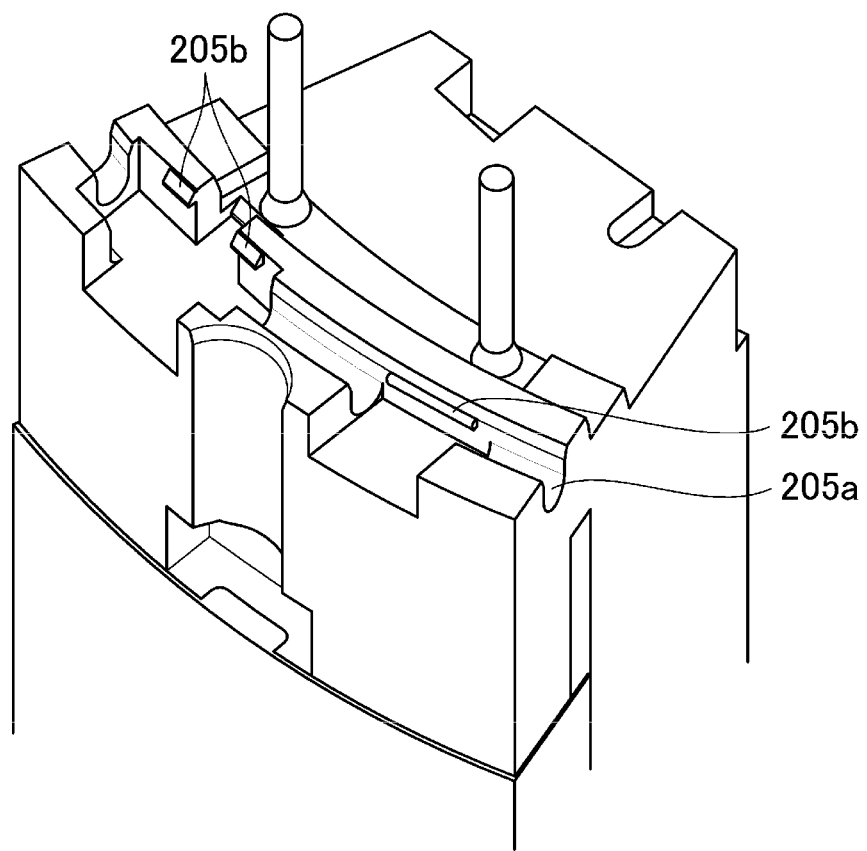
FIG. 49 is a schematic perspective view illustrating a groove defined in the stator segment according to the second preferred embodiment of the present invention.

Furthermore, an output-side end surface of the resin layer 205 preferably includes a groove 205a arranged to accommodate the neutral point busbar 250, which functions as a wiring member providing a ground (i.e., the neutral point). FIG. 49 is a perspective view illustrating the groove 205a arranged in the stator segment 201. When the stator segments 201 have been assembled together to define the stator 200 in the annular shape, the grooves 205a of the stator segments 201 are arranged to together define an annular groove (see FIG. 23). A cross section of the groove 205a and its vicinity is illustrated in FIG. 38. FIG. 38 illustrates a situation in which the groove 205a has the neutral point busbar 250 arranged therein. In the present preferred embodiment, the neutral point busbar 250 is preferably, for example, an annular or C-shaped wiring member. Twelve neutral point terminal members 250a are attached to the neutral point busbar 250. Note that the number of neutral point terminal members 250a is preferably equal to the segment number. Each of the neutral point terminal members 250a is substantially in the shape of the letter "T", as with the terminal members 130 used in the busbar unit 100. Each of the neutral point terminal members 250a is fixed to the neutral point busbar 250 preferably through, for example, swaging or the like. When the stator segments 201 have been assembled together to define the stator 200 in the annular shape, the neutral point terminal members 250a are preferably arranged at regular intervals in the circumferential direction, such that every adjacent ones of the neutral point terminal members 250a are circumferentially spaced from each other by an angle corresponding to a central angle of the core back portion 202b.

Figure 50:
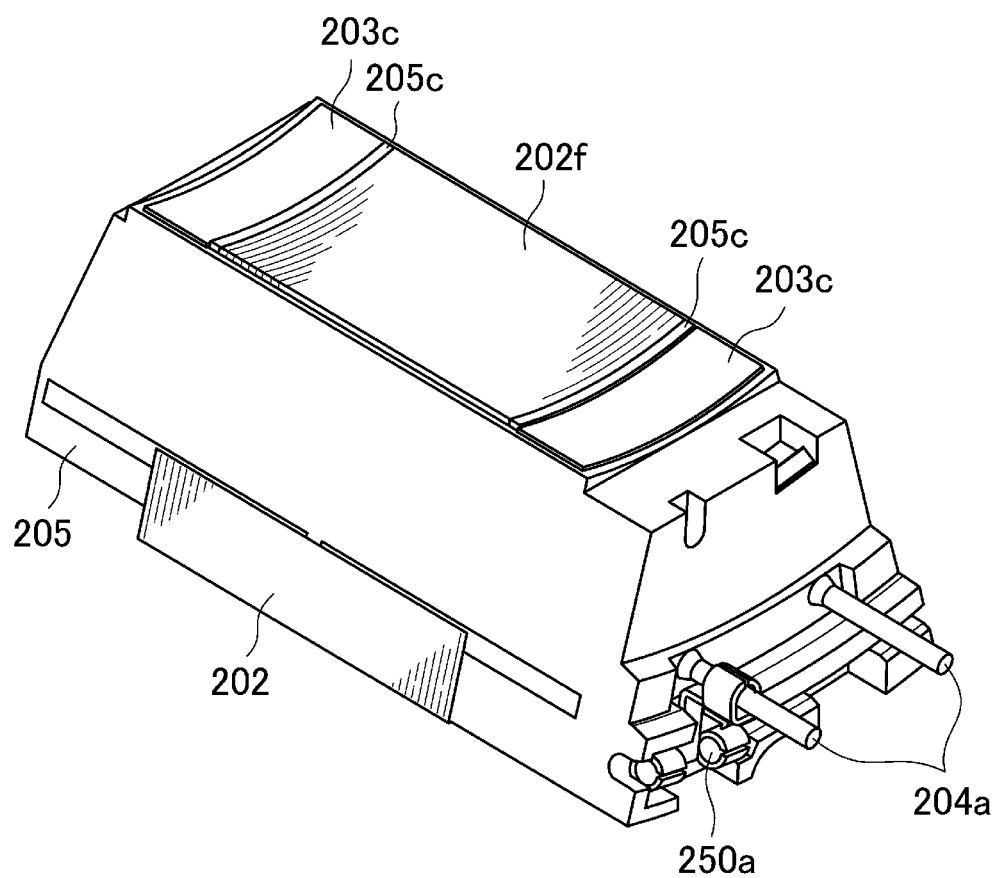
FIG. 50 is a diagram for explaining a situation in which the terminal member has been attached to a coil wire terminal, according to the second preferred embodiment of the present invention.

Each of the neutral point terminal members 250a is arranged in the groove 205a so as to align with one of the coil wire terminals 204a of a separate one of the stator segments 201. The neutral point terminal member 250a is then fitted to the corresponding coil wire terminal 204a. FIG. 50 is a diagram illustrating a situation in which the neutral point terminal member 250a is fitted to the coil wire terminal 204a. In FIG. 50, the neutral point busbar 250 is omitted for the sake of convenience in description. As illustrated in FIG. 50, one of the coil wire terminals 204a of the corresponding stator segment 201 is inserted into each neutral point terminal member 250a in the axial direction, so that the neutral point terminal member 250a is electrically connected with the coil wire terminal 204a.

Furthermore, referring to FIG. 49, an inside wall surface of the groove 205a preferably includes a plurality of projecting portions 205b. The projecting portions 205b are arranged to prevent the neutral point terminal members 250a and the neutral point busbar 250 from coming off. Referring to FIG. 38, each neutral point terminal member 250a is held between the projecting portion 205b and a bottom portion of the groove 205a. The projecting portions 205b contribute to preventing the neutral point terminal member 250a and so on from coming off the groove 205a. This in turn contributes to further ensuring the electrical connection between the neutral point terminal member 250a and the coil wire terminal 204a.

Furthermore, referring to FIG. 42, the resin layer 205 includes a flat portion 205e arranged at an output-side end thereof to have the busbar unit 100 mounted thereon. Furthermore, referring to FIGS. 38, 42, and 43, the resin layer 205 includes a recessed portion 205f preferably arranged at a radially inner corner of the output-side end thereof. The stator 200 according to the present preferred embodiment preferably includes the twelve stator segments 201. Therefore, in the stator 200, the recessed portions 205f are preferably arranged at regular intervals of about 30 degrees. Each recessed portion 205f preferably includes the projection 205g arranged therein. One of the hooks 111 of the holder 101w is mechanically engaged with the projection 205g. The recessed portion 205f and the projection 205g together define an example fixing portion according to a preferred embodiment of the present invention.

Figure 51:
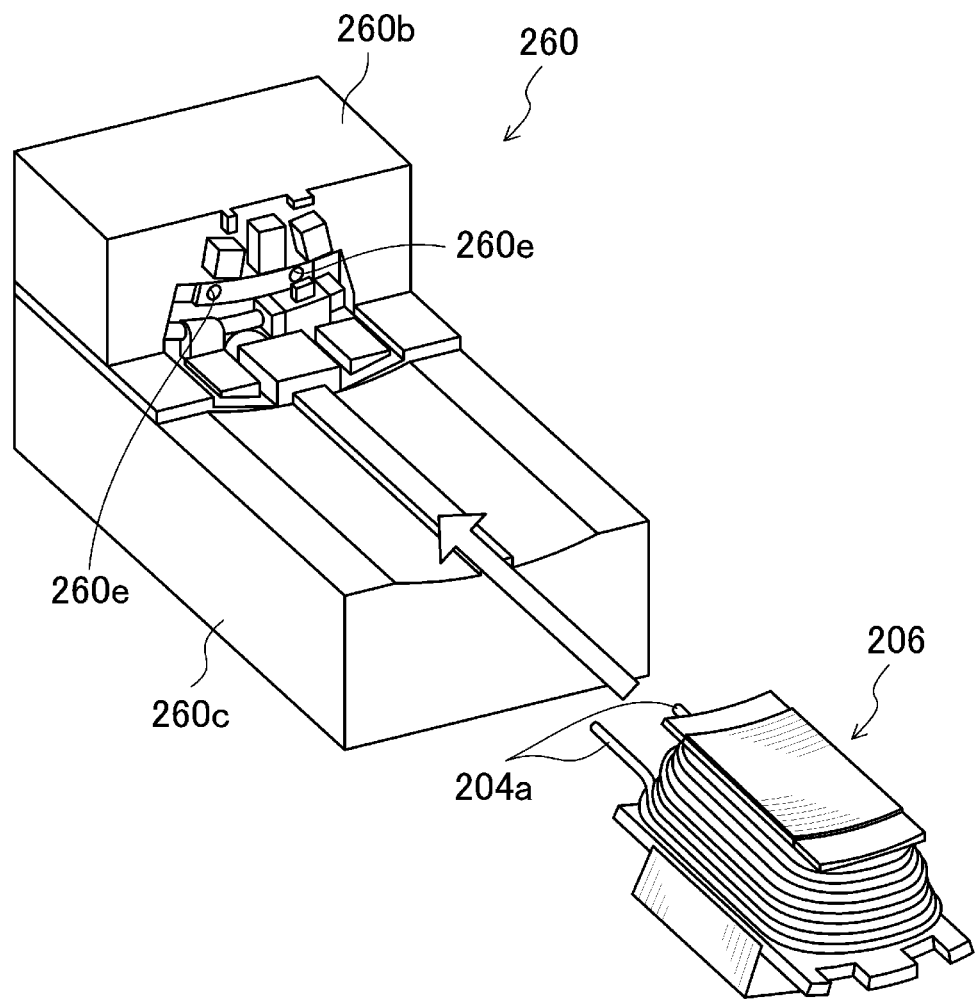
FIG. 51 is a schematic perspective view illustrating a portion of a mold used to mold a resin layer according to the second preferred embodiment of the present invention.
Figure 52:
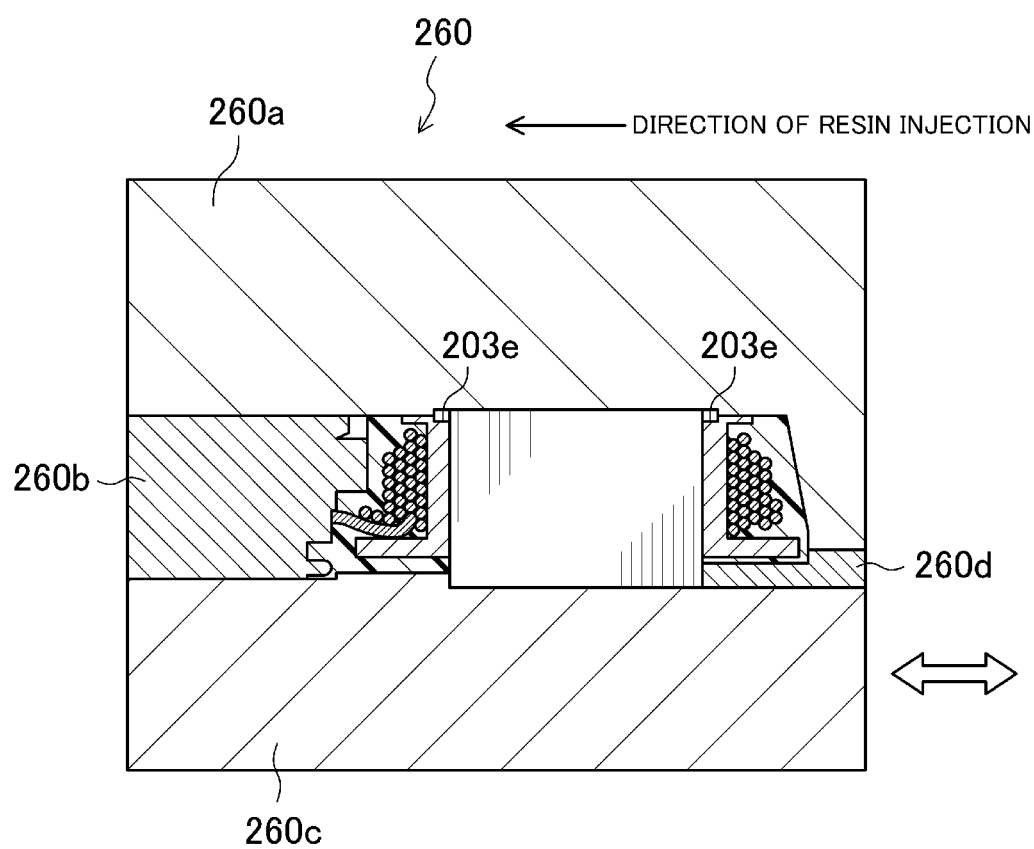
FIG. 52 is a schematic cross-sectional view of the mold according to the second preferred embodiment of the present invention.

FIG. 51 is a perspective view illustrating a portion of a mold 260 used to mold the resin layer 205 in accordance with a preferred embodiment of the present invention. FIG. 52 is a cross-sectional view of the mold 260. FIG. 52 illustrates a situation in which the subassembly 206 is set inside the mold 260. The mold 260 preferably includes a stationary side mold portion 260a, a coil wire terminal side mold portion 260b, a movable side mold portion 260c, and a slide portion 260d.

The coil wire terminal side mold portion 260b is arranged to position the pair of coil wire terminals 204a. Specifically, the coil wire terminal side mold portion 260b includes two holes 260e arranged to have the coil wire terminals 204a inserted thereinto. The holes 260e are spaced from each other by a predetermined distance. This enables the coil wire terminals 204a of the stator 200 to preferably be arranged at regular intervals of about 15 degrees (the pitch angle=15 degrees) when the stator segments 201 have been assembled together to define the stator 200 in the annular shape. The coil wire terminal side mold portion 260b is provided with a predetermined seal structure to prevent an injected resin from leaking out through a gap between any coil wire terminal 204a and the coil wire terminal side mold portion 260b (i.e., any hole 260e).

The slide portion 260d is preferably slid into contact with an opposite axial end (i.e., an end opposite to the output-side end) of the core segment 202 before the injection of the resin.

Next, the step portion 203e of the insulator 203 will now be described below. The stationary side mold portion 260a can be assumed to have uniform dimensions because the same stationary side mold portion 260a is used repeatedly. In contrast, the core segments 202 may have individual differences in axial dimension. In the case where the core segment 202 has a decreased axial dimension, an extra space is defined between the stationary side mold portion 260a, the opposite axial end of the core segment 202, and the end wall 203c of the insulator 203. The resin injected to define the resin layer 205 flows into the extra space. If the resin which has flowed into the extra space has a very small thickness, the resin may be removed from the inner circumferential surface of the stator 200 toward the rotor 300. In order to prevent this from happening, the step portion 203e is defined in the insulator 203. The resin flows into the step portion 203e when molding the resin layer 205. As a result, the resin layer 205 defined has a sufficient thickness.

The stationary side mold portion 260a is arranged to extend along the end wall 203c of the insulator 203 and the inner side surface 202f of the core segment 202, so that the resin layer 205 is prevented from extending over the end wall 203c and the inner side surface 202f of the core segment 202. Referring to FIG. 50, because of the stationary side mold portion 260a, a surface 205c of the resin which has flowed into the step portion 203e is arranged to be flush with the inner side surface 202f of the core segment 202.

Furthermore, the stationary side mold portion 260a is in contact with the circumferential end walls 203d of the insulator 203 on both sides. Furthermore, the stationary side mold portion 260a is also arranged in contact with the circumferential end walls 202e of the core segment 202 on both sides.

That is, the circumferential end walls 203d and 202e are used as references when molding the resin layer 205. Because the stationary side mold portion 260a is arranged in contact with the circumferential end walls 202e of the core segment 202 on both sides, the resin layer 205 is prevented from extending over the circumferential end walls 202e of the core segment 202.

As described above, the steps are defined between the circumferential end walls 202e of the core segment 202 and the circumferential end walls 203d of the insulators 203. The stationary side mold portion 260a includes steps (each preferably measuring about 0.1 mm, for example) corresponding to the steps between the circumferential end walls 202e of the core segment 202 and the circumferential end walls 203d of the insulators 203. Steps of a similar size (i.e., each preferably measuring about 0.1 mm) are accordingly defined between the circumferential end walls 205d of the resin layer 205 and the circumferential end walls 202e of the core segment 202. That is, the circumferential end walls 205d of the resin layer 205 are arranged circumferentially inward of the circumferential end walls 202e of the core segment 202. As a result, when the stator 200 has been assembled, the resin layers 205 of adjacent ones of the stator segments 201 are not arranged in circumferential contact with each other, while the circumferential end walls 202e of adjacent ones of the core segments 202 are arranged in contact with each other.

Figure 53:
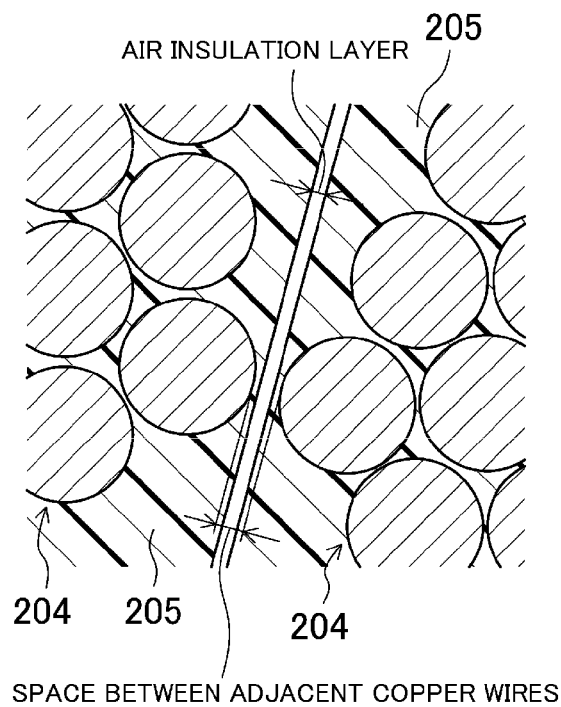
FIG. 53 is a schematic enlarged view of a cross section of coils of adjacent stator segments and their vicinity according to the second preferred embodiment of the present invention.

FIG. 53 is an enlarged view of a cross section of the coils 204 of adjacent ones of the stator segments 201 and their vicinity. As described above, there is a step measuring about 0.1 mm, for example, between the circumferential end wall 202e of the core segment 202 and the circumferential end wall 203d of the insulator 203. Therefore, as illustrated in FIG. 53, an air insulation layer (i.e., and air gap) preferably measuring more than about 0.2 mm, for example, can be secured between the adjacent stator segments 201. Since each coil 204 and the circumferential end wall 203d of the corresponding insulator 203 are spaced from each other by about 0.1 mm, a distance of more than about 0.4 mm is preferably secured between adjacent ones of the copper wires, for example.

As described above, in the present preferred embodiment, the circumferential end walls 202e of the core segments 202 of the stator 200 are arranged in contact with one another, while the resin layers 205 are not arranged in circumferential contact with one another. It is therefore possible to construct the stator 200 with an accuracy of the core segments 202 according to the present preferred embodiment. Use of the stator segments 201 to construct the stator 200 therefore contributes to achieving improved circularity of an inner circumference of the stator as compared to the case where stator segments whose resin layers are arranged in circumferential contact with one another are used to construct the stator. Since the circularity of the inner circumference of the stator affects characteristics of the motor, the motor 1 according to the present preferred embodiment is able to achieve improved characteristics.

Furthermore, the end wall 203c of the insulator 203 includes the step portion 203e. The step portion 203e contributes to absorbing a cumulative error in the axial dimension of the core segment 202 so as to compensate for manufacturing tolerances.

Furthermore, the resin layer 205 is preferably molded in a situation where the pair of coil wire terminals 204a are positioned by the coil wire terminal side mold portion 260b. This contributes to ensuring sufficient accuracy of the pitch angle defined between the coil wire terminals 204a in each stator segment 201. This in turn contributes to preventing a short circuit (i.e., a so-called intraphase short circuit) between the coil wire terminals 204a in the same stator segment 201. In addition, the fitting of the busbar unit 100 to the stator 200 is made easier. The increased ease of the fitting of the busbar unit 100 makes it possible to use an automated machine to perform the fitting of the busbar unit 100. Furthermore, since the coil wire terminals 204a are properly positioned, it is possible to eliminate the need for forced routing of wires. This contributes to reducing a residual stress on a joint between wires, and improving reliability of electrical connection.

Furthermore, the busbar unit 100 is mechanically joined to the stator segments 201 through the recessed portions 205f thereof. This contributes to improving mechanical rigidity, vibration resistance, and impact resistance of the busbar unit 100.

Furthermore, each stator segment 201 includes the groove 205a arranged to accommodate the neutral point busbar 250 separately from the busbar unit 100. This contributes to reducing the total length (i.e., an axial height of the motor) of the motor 1 as compared to the case where the wires for each phase and the wires for the ground are arranged in a single busbar unit. This in turn contributes to achieving a reduced cost.

Furthermore, the resin layer 205 is arranged such that the coil 204 is sandwiched between the insulators 203 and the resin layer 205. This contributes to reducing the exciting vibration of the coil 204.

Note that the aforementioned insulating layer may be defined by a coating (e.g., an electrodeposition coating), instead of the insulator 203, in other preferred embodiments of the present invention.

Also note that the neutral point busbar 250 may alternatively be produced by punching out an annular or C-shaped piece from a plate material. In this case, the neutral point terminal members 250a may be defined integrally with the neutral point busbar 250 when the neutral point busbar 250 is punched out from the plate material.

Also note that the aforementioned segment number of the stator 200 is merely a non-limiting example.

Also note that the aforementioned degree of the central angle defined between the pair of coil wire terminals 204a is merely a non-limiting example. That is, the central angle defined between the pair of coil wire terminals 204a may not necessarily be half the central angle of the core segment 202, as in the above-described preferred embodiment.

Figure 54:
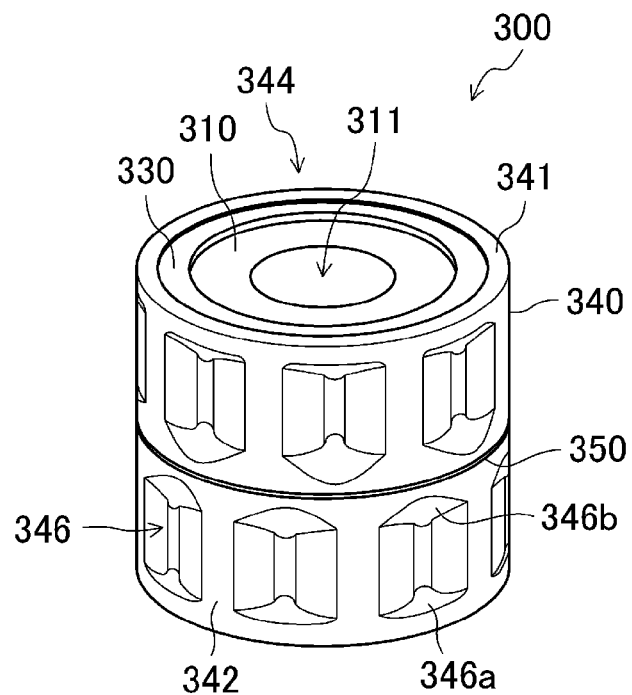
FIG. 54 is a schematic perspective view of a rotor according to the second preferred embodiment of the present invention.
Figure 55:
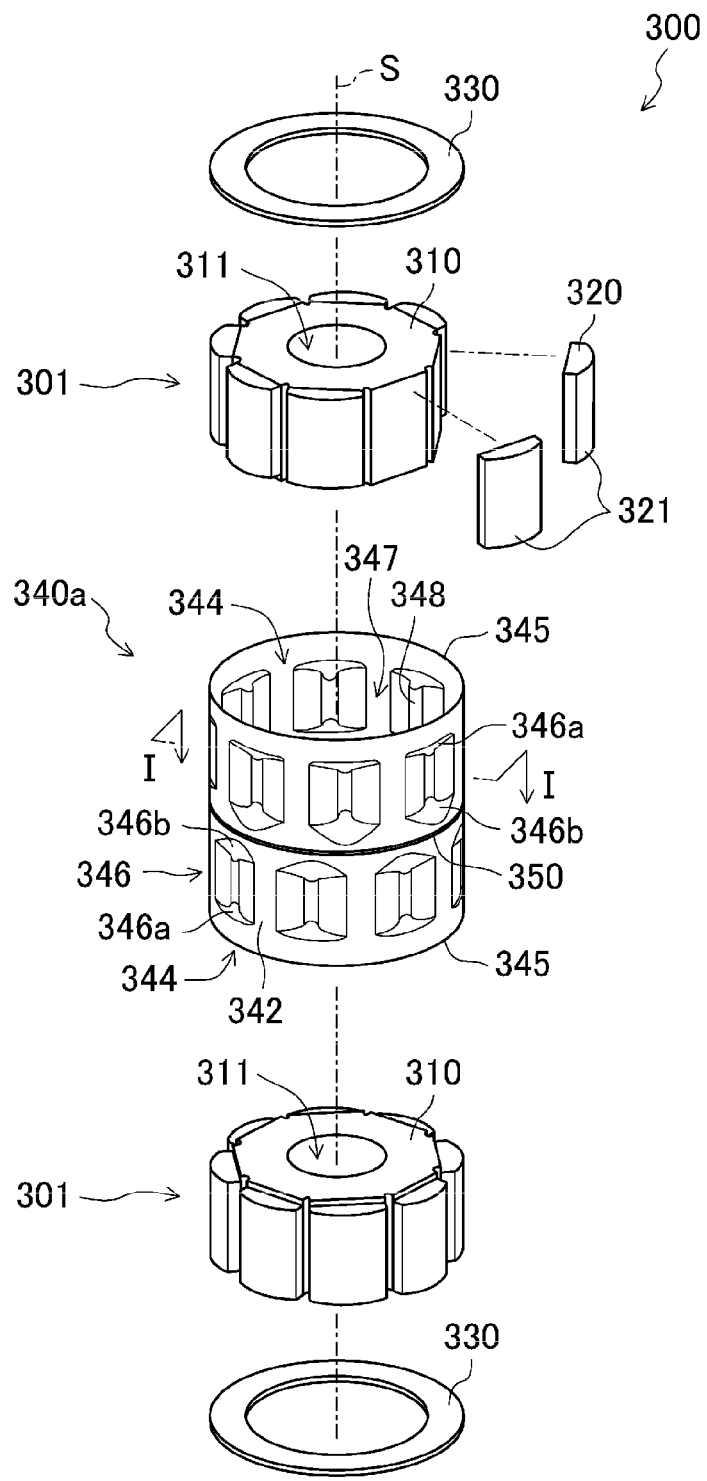
FIG. 55 is an exploded view of components of the rotor according to the second preferred embodiment of the present invention.

As illustrated in FIGS. 54 and 55, the rotor 300 according to the present preferred embodiment is preferably a rotor having a two-step skew structure. The rotor 300 preferably includes rotor cores 310, magnets 320, spacers 330, a rotor cover 340, and so on. The rotor cores 310, the magnets 320, and the spacers 330 are securely united through the rotor cover 340 preferably without use of an adhesive. Note that FIG. 55 shows the rotor cover 340 (i.e., a base 340a) before collar portions 341 are defined therein.

The number of rotor cores 310 included in the rotor 300 according to the present preferred embodiment is preferably two, for example. Each rotor core 310 preferably is a columnar member having a cross section substantially in the shape of a regular octagon. The rotor core 310 includes a through hole 311 defined at its center. The through hole 311 is arranged to be coaxial or substantially coaxial with a rotation axis S, and is arranged to have the shaft 6 secured therein. The rotor core 310 is preferably defined by a plurality of metal sheets placed one upon another along the rotation axis S and united in a single body, but any other desirable type of rotor core could be used.

The rotor 300 according to the present preferred embodiment preferably has eight poles, for example. In other words, the number of magnets 320 (which will be referred to collectively as a "magnet group") attached to each rotor core 310 is preferably eight, for example. Each magnet 320 is preferably shaped like a band plate. Each magnet 320 includes a convex surface 321 arranged to project so as to assume a minor arc in a cross-section. The magnets 320 in each magnet group are arranged to orient the convex surfaces 321 thereof radially outward. Moreover, each magnet 320 is preferably arranged to have the convex surface 321 thereof extending in parallel or substantially in parallel with the through hole 311. The magnets 320 are therefore arranged on an outer circumferential surface of the rotor core 310 at regular intervals in the circumferential direction with a predetermined gap defined between adjacent ones of the magnets 320. The magnets 320 are polarized such that each of the magnets 320 defines a south or a north pole radially oriented. The south and north poles are arranged to alternate with each other in the circumferential direction on a radial outside.

The two rotor cores 310, each with the magnet group attached thereto, are arranged one above the other along the rotation axis S. Each pair of the rotor core 310 and the magnet group will be referred to as a "rotor assembly 301". The two rotor assemblies 301 are fitted inside the rotor cover 340 such that the rotor assemblies 301 are circumferentially displaced from each other by a predetermined step angle. Each of the eight magnets 320 in each rotor assembly 301 is therefore circumferentially displaced from a corresponding one of the eight magnets 320 in the other rotor assembly 301 by the predetermined step angle. In other words, the rotor assemblies 301 preferably have a step skew structure.

The number of spacers 330 included in the rotor 300 according to the present preferred embodiment is preferably two. Each spacer 330 is preferably a member having a portion which is substantially in an annular shape and arranged to extend along an inner circumferential surface of the rotor cover 340. The spacer 330 is arranged to have an outside diameter slightly smaller than the inside diameter of the rotor cover 340. In addition, the spacer 330 is arranged to have an inside diameter greater than the diameter of the through hole 311. The outside diameter of the spacer 330 is at least arranged to be smaller than the outside diameter of the rotor core 310. Note that the spacer 330 may be made of, for example, either a metal or a resin, as long as it is made of a non-magnetic material.

Each spacer 330 is arranged between an end surface of a separate one of the rotor assemblies 301 fitted inside the rotor cover 340 and one of the collar portions 341. Each collar portion 341 is preferably defined by deforming an end portion of the rotor cover 340. Each spacer 330 is arranged to restrain an axial movement of the corresponding rotor assembly 301 in combination with the corresponding collar portion 341. Moreover, the spacer 330 contributes to facilitating processing of the collar portion 341, and also to preventing the magnets 320 and the rotor core 310 from being damaged during the processing. Details thereof will be described below.

The rotor cover 340 is a cylindrical metal article subjected to metalworking, for example. The rotor cover 340 includes a cylindrical circumferential wall 342 and openings 344 arranged to be open at both ends of the rotor cover 340. The rotor cover 340 is defined by subjecting the base 340a, which is substantially cylindrical and free of joints, to press working or the like. The rotor assembly 301 and the spacer 330 are placed inside the rotor cover 340 through each opening 344 and fitted to the rotor cover 340. Each rotor assembly 301 is preferably, for example, press fitted to the rotor cover 340. The rotor cover 340 is arranged to protect the rotor assemblies 301 and the spacers 330, and properly position and integrally hold the rotor assemblies 301 and the spacers 330 without the use of an adhesive.

The rotor cover 340 preferably is essentially identical to the base 340a except that the rotor cover 340 includes the collar portions 341 defined therein. A portion (hereinafter also referred to as a "processed edge 345") of the base 340a around each opening 344 is deformed radially inward to define the collar portion 341 projecting radially inward, so that the rotor cover 340 is completed. The axial dimension of the base 340a is therefore designed to be greater than the total axial dimension of the rotor cores 310 and the magnets 320.

An outer surface of the circumferential wall 342 of the rotor cover 340 includes a recessed dividing portion 350 depressed radially inward. The recessed dividing portion 350 corresponds to an intermediate space provided between the two rotor assemblies 301 and arranged adjacent to each other along the rotation axis S. The recessed dividing portion 350 according to the present preferred embodiment is defined by a straight groove arranged to extend in the circumferential direction at an axial center of the rotor cover 340. The recessed dividing portion 350 contributes towards retaining the two rotor assemblies 301 such that the rotor assemblies 301 are not in contact with each other.

Note that the structure of the rotor cover 340 may be modified as long as a contact between the rotor assemblies 301 is avoided. That is, a gap defined between the adjacent rotor assemblies 301 by the recessed dividing portion 350 may be only slight. Note, however, that, when the rotor assemblies 301 are arranged in too close proximity to each other, a high-speed rotation of the rotor 300 may lead to occurrence of an eddy-current loss. It is therefore preferable that the recessed dividing portion 350 be arranged to space the two rotor assemblies 301 from each other preferably by about 1 mm or more, for example.

The outer surface of the circumferential wall 342 of the rotor cover 340 preferably includes a plurality of recesses 346 defined therein. The recesses 346 are arranged to extend along the rotation axis S, correspondingly to the magnets 320. On both sides of the recessed dividing portion 350 in the rotor cover 340, the recesses 346 are arranged not to extend over an end portion on either side.

Each recess 346 preferably includes a first end wall 346a arranged at an end thereof closer to the opening 344. The first end wall 346a is arranged to extend from an outer circumferential surface of the rotor cover 340 radially inward in a perpendicular or substantially perpendicular manner. The first end walls 346a of the recesses 346 are arranged substantially in a straight line in the circumferential direction. Meanwhile, an end portion of each recess 346 at an end closer to the recessed dividing portion 350 preferably has a tapered shape. The end portion of each recess 346 at the end closer to the recessed dividing portion 350 preferably includes a second end wall 346b arranged to extend from the outer circumferential surface of the rotor cover 340 radially inward in an oblique direction. Note that the shape of the second end wall 346b is a result of avoiding forced removal of the base 340a from a columnar jig 360 when defining the recesses 346.

Figure 56:
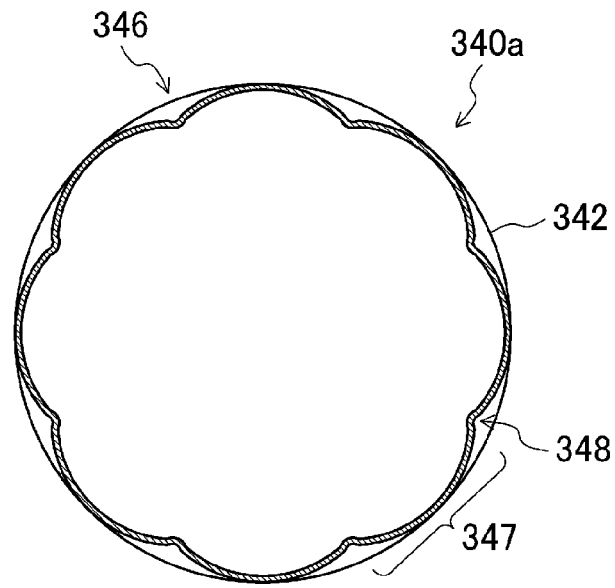
FIG. 56 is a schematic cross-sectional view of a rotor cover as viewed from a direction indicated by line I-I of FIG. 55.

Referring to FIG. 56, because of the recesses 346, the rotor cover 340 includes a plurality of support regions 347 each preferably having a cross section in the shape of a minor arc. Each support region 347 is arranged to project radially outward to match the convex surface 321 of a separate one of the magnets 320 fitted inside the rotor cover 340. In other words, each magnet 320 is arranged such that the convex surface 321 thereof is arranged opposite a separate one of the support regions 347. In addition, each magnet 320 is arranged in contact with the corresponding support region 347. Each magnet 320 is thereby prevented from moving circumferentially, and retained at a predetermined position.

Between every two support regions 347 adjacent to each other in the circumferential direction, a recessed portion 348 extending in a line along the rotation axis S and being continuous with the two support regions 347 is defined. In contrast to the support regions 347, each recessed portion 348 is arranged to project radially inward to have a cross section in the shape of a minor arc. The recessed portion 348 is preferably a small depression which is embedded in a gap defined between every two adjacent magnets 320. Each recessed portion 348 is arranged in a circumferential middle of a separate one of the recesses 346. In addition, the recessed portion 348 is arranged to extend from the first end wall 346a to a vicinity of the second end wall 346b. The recessed portions 348 contribute to securely preventing a contact between any magnets 320 adjacent to each other in the circumferential direction.

Each support region 347 is preferably arranged in secure surface contact with the convex surface 321 of a separate one of the magnets 320. This contributes to properly holding the magnets 320.

Figure 57A:
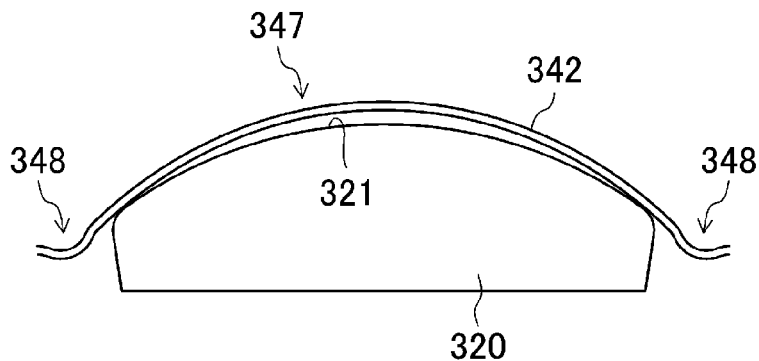
FIGS. 57A and 57B are diagrams for explaining a relationship between a support region and a convex surface according to the second preferred embodiment of the present invention.
Figure 57B:
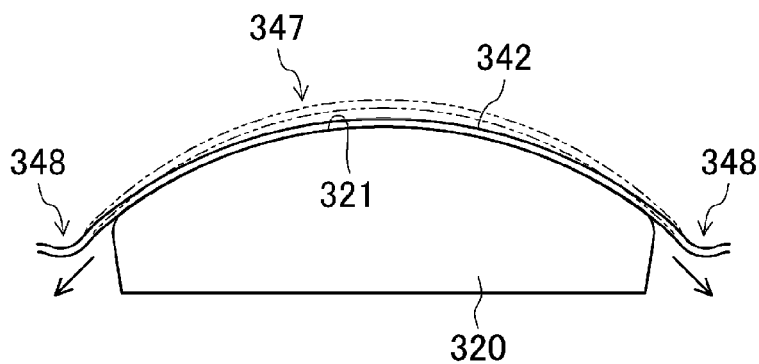

Specifically, referring to FIGS. 57A and 57B, an inner surface of the support region 347 is arranged to have a smaller radius of curvature than that of the convex surface 321. Dimensions of portions of the rotor cover 340 are preferably designed such that both circumferential ends of the convex surface 321 of each magnet 320 are positioned circumferentially inward of both circumferential ends of the inner surface of the corresponding support region 347.

Referring to FIG. 57A, when no external force is applied to the support region 347, the support region 347 preferably has a smaller radius of curvature than that of the convex surface 321. Therefore, when the convex surface 321 is brought into contact with the inner surface of the support region 347, two separate portions of the support region 347 near both circumferential ends thereof are brought into contact with the convex surface 321, while a middle portion of the support region 347 is not in contact with the convex surface 321. Referring to FIG. 57B, after the rotor core 310 and so on are fitted to the base 340a, forces are applied to the base 340a as if to increase the diameter of the base 340a. As a result, both circumferential end portions of the support region 347 are pulled in mutually opposite directions. As a result, a force acting toward the rotation axis S is applied to the support region 347 to force the support region 347 onto the magnet 320. In this manner, the inner surface of the support region 347 is brought into surface contact with the convex surface 321 in its substantial entirety.

Moreover, when the support region 347 has been brought into close contact with the convex surface 321 to have the same radius of curvature as that of the convex surface 321, an arc having this radius of curvature and defined by the support region 347 is longer than an arc having this radius of curvature and defined by the convex surface 321. This contributes to securing the surface contact between the convex surface 321 and the support region 347. As a result, the magnet 320 is properly positioned circumferentially.

Figure 58:
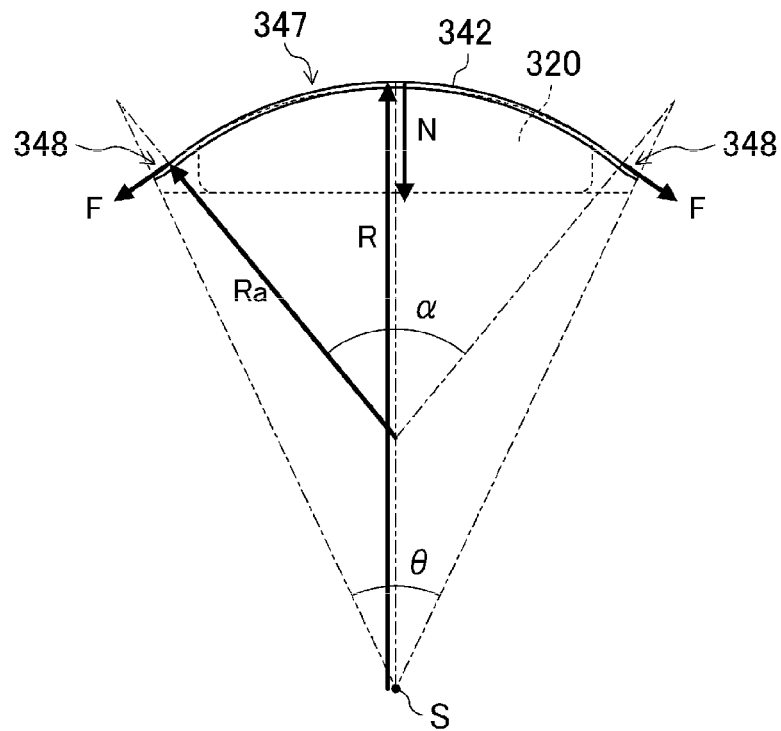
FIG. 58 is a diagram for explaining conditions required of the support region and so on according to the second preferred embodiment of the present invention.
Figure 59:
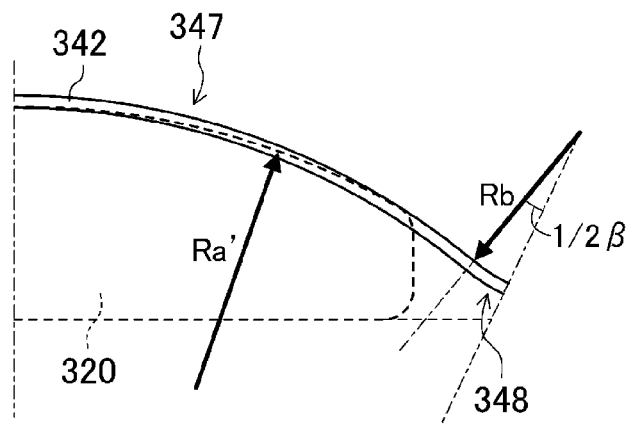
FIG. 59 is another diagram for explaining conditions required of the support region and so on according to the second preferred embodiment of the present invention.

Referring to FIGS. 58 and 59, mathematical equations for deriving the radius of curvature of the support region 347 and so on will now be described below. It is assumed that Ra denotes the radius of curvature (mm) of the support region 347 when no external force is acting on the support region 347, and that $\alpha$ denotes the central angle (radian) thereof. It is similarly assumed that Rb denotes the radius of curvature of the recessed portion 348, and that $\beta$ denotes the central angle thereof.

It is assumed that Ra' denotes the radius of curvature of the support region 347 when the support region 347 has been deformed after the magnets 320 and so on are fitted to the rotor cover 340, and that $\alpha'$ denotes the central angle thereof. It is similarly assumed that Rb' denotes the radius of curvature of the recessed portion 348 when the recessed portion 348 has been deformed after the magnets 320 and so on are fitted to the rotor cover 340, and that $\beta'$ denotes the central angle thereof. Note that Ra' is equal to the radius of curvature of the convex surface 321.

It is assumed that R denotes a maximum outside diameter (mm) of the rotor cover 340 when the magnets 320 and so on have been fitted to the rotor cover 340. It is also assumed that $\theta$ denotes the central angle of one pole of the rotor 300, that t denotes the thickness (mm) of the rotor cover 340, that L denotes the circumferential length (mm) of the rotor cover 340, and that E denotes the Young's modulus of the rotor cover 340.

When the rotor cover 340 is constructed in the above-described manner, the following geometric equations hold.

$$\alpha' = \theta + \beta' \qquad \text{Eq. 1}$$

$$(R-t-Ra')\sin\theta = (Ra' + Rb' + t)\sin\beta' \qquad \text{Eq. 2}$$

Furthermore, when the magnets 320 and so on have been fitted to the rotor cover 340, pulling forces F are produced at the support region 347 and circumferential end portions of the recessed portions 348. The support region 347 and the recessed portions 348 are stretched thereby, so that the following equation holds.

$$\frac{\alpha' Ra' - \alpha Ra}{\alpha Ra} = \frac{\beta' Rb' - \beta Rb}{\beta Rb} = \frac{F}{tEL} \qquad \text{Eq. 3}$$

The pulling forces F produced at the support region 347 produce a radially inward force N (i.e., a supporting force) acting on the magnet 320. The supporting force N is represented by the following equation.

$$N = 2F\sin(\alpha'/2) \qquad \text{Eq. 4}$$

Therefore, the proper holding of the magnets 320 is ensured by making the supporting force N calculated based on the above equations greater than a maximum centrifugal force applied to the magnets 320.

Specifically, the proper holding of the magnets 320 is ensured when the following inequality holds:

$$N > Mm \cdot Rm \cdot S^2 \qquad \text{Eq. 5}$$

where Mm denotes the mass of each magnet 320, Rm denotes the distance from the center of the through hole 311 to the center of gravity of the magnet 320, and S denotes a maximum angular velocity of the rotor 300 based on a design thereof.

Next, a method of manufacturing the rotor 300 according to the present preferred embodiment will now be described below.

As described above, the magnets 320 and so on are fitted to the rotor cover 340 preferably without use of an adhesive to construct the rotor 300 in a unified manner. Specifically, the method of fitting the magnets 320 and so on to the rotor cover 340 to construct the rotor 300 in a unified manner preferably includes a step of defining the base 340a of the rotor cover 340 (i.e., a base defining step); a step of defining the recessed dividing portion 350 in the base 340a (i.e., a recessed dividing portion defining step); a step of defining the support regions 347 in the base 340a (i.e., a support region defining step); a step of fitting the rotor cores 310 and the magnets 320 to the base 340a (i.e., a fitting step); and a step of defining the collar portions 341 in the base 340a to complete the rotor cover 340 (i.e., a collar portion defining step).

Referring to FIGS. 60A, 60B, 60C, and 60D, the base 340a of the rotor cover 340 (an initial state) is defined in the base defining step. Specifically, referring to FIG. 60A, a metal sheet is first preferably subjected to, for example, press working to define a pressed metal item which has a bottom and is substantially cylindrical and free of joints. The thickness of the metal sheet is preferably in the range of, for example, about 0.2 mm to about 0.3 mm, from the standpoint of durability and motor performance.

Figure 60A:
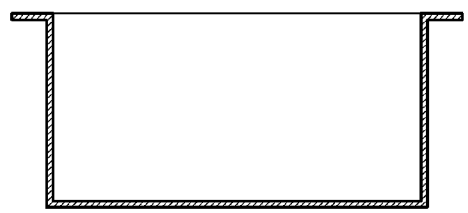
FIGS. 60A, 60B, 60C, and 60D are diagrams for explaining a base defining step according to the second preferred embodiment of the present invention.
Figure 60B:
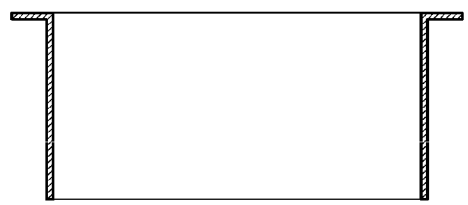
Figure 60C:
Figure 60D:
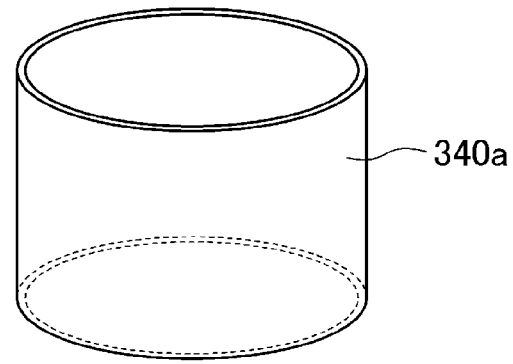
Figure 61A:
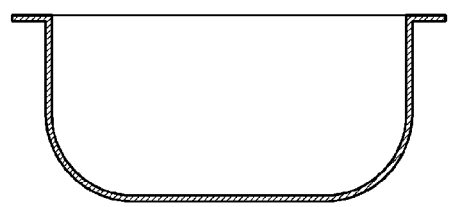
FIGS. 61A, 61B, 61C, and 61D are diagrams for explaining an example variation of the base defining step according to the second preferred embodiment of the present invention.
Figure 61B:
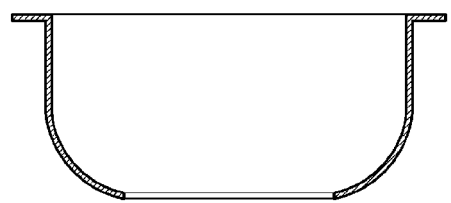
Figure 61C:
Figure 61D:
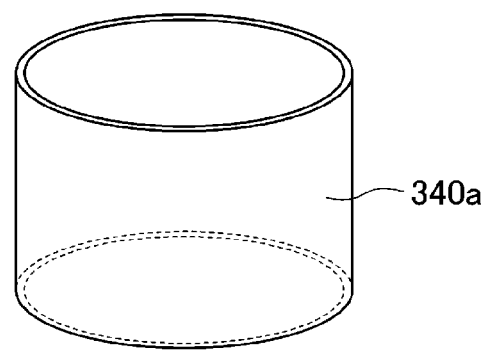

Next, referring to FIG. 60B, the bottom of the pressed metal item is removed therefrom to shape the pressed metal item as illustrated in FIG. 60C, and thereafter an unwanted flange portion preferably is cut off, so that a substantially cylindrical item having openings at both ends thereof and being free of joints as illustrated in FIG. 60D is finally defined. This item is used as the base 340a of the rotor cover 340 (the initial state).

Alternatively, referring to FIGS. 61A, 61B, 61C, and 61D, a pressed item which has a bottom and is substantially cylindrical and free of joints and which includes a curved surface defined in a bottom portion thereof may be used to define the base 340a, for example. In this case, for example, after a portion of the bottom surface is cut off, a portion of the pressed item which corresponds to the curved surface is deformed through press working to assume a cylindrical shape. An unwanted flange portion is cut off thereafter.

In the recessed dividing portion defining step, a portion of the circumferential wall 342 of the base 340a is preferably depressed radially inward, so that an axial middle portion of the base 340a includes the recessed dividing portion 350.

Figure 62:
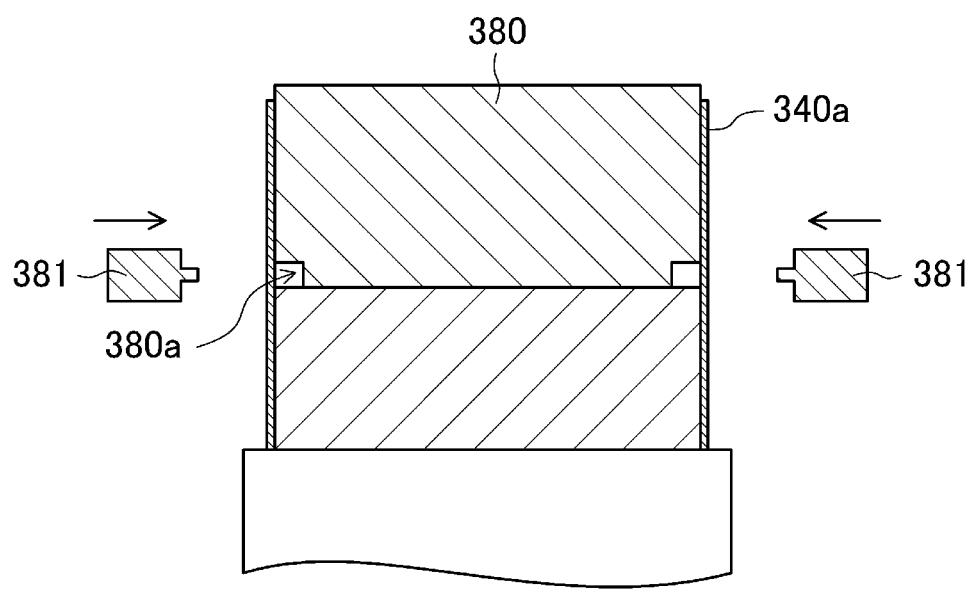
FIG. 62 is a diagram for explaining a recessed dividing portion defining step according to the second preferred embodiment of the present invention.

Referring to FIG. 62, specifically, the base 340a is preferably fitted to one of a pair of predetermined half jigs 380, so that the base 340a is held thereby. The other of the pair of half jigs 380 is joined to the first half jig 380, so that a recess 380a is defined in an outer circumferential surface of the second half jig 380. The recess 380a corresponds to the recessed dividing portion 350. A stamping die 381 including a projection defined at a top end thereof is pressed against the circumferential wall 342 of the base 340a into the recess 380a, radially inward from outside the circumferential wall 342. As a result, the recessed dividing portion 350 is defined at a predetermined portion of the circumferential wall 342.

In the support region defining step, portions of the circumferential wall 342 of the base 340a are depressed radially inward so that the recesses 346 are defined therein. As a result, the support regions 347 are defined therein. In the present preferred embodiment, the recessed portions 348 are preferably defined simultaneously with the support regions 347.

The support region defining step preferably includes a first support region defining step and a second support region defining step. In the first support region defining step, the support regions 347 are defined in one of two axial halves of the base 340a divided by the recessed dividing portion 350. In the second support region defining step, the support regions 347 are defined in the other axial half of the base 340a such that the support regions 347 in the other axial half of the base 340a are circumferentially displaced from the support regions 347 in the first axial half of the base 340a by the predetermined step angle.

Referring to FIGS. 63, 64, 65, and 66, for example, eight pressing bars 361 (i.e., pressing dies) and so on are preferably used in the support region defining step. The pressing bars 361 are arranged for the columnar jig 360 and the recesses 346 of one of the two rotor assemblies 301. The axial dimension of the jig 360 is preferably about half the axial dimension of the base 340a, and the outside diameter of the jig 360 is slightly smaller than the inside diameter of the base 340a. An outer circumferential surface of the jig 360 preferably includes eight depressed portions 362 defined therein, for example. The depressed portions 362 are arranged to correspond to the recesses 346 in cross-section, in other words, to the support regions 347 and the recessed portions 348 in cross-section. Each of the depressed portions 362 is arranged to extend from an axial middle portion to an upper edge of the outer circumferential surface of the jig 360. Each depressed portion 362 preferably includes a closed end 362a, which is closed by an end surface spreading radially, and an open end 362b.

Each pressing bar 361 includes a pressing surface 361a. The pressing surface 361a is arranged to project in such a manner as to correspond to the recess 346 in cross-section. The pressing bars 361 are arranged around the jig 360 such that the pressing surfaces 361a thereof are arranged to face the depressed portions 362 of the jig 360. In addition, each pressing bar 361 is capable of being shifted in a radial direction. An axial end of the pressing surface 361a of each pressing bar 361 is aligned with the closed end 362a of a separate one of the depressed portions 362. The other axial end of the pressing surface 361a of each pressing bar 361 is positioned axially below an upper edge of the jig 360.

Figure 63:
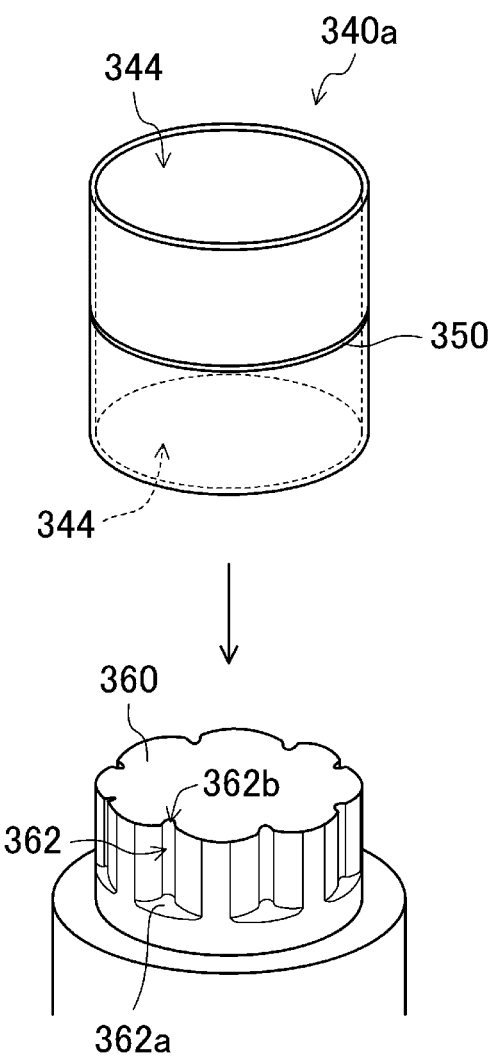
FIG. 63 is a diagram for explaining a support region defining step according to the second preferred embodiment of the present invention.
Figure 64:
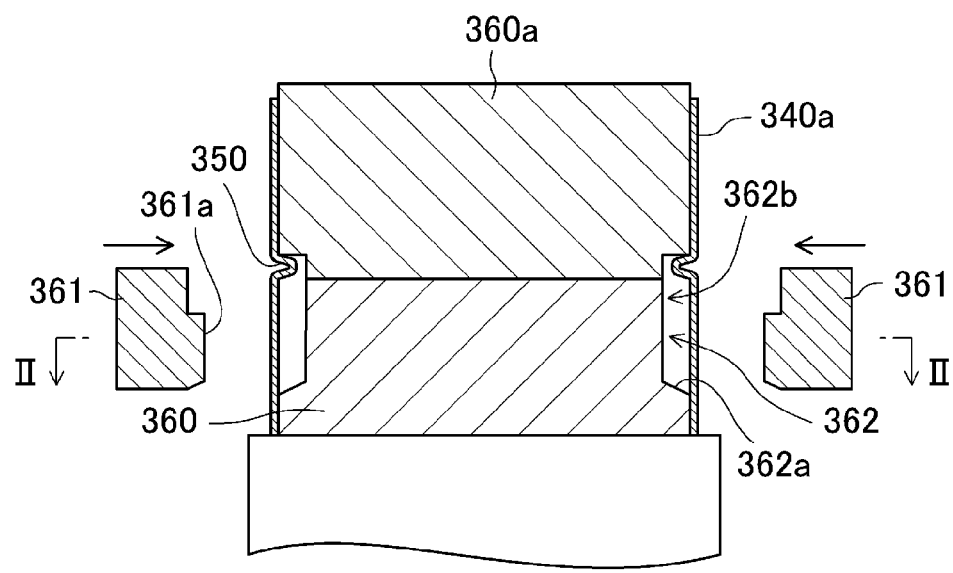
FIG. 64 is another diagram for explaining the support region defining step according to the second preferred embodiment of the present invention.
Figure 65:
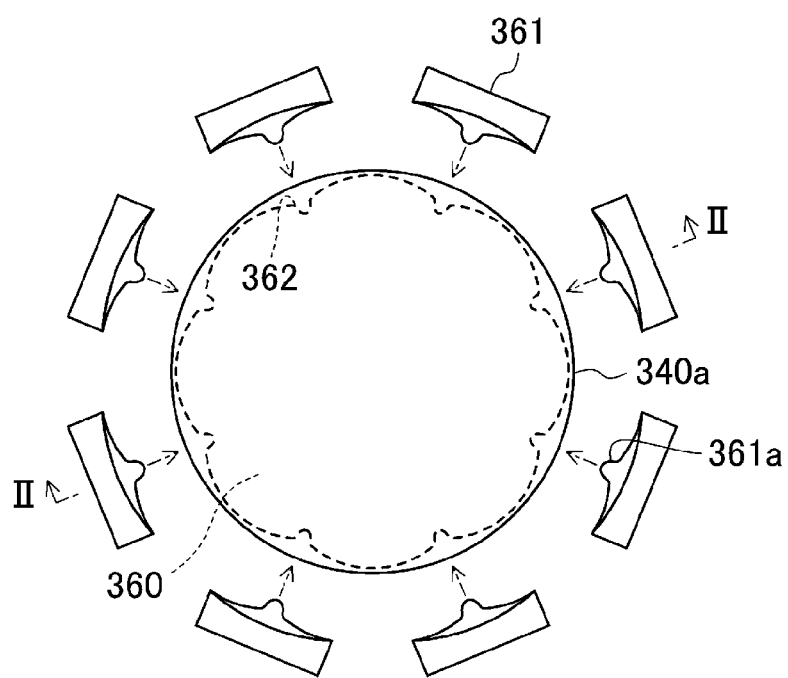
FIG. 65 is a schematic cross-sectional view corresponding to FIG. 64 as viewed from a direction indicated by line II-II of FIG. 64.

Referring to FIG. 63, in the support region defining step, the base 340a is preferably first fitted to the jig 360 in such a manner that one of the openings 344 of the base 340a is placed over the upper edge (i.e., a fitting edge) of the jig 360. Next, referring to FIG. 64, a supporting jig 360a is preferably inserted into the base 340a through the opposite opening 344 thereof. Thereafter, the pressing bars 361 are pressed against the outer circumferential surface of the base 340a. Predetermined portions of the circumferential wall 342 are thereby deformed to shape the recesses 346 (the first support region defining step).

Each depressed portion 362 includes the open end 362b arranged at the upper edge of the jig 360. Therefore, after the pressing bars 361 are shifted backward, the base 340a can preferably be easily removed from the jig 360 by simply pulling the base 340a off the jig 360, without the need for a forced removal.

Figure 66:
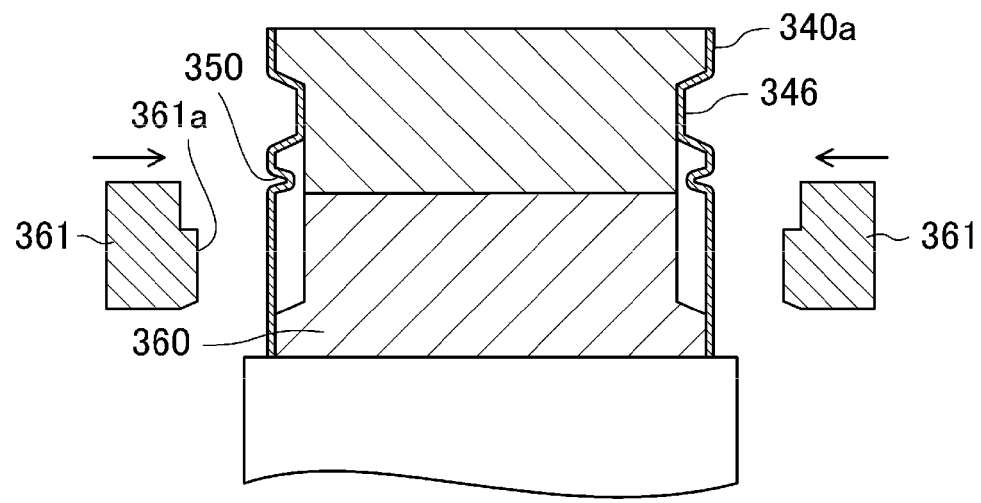
FIG. 66 is yet another diagram for explaining the support region defining step according to the second preferred embodiment of the present invention.

Next, referring to FIG. 66, the base 340a is turned upside down and circumferentially displaced by the predetermined step angle. Thereafter, the base 340a is again fitted to the jig 360 in such a manner that the opposite opening 344 of the base 340a is placed over the upper edge of the jig 360. Predetermined portions of the circumferential wall 342 of the base 340a are then deformed to shape the recesses 346 in a manner similar to that described above (the second support region defining step).

The recesses 346 and hence the support regions 347 are thereby defined as illustrated in FIG. 54 and other figures.

In the fitting step, which is performed after the support region defining step, the rotor cores 310, the magnets 320, and the spacers 330 are preferably fitted to the base 340a so that they are temporarily assembled in a unified manner.

First, one of the rotor assemblies 301 is fitted to one of the axial halves of the base 340a. For example, a supporting tool is used to support the rotor assembly 301 with the magnets 320 arranged at predetermined positions on the outer circumferential surface of the rotor core 310. The rotor assembly 301 is then fitted to the base 340a in such a manner that the base 340a is placed over axial ends of the rotor core 310 and the magnets 320, and is preferably, for example, press fitted to the base 340a so that the magnets 320 are brought into contact with the recessed dividing portion 350. At this time, the rotor assembly 301 is circumferentially aligned with the base 340a such that both circumferential ends of the convex surface 321 of each magnet 320 are positioned circumferentially inward of both circumferential ends of the inner surface of the corresponding support region 347.

When the rotor assembly 301 is circumferentially aligned with the base 340a such that both circumferential ends of the convex surface 321 of each magnet 320 are positioned circumferentially inward of both circumferential ends of the inner surface of the corresponding support region 347, the convex surfaces 321 are arranged in surface contact with the corresponding support regions 347. The magnets 320 are thereby held securely in the circumferential direction. Moreover, the recessed portions 348 are embedded between every pair of adjacent magnets 320. This contributes to preventing a contact between the magnets 320.

Next, the other rotor assembly 301 is fitted to the other axial half of the base 340a such that the other rotor assembly 301 is preferably circumferentially displaced from the first rotor assembly 301 by the predetermined step angle. For example, the supporting tool is used to support the second rotor assembly 301 with the magnets 320 arranged at predetermined positions on the outer circumferential surface of the rotor core 310 thereof. The second rotor assembly 301 is then fitted to the base 340a in such a manner that the base 340a is placed over axial ends of the rotor core 310 and the magnets 320 thereof, and is preferably press fitted to the base 340a so that the rotor core 310 thereof is brought into contact with the rotor core 310 of the first rotor assembly 301, and that the magnets 320 thereof are brought into contact with the recessed dividing portion 350. At this time, the second rotor assembly 301 is circumferentially aligned with the base 340a such that both circumferential ends of the convex surface 321 of each magnet 320 are positioned circumferentially inward of both circumferential ends of the inner surface of the corresponding support region 347.

Finally, the spacer 330 is arranged on an end surface, facing the opening 344, of each of the rotor assemblies 301 fitted to the base 340a. When the rotor cores 310, the magnets 320, and the spacers 330 have been properly fitted to the base 340a, each end portion (i.e., the processed edge 345) of the base 340a around the opening 344 is arranged to protrude over an end surface of the corresponding spacer 330.

In the collar portion defining step, which is performed after the fitting step, the processed edges 345 of the base 340a are deformed to define the collar portions 341. The collar portions 341 are arranged to seal the magnets 320 and so on inside the rotor cover 340.

Figure 67:
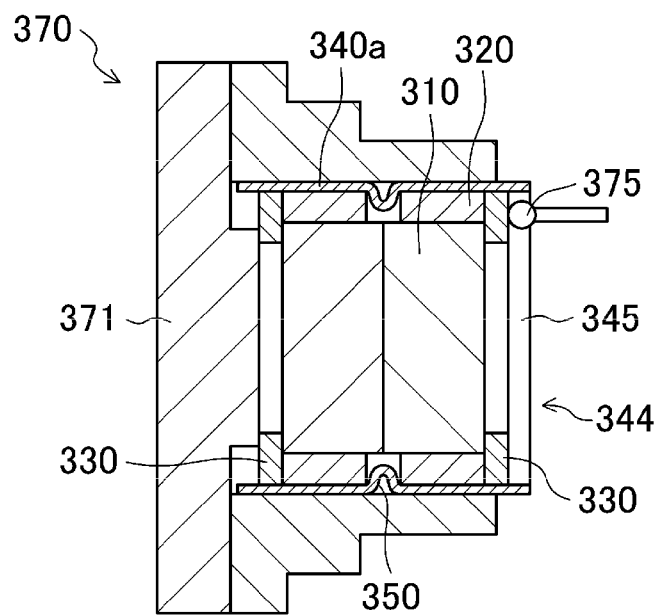
FIG. 67 is a diagram for explaining a collar portion defining step according to the second preferred embodiment of the present invention.
Figure 68:
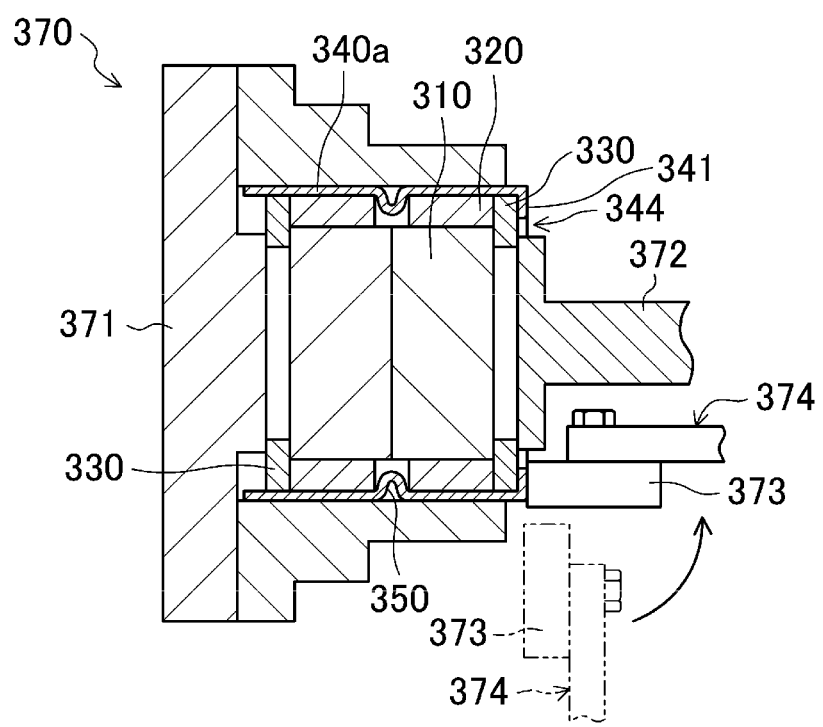
FIG. 68 is another diagram for explaining the collar portion defining step according to the second preferred embodiment of the present invention.
Figure 69:
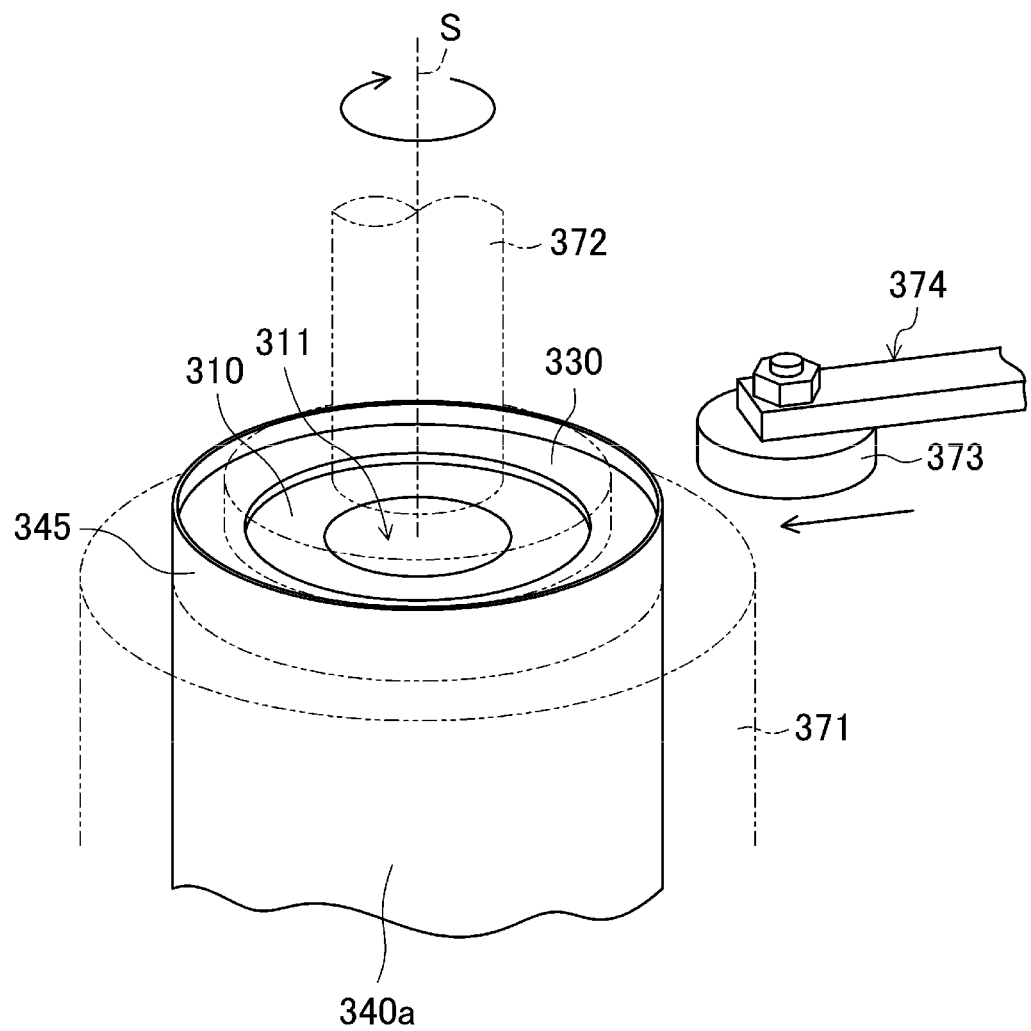
FIG. 69 is yet another diagram for explaining the collar portion defining step according to the second preferred embodiment of the present invention.

The collar portion defining step will now be described below with reference to FIGS. 67, 68, and 69. In the collar portion defining step, a dedicated lathe apparatus 370 is preferably used to define the collar portions 341 as illustrated in FIGS. 67 to 69. The lathe apparatus 370 preferably includes a chuck 371 which is capable of being rotated about the rotation axis S, a tail stock 372, and so on. The tail stock 372 is arranged to be opposed to the chuck 371 along the rotation axis S, and is arranged to rotate in synchronism with the chuck 371 while supporting one of the spacers 330.

The lathe apparatus 370 further includes a small-diameter roller (i.e., a cam follower 373) arranged on a top thereof and being freely rotatable. The lathe apparatus 370 further includes a crimping tool 374. The crimping tool 374 is capable of being shifted in a radial direction with respect to the rotation axis S of the chuck 371 and so on. In addition, the crimping tool 374 is capable of being tilted at least within a range between the rotation axis S and an axis perpendicular to the rotation axis S. Furthermore, the lathe apparatus 370 preferably further includes a touch probe 375 used to determine a reference position during processing. The lathe apparatus 370 further includes a control apparatus and so on (not shown) which are used to perform centralized control of the chuck 371, the tail stock 372, the cam follower 373, the crimping tool 374, and the touch probe 375. The lathe apparatus 370 is arranged to automatically perform a series of processes which define the collar portions 341.

In the collar portion defining step, first, the base 340a having the rotor cores 310 and so on fitted thereto is preferably held by the chuck 371 such that one of the openings 344 of the base 340a is arranged to face outward. At this time, the chuck 371 and the base 340a are arranged to be coaxial or substantially coaxial with each other to share the same rotation axis S. Referring to FIG. 67, once the lathe apparatus 370 is activated, the touch probe 375 is driven. The touch probe 375 is then brought preferably into contact with the end surface of the spacer 330. A reference surface to be used as a reference during the processing is set thereby. Note that performing the processing based on the reference surface contributes to coping with variations in the dimensions of different parts.

Referring to FIG. 68, the tail stock 372 starts operating based on the set reference surface. The tail stock 372 is then properly pressed against the spacer 330 toward the chuck 371. The base 340a is thereby held by the lathe apparatus 370. In addition, the base 340a is caused to rotate about the rotation axis S at a predetermined rotation rate, together with the chuck 371 and the tail stock 372.

Referring to FIG. 69, while the base 340a is rotating, the cam follower 373 is pressed against the processed edge 345 of the base 340a. Referring to FIG. 68, the cam follower 373 is then preferably tilted in a stepwise manner, so that the processed edge 345 is deformed radially inward to define the collar portion 341. When the collar portion 341 has been defined, the spacer 330 is held between the collar portion 341 and an end portion of the rotor core 310.

The cam follower 373 is arranged to rotate as needed at this time. The rotation of the cam follower 373 contributes to preventing occurrence of an excessive frictional force (i.e., frictional force resulting in an aggressive wear) and an unwanted force between the processed edge 345 and the cam follower 373. Furthermore, the spacer 330 contributes to preventing or substantially preventing damage of any magnet 320 and the end portion of the rotor core 310. Furthermore, the spacer 330 also contributes to retaining the circular shape of the processed edge 345 against influence of the recesses 346. The spacer 330 thus facilitates the shaping of the collar portion 341.

The collar portion 341 is thereby shaped so as to extend evenly in the radial direction to have a fine finish. The collar portion 341 is preferably arranged in close contact with the spacer 330 to restrain the movement of the spacer 330.

The collar portion 341 is preferably arranged to project radially inward from the circumferential wall 342 by more than about 1 mm, for example. The projection of more than about 1 mm ensures that the collar portion 341 is reliably shaped to be flat without being corrugated, and also ensures secure retention of the spacer 330. Note that the collar portion 341 may not necessarily be arranged to extend uniformly along the entire circumference thereof. That is, a cut or cuts may be defined in a portion or portions of the collar portion 341.

Thereafter, the base 340a is preferably placed in the lathe apparatus 370 in reverse orientation, and the above-described series of processes is performed in a similar manner to deform the other processed edge 345 to define the other collar portion 341.

The rotor cover 340 is completed when the other collar portion 341 has been defined. The collar portions 341, the spacers 330, and the recessed dividing portion 350 combine to prevent the axial movement of the rotor cores 310 and the magnets 320 fitted inside the rotor cover 340. The rotor cores 310 and the magnets 320 are thereby retained at predetermined positions. As described above, the rotor 300 can be constructed without use of an adhesive, according to the present preferred embodiment. This leads to improved productivity and reduced production cost. Furthermore, it is possible to arrange the magnets at substantially regular intervals in the circumferential direction without use of an intervening adhesive. This leads to an improvement in the degree of imbalance of the rotor.

Note that the present invention is not limited to the rotor 300 and so on according to the above-described preferred embodiments. It is to be understood by those skilled in the art that variations and modifications can be made without departing from the scope and spirit of the present invention.

For example, the shape of the cross section of the rotor core 310 is not limited to an octagon. The shape of the cross section of the rotor core 310 may be changed to a circle, any of a variety of other polygons, or the like suitably in accordance with the number of magnets 320 arranged on the rotor core 310 and the shape of each magnet 320.

Also note that it may be so arranged that the number of rotor cores 310 is one while a plurality of groups of magnets are arranged one above the other along a rotation axis of the rotor core 310.

Also note that the recessed dividing portion defining step may be performed after the support region defining step. Also note that the recessed dividing portion may not necessarily be arranged to extend continuously along the entire circumference thereof, but may be defined by a portion or portions arranged discontinuously in the circumferential direction, as long as the magnets are axially held thereby.

Other Preferred Embodiments

The stator 12 and so on of the motor 1A according to the first preferred embodiment and the stator 200 and so on of the motor 1 according to the second preferred embodiment preferably share basic structures. Therefore, the above descriptions of the second preferred embodiment may include a description of a feature of the motor 1A. Conversely, the above descriptions of the first preferred embodiment may include a description of a feature of the motor 1. Further, one or more features of the motor 1A and one or more features of the motor 1 may be combined as appropriate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A stator segment arranged to define a portion of an annular stator, the stator segment comprising:
   a core segment including a core back portion arranged to extend in a circumferential direction of the stator, and a tooth portion arranged to extend from the core back portion in a radial direction of the stator;
   a coil wound around the tooth portion and including a pair of coil wire terminals;
   an insulating layer arranged between the coil and the tooth portion; and
   a resin layer arranged to seal the entire coil except for the pair of coil wire terminals; wherein
   all portions of circumferential end walls of the resin layer are arranged circumferentially inward of all portions of circumferential end walls of the core back portion.

2. The stator segment according to claim 1, wherein the pair of coil wire terminals are arranged to extend in an axial direction of the stator segment in parallel or substantially in parallel with each other.

3. The stator segment according to claim 1, wherein a central angle defined between the pair of coil wire terminals is half of, or about half of, a central angle of the core segment.

4. The stator segment according to claim 1, wherein
   the annular stator including the stator segments includes a wiring member having an extending line shape; and
   an axial end surface of the resin layer includes a groove defined therein to accommodate the wiring member.

5. The stator segment according to claim 4, wherein
   the wiring member includes a terminal member to be connected to any of the coil wire terminals; and
   the groove is provided with a projecting portion arranged to prevent the terminal member from coming off.

6. The stator segment according to claim 1, wherein the insulating layer is defined by a resin insulator.

7. The stator segment according to claim 1, wherein
   the insulating layer includes an end wall arranged radially outward of an inner side surface of the core segment; and
   the resin layer is arranged such that the resin layer does not extend over the end wall of the insulating layer.

8. The stator segment according to claim 7, wherein the end wall of the insulating layer includes a step portion defined in an axial end portion thereof on a side closer to the core segment.

9. The stator segment according to claim 1, wherein the coil is wound around the core segment so as not to extend over a circumferential end surface of the insulating layer.

10. A motor comprising:
    a busbar unit including an annular or a C-shaped wiring member, a plurality of terminal members attached to the wiring member, and a holder arranged to accommodate the wiring member; and
    a cylindrical stator defined by a plurality of stator segments according to claim 2; wherein
    each of the terminal members is arranged to have inserted therein one of the coil wire terminals of a predetermined one of the stator segments, with the busbar unit mounted on an axial end surface of the stator.

11. The motor according to claim 10, wherein each of the stator segments includes a fixing portion arranged to fix the holder.

* * * * *